(12) United States Patent
Hyakusoku et al.

(10) Patent No.: US 10,962,082 B2
(45) Date of Patent: Mar. 30, 2021

(54) ADJUSTING METHOD AND ADJUSTING SYSTEM FOR RESONANCE FREQUENCY OF VIBRATION ISOLATOR, VIBRATION ISOLATOR, AND DESIGNING METHOD, DESIGNING SYSTEM, AND MANUFACTURING METHOD FOR VIBRATION ISOLATOR

(71) Applicant: Japan Aerospace Exploration Agency, Tokyo (JP)

(72) Inventors: Yasutoshi Hyakusoku, Chofu (JP); Takafumi Kajikawa, Chofu (JP); Qinzhong Shi, Chofu (JP); Daichi Todaka, Chofu (JP)

(73) Assignee: Japan Aerospace Exploration Agency, Tokyo (JP)

( * ) Notice: Subject to any disclaimer, the term of this patent is extended or adjusted under 35 U.S.C. 154(b) by 96 days.

(21) Appl. No.: 16/321,002

(22) PCT Filed: Jul. 25, 2017

(86) PCT No.: PCT/JP2017/026901
§ 371 (c)(1),
(2) Date: Jan. 25, 2019

(87) PCT Pub. No.: WO2018/021329
PCT Pub. Date: Feb. 1, 2018

(65) Prior Publication Data
US 2019/0170209 A1    Jun. 6, 2019

(30) Foreign Application Priority Data

Jul. 25, 2016  (JP) .............................. JP2016-145581

(51) Int. Cl.
*F16F 15/08* (2006.01)
*G05D 19/02* (2006.01)
(Continued)

(52) U.S. Cl.
CPC ............ *F16F 15/08* (2013.01); *F16F 1/3605* (2013.01); *F16F 3/08* (2013.01); *F16F 13/26* (2013.01);
(Continued)

(58) Field of Classification Search
CPC .. F16F 15/08; F16F 3/08; F16F 1/3605; F16F 13/26; G05D 19/00
See application file for complete search history.

(56) References Cited

U.S. PATENT DOCUMENTS 4,935,651 A * 6/1990 Hong ..................... F16F 7/10
                                                      188/380
5,558,191 A * 9/1996 Lai ......................... F16F 1/387
                                                      188/379
(Continued)

FOREIGN PATENT DOCUMENTS

JP    S51-55193 U    4/1976
JP    H02-17240 A    1/1990
(Continued)

OTHER PUBLICATIONS

International Preliminary Report on Patentability and Written Opinion issued in PCT/JP2017/026901; dated Jan. 29, 2019.
(Continued)

*Primary Examiner* — Xuan Lan Nguyen
(74) *Attorney, Agent, or Firm* — Studebaker & Brackett PC

(57) ABSTRACT

Provided is an adjusting method for a resonance frequency of a vibration isolator, the vibration isolator including first to n-th elastic member groups and/or an n+1-th elastic member group, the first to n-th elastic member groups and/or the n+1-th elastic member group being located on an xy plane of an xyz coordinate system, and an xy coordinate system of
(Continued)

the xyz coordinate system being a coordinate system obtained by, when a tensor of inertia I with respect to an XYZ coordinate system having an origin in a center of gravity of a vibration sensing side structure or a vibration source side structure is represented as I, rotating an XY coordinate system by $\theta = \tan^{-1}(2I_{XY}/(I_{XX}-I_{YY}))$ around a Z axis, the adjusting method including, when rigidity $K_i$ of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$ of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the first to n-th elastic member groups are represented as $r_{pi\_x}$ and $r_{pi\_y}$, while satisfying $\Sigma k_{i\_xx} r_{pi\_x} = \Sigma k_{i\_yy} r_{pi\_y} = 0$ and $\Sigma k_{i\_yy} r_{pi\_x} r_{pi\_y} = \Sigma k_{i\_xx} r_{pi\_x} r_{pi\_y} = 0$, at least one step of a step of adjusting positions of the first to n-th elastic member groups such that values of $\Sigma(k_{i\_zz} r_{pi\_y}^2)$, $\Sigma(k_{i\_yy} r_{pi\_x}^2)$, and $\Sigma(k_{i\_zz} r_{pi\_y}^2 + k_{i\_yy} r_{pi\_x}^2)$ change and respectively shifting resonance frequencies of x, y, and z-axial rotational motions and a step of arranging the n+1-th elastic member group at an origin of the xyz coordinate, adjusting values of $k_{n+1\_xx}$, $k_{n+1\_yy}$, and $k_{n+1\_zz}$, and respectively shifting resonance frequencies of x, y, and z-direction translational motions.

37 Claims, 28 Drawing Sheets

(51) Int. Cl.
  *F16F 15/04* (2006.01)
  *F16F 1/36* (2006.01)
  *F16F 3/08* (2006.01)
  *F16F 13/26* (2006.01)
  *G05D 19/00* (2006.01)

(52) U.S. Cl.
  CPC ............ *F16F 15/04* (2013.01); *G05D 19/02* (2013.01); *G05D 19/00* (2013.01)

(56) References Cited

U.S. PATENT DOCUMENTS

| | | | |
|---|---|---|---|
| 8,196,910 B2 * | 6/2012 | Baron | F16F 15/04 |
| | | | 267/136 |
| 9,752,644 B2 * | 9/2017 | Kim | B64G 1/22 |
| 2014/0084527 A1 | 3/2014 | Johnson et al. | |

FOREIGN PATENT DOCUMENTS

| | | |
|---|---|---|
| JP | 2001-082536 A | 3/2001 |
| JP | 2014-535026 A | 12/2014 |

OTHER PUBLICATIONS

International Search Report issued in PCT/JP2017/026901; dated Oct. 31, 2017.

* cited by examiner

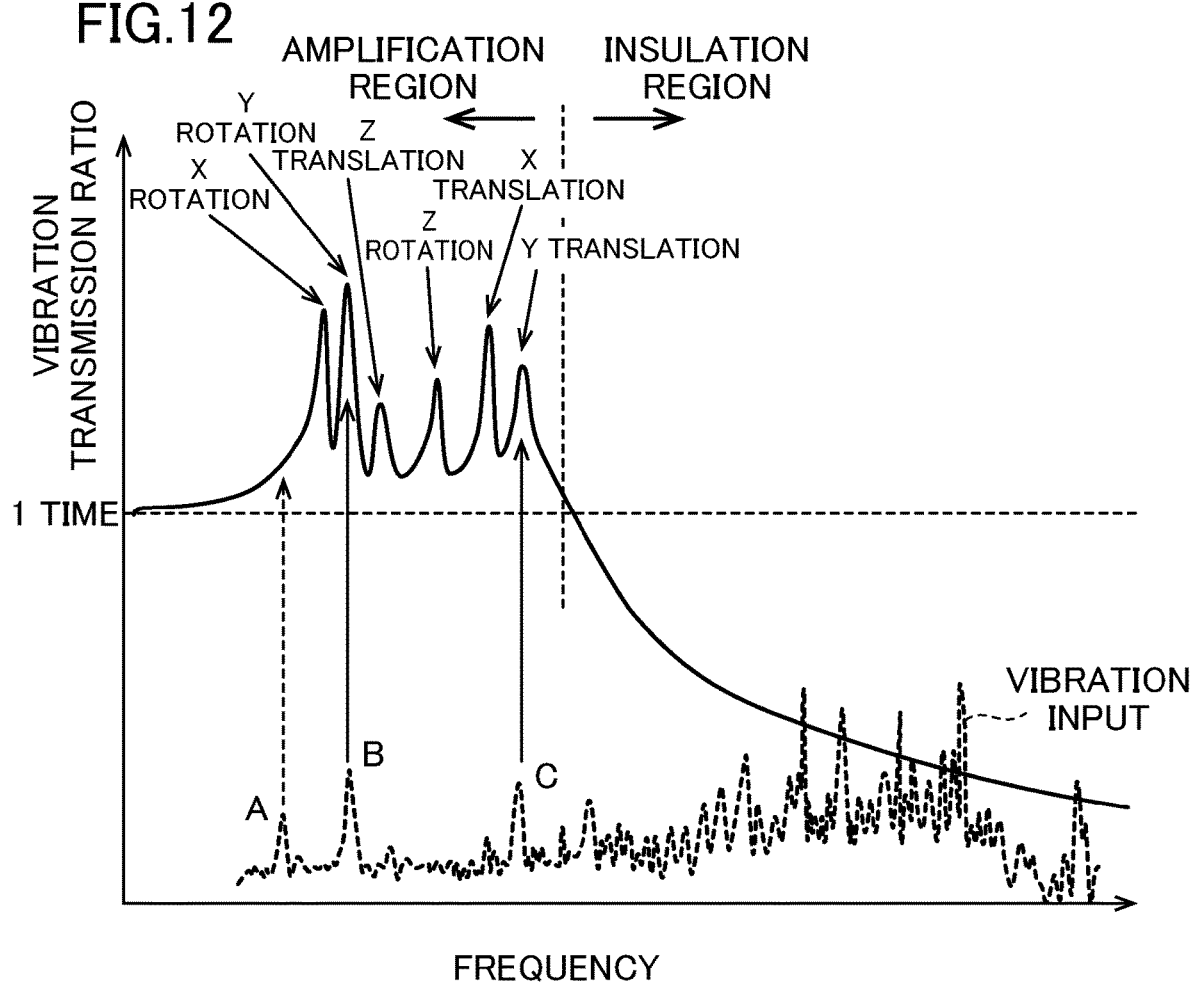

FIG.14B (I) → S14

WHEN RESONANCE PHENOMENON IS PRESENT IN MEASURED VIBRATION RESPONSE IN FREQUENCY COINCIDING WITH ANY ONE OF RESONANCE FREQUENCIES OF x TRANSLATION, y TRANSLATION, z TRANSLATION, x ROTATION, y ROTATION, AND z ROTATION, DETACH VIBRATION SENSING SIDE STRUCTURE FROM VIBRATION ISOLATOR 1, PERFORM FOLLOWING ADJUSTMENT TO SHIFT RESONANCE FREQUENCIES WHILE SATISFYING CONDITION 2 IN xy COORDINATE SYSTEM OBTAINED BY ROTATING XY COORDINATE SYSTEM AROUND Z AXIS BY $$\theta = \tan^{-1}\left(\frac{2I_{XY}}{I_{XX} - I_{YY}}\right)$$

(1) WHEN VIBRATION INPUT IS PRESENT IN FREQUENCY COINCIDING WITH RESONANCE FREQUENCY OF x ROTATION, ADJUST POSITIONS OF FIRST TO FOURTH ELASTIC MEMBERS 15 TO 18 SUCH THAT VALUE OF $$\sum_i (k_{i\_zz} r_{pi\_y}^2) \text{ CHANGES}$$

(2) WHEN VIBRATION INPUT IS PRESENT IN FREQUENCY COINCIDING WITH RESONANCE FREQUENCY OF y ROTATION, ADJUST POSITIONS OF FIRST TO FOURTH ELASTIC MEMBERS 15 TO 18 SUCH THAT VALUE OF $$\sum_i (k_{i\_zz} r_{pi\_x}^2) \text{ CHANGES}$$

(3) WHEN VIBRATION INPUT IS PRESENT IN FREQUENCY COINCIDING WITH RESONANCE FREQUENCY OF z ROTATION, ADJUST POSITIONS OF FIRST TO FOURTH ELASTIC MEMBERS 15 TO 18 SUCH THAT VALUE OF $$\sum_i (k_{i\_xx} r_{pi\_y}^2 + k_{i\_yy} r_{pi\_x}^2) \text{ CHANGES}$$

(4) WHEN VIBRATION INPUT IS PRESENT IN FREQUENCY COINCIDING WITH RESONANCE FREQUENCY OF x TRANSLATION, ATTACH FIFTH ELASTIC MEMBER 19 HAVING DOMINANT RIGIDITY IN x DIRECTION TO CENTER OF SECOND FRAME SECTION 102

(5) WHEN VIBRATION INPUT IS PRESENT IN FREQUENCY COINCIDING WITH RESONANCE FREQUENCY OF y TRANSLATION, ATTACH FIFTH ELASTIC MEMBER 19 HAVING DOMINANT RIGIDITY IN y DIRECTION TO CENTER OF SECOND FRAME SECTION 102

(6) WHEN VIBRATION INPUT IS PRESENT IN FREQUENCY COINCIDING WITH RESONANCE FREQUENCY OF z TRANSLATION, ATTACH FIFTH ELASTIC MEMBER 19 HAVING DOMINANT RIGIDITY IN z DIRECTION TO CENTER OF SECOND FRAME SECTION 102

S15

AFTER ADJUSTMENT OF RESONANCE FREQUENCIES, AS IN STEP S12, ATTACH VIBRATION SENSING SIDE STRUCTURE TO VIBRATION ISOLATOR 1 AGAIN

END

FIG.19A

START
↓ S21
ATTACH VIBRATION ISOLATOR 1 TO VIBRATION SOURCE SIDE STRUCTURE 3
↓ S22

WHEN TENSOR OF INERTIA WITH RESPECT TO XYZ COORDINATE SYSTEM HAVING ORIGIN IN CENTER OF GRAVITY OF VIBRATION SENSING SIDE STRUCTURE IS REPRESENTED AS $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix}$$

, ATTACH VIBRATION SENSING SIDE STRUCTURE 3 TO VIBRATION ISOLATOR 5 SUCH THAT Z AXIS COINCIDES ROTATION AXIS OF ROTATING MEMBER 56

↓ S23
MEASURE VIBRATION RESPONSE OF VIBRATION SENSING SIDE STRUCTURE AT TIME WHEN VIBRATION SOURCE IS ACTUATED
↓ S24

WHEN VIBRATION INPUT PEAK IS PRESENT IN FREQUENCY COINCIDING WITH ANY ONE OF RESONANCE FREQUENCIES OF x TRANSLATION, y TRANSLATION, z TRANSLATION, x ROTATION, y ROTATION, AND z ROTATION, DETACH VIBRATION SENSING SIDE STRUCTURE 3 FROM VIBRATION ISOLATOR 1 AND ROTATE ROTATING MEMBER 56 AROUND ROTATION AXIS OF ROTATING MEMBER 56 SUCH THAT LINE SEGMENT CONNECTING FIRST AND THIRD ELASTIC MEMBERS 51 AND 53 AND LINE SEGMENT CONNECTING SECOND AND FOURTH ELASTIC MEMBERS 52 AND 54 RESPECTIVELY COINCIDE WITH x AXIS AND y AXIS OF xy COORDINATE SYSTEM OBTAINED BY ROTATING XY COORDINATE SYSTEM AROUND Z AXIS BY $$\theta = \tan^{-1}\left(\frac{2I_{XY}}{I_{XX} - I_{YY}}\right)$$

START

S31: WHEN FIRST TO n-TH ELASTIC MEMBER GROUPS AND/OR n+1-TH ELASTIC MEMBER GROUP IS LOCATED ON xy PLANE OF xyz COORDINATE SYSTEM AND xy COORDINATE SYSTEM OF xyz COORDINATE SYSTEM IS COORDINATE SYSTEM OBTAINED BY, WHEN TENSOR OF INERTIA I WITH RESPECT TO XYZ COORDINATE SYSTEM HAVING ORIGIN IN CENTER OF GRAVITY OF VIBRATION SENSING SIDE STRUCTURE OR VIBRATION SOURCE SIDE STRUCTURE IS REPRESENTED AS $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix}$$

, ROTATING XY COORDINATE SYSTEM BY $\theta = \tan^{-1}\left(\dfrac{2I_{XY}}{I_{XX} - I_{YY}}\right)$ AROUND Z AXIS, SET POSITIONS OF FIRST TO n-TH ELASTIC MEMBER GROUP AND/OR n+1-TH ELASTIC MEMBER GROUP TO SATISFY CONDITION 2

S32: WHEN TENSOR OF INERTIA I' WITH RESPECT TO xyz COORDINATE SYSTEM IS REPRESENTED AS $$I' = \begin{bmatrix} I_{xx} & I_{xy} & I_{xz} \\ I_{xy} & I_{yy} & I_{yx} \\ I_{xz} & I_{yz} & I_{zz} \end{bmatrix}$$

, CALCULATE RESONANCE FREQUENCIES OF x TRANSLATION, y TRANSLATION, z TRANSLATION, x ROTATION, y ROTATION, AND z ROTATION FROM DIAGONAL LINEARIZATION TRANSLATIONAL MOTION EQUATION $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x) \quad (3)$$

$$\ddot{r}_{g\_z} = -\frac{1}{m}\sum_i k_{i\_zz}r_{g\_z} = f_3(r_{g\_z})$$

AND
DIAGONAL LINEARIZATION ROTATIONAL MOTION EQUATION $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz}r_{pi\_y}^2\Theta_x\right] = f_4(r_{g\_y}, \Theta_x)$$

$$\ddot{\Theta}_y = -\frac{1}{I_{yy}}\left[\sum_i \{k_{i\_xx}(r_{pi\_z}r_{g\_x} + r_{pi\_z}^2\Theta_y)\} + \sum_i k_{i\_zz}r_{pi\_x}^2\Theta_y\right] = f_5(r_{g\_x}, \Theta_y) \quad (4)$$

$$\ddot{\Theta}_z = -\frac{1}{I_{zz}}\sum_i \{(k_{i\_xx}r_{pi\_y}^2 + k_{i\_yy}r_{pi\_x}^2)\Theta_z\} = f_6(\theta_z)$$

(III)

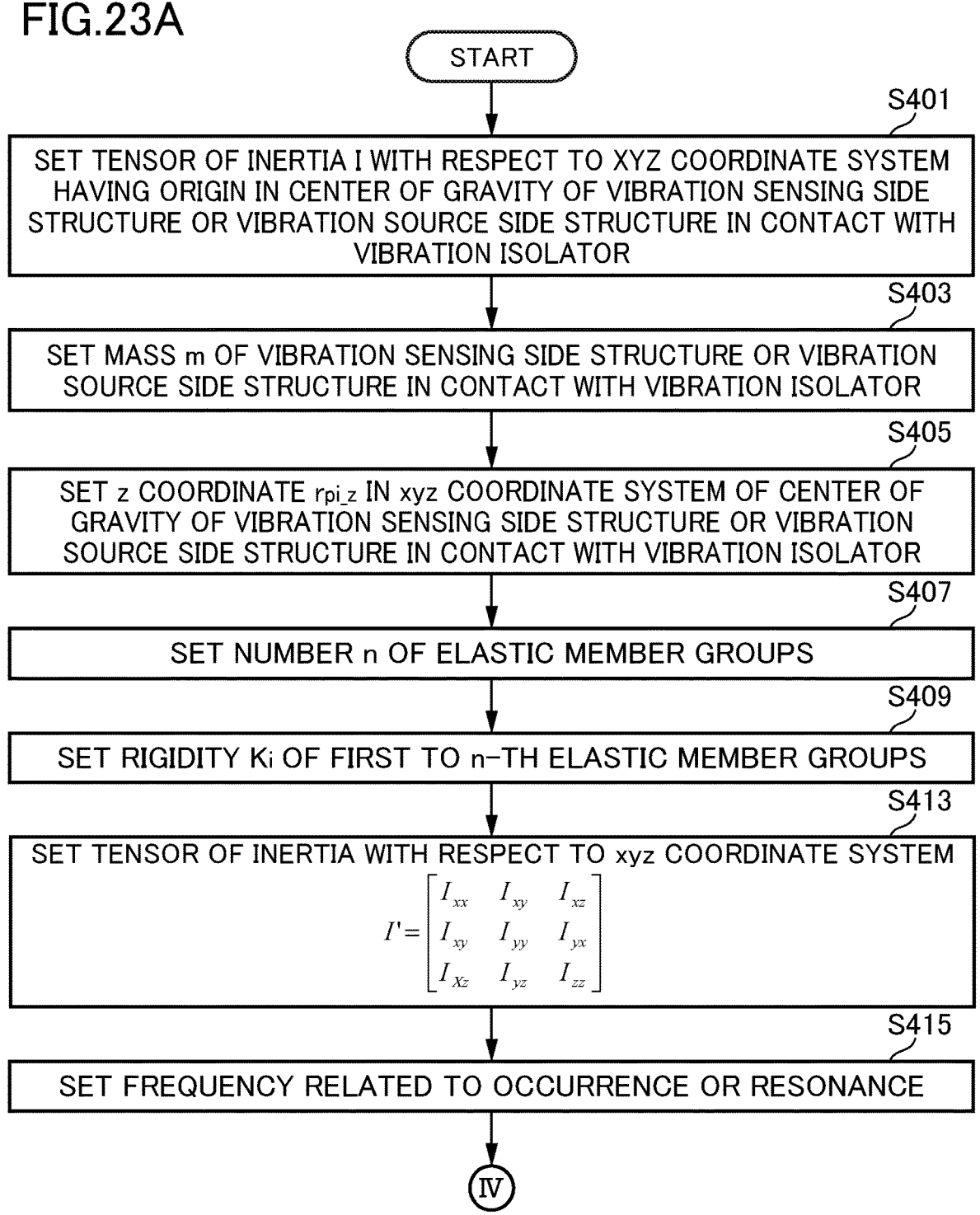

CALCULATE RESONANCE FREQUENCIES OF x TRANSLATION, y TRANSLATION, z TRANSLATION, x ROTATION, y ROTATION, AND z ROTATION FROM DIAGONAL LINEARIZATION TRANSLATIONAL MOTION EQUATION

$$\ddot{r}_{g\_x} = -\frac{1}{m}\sum_i k_{i\_xx}\{r_{g\_x} + r_{pi\_z}\Theta_y\} = f_1(r_{g\_x},\Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y},\Theta_x) \quad (3)$$

$$\ddot{r}_{g\_z} = -\frac{1}{m}\sum_i k_{i\_zz}r_{g\_z} = f_3(r_{g\_z})$$

AND

DIAGONAL LINEARIZATION ROTATIONAL MOTION EQUATION

$$\ddot{\Theta}_x = -\frac{1}{I_{xx}}\left[\sum_i\{k_{i\_yy}(-r_{pi\_z}r_{g\_y} + r_{pi\_z}^2\Theta_x)\} + \sum_i k_{i\_zz}r_{pi\_y}^2\Theta_x\right] = f_4(r_{g\_y},\Theta_x)$$

$$\ddot{\Theta}_y = -\frac{1}{I_{yy}}\left[\sum_i\{k_{i\_xx}(r_{pi\_z}r_{g\_x} + r_{pi\_z}^2\Theta_y)\} + \sum_i k_{i\_zz}r_{pi\_x}^2\Theta_y\right] = f_5(r_{g\_x},\Theta_y) \quad (4)$$

$$\ddot{\Theta}_z = -\frac{1}{I_{zz}}\sum_i\{(k_{i\_xx}r_{pi\_y}^2 + k_{i\_yy}r_{pi\_x}^2)\Theta_z\} = f_6(\theta_z)$$

S517 CALCULATE RESONANCE FREQUENCIES OF x TRANSLATION, y TRANSLATION, z TRANSLATION, x ROTATION, y ROTATION, AND z ROTATION FROM DIAGONAL LINEARIZATION TRANSLATIONAL MOTION EQUATION $$\ddot{r}_{g\_x} = -\frac{1}{m}\sum_i k_{i\_xx}\left\{r_{g\_x} + r_{pi\_z}\Theta_y\right\} = f_1(r_{g\_x}, \Theta_y)$$

$$\ddot{r}_{g\_y} = -\frac{1}{m}\sum_i k_{i\_yy}\left\{r_{g\_y} - r_{pi\_z}\Theta_x\right\} = f_2(r_{g\_y}, \Theta_x) \quad (3)$$

$$\ddot{r}_{g\_z} = -\frac{1}{m}\sum_i k_{i\_zz} r_{g\_z} = f_3(r_{g\_z})$$

AND
DIAGONAL LINEARIZATION ROTATIONAL MOTION EQUATION $$\ddot{\Theta}_x = -\frac{1}{I_{xx}}\left[\sum_i \left\{k_{i\_yy}\left(-r_{pi\_z} r_{g\_y} + r_{pi\_z}^2 \Theta_x\right)\right\} + \sum_i k_{i\_zz} r_{pi\_y}^2 \Theta_x \right] = f_4(r_{g\_y}, \Theta_x)$$

$$\ddot{\Theta}_y = -\frac{1}{I_{yy}}\left[\sum_i \left\{k_{i\_xx}\left(r_{pi\_z} r_{g\_x} + r_{pi\_z}^2 \Theta_y\right)\right\} + \sum_i k_{i\_zz} r_{pi\_x}^2 \Theta_y \right] = f_5(r_{g\_x}, \Theta_y) \quad (4)$$

$$\ddot{\Theta}_z = -\frac{1}{I_{zz}}\sum_i \left\{(k_{i\_xx} r_{pi\_y}^2 + k_{i\_yy} r_{pi\_x}^2)\Theta_z\right\} = f_6(\theta_z)$$

S519 CALCULATE INITIAL ARRANGEMENT OF FIRST TO FOURTH ELASTIC MEMBERS 71 TO 74

S521 DISPLAY POSITIONS OF FIRST TO FOURTH ELASTIC MEMBERS 71 TO 74 SET AS INITIAL ARRANGEMENT TOGETHER WITH x AXIS AND y AXIS AND ELASTIC MEMBER GROUP ARRANGEABLE RANGE 76 AND DISPLAY CALCULATED RESONANCE FREQUENCIES OF x TRANSLATION, y TRANSLATION, z TRANSLATION, x ROTATION, y ROTATION, AND z ROTATION

S523 PROMPT FOR SELECTION AND INPUT OF RESONANCE FREQUENCY TO BE SHIFTED OUT OF CALCULATED RESONANCE FREQUENCIES OF x TRANSLATION, y TRANSLATION, z TRANSLATION, x ROTATION, y ROTATION, AND z ROTATION

S525 THERE IS SELECTION AND INPUT OF RESONANCE FREQUENCY TO BE SHIFTED ?

No → END
Yes → VII

S527 ELASTIC-MEMBER-GROUP-ARRANGEMENT DISPLAY UNIT DISPLAYS ELASTIC MEMBER GROUP FOR WHICH POSITION ADJUSTMENT IS NECESSARY TO SHIFT SELECTED RESONANCE FREQUENCY DISTINGUISHABLY FROM ELASTIC MEMBER GROUP FOR WHICH POSITION ADJUSTMENT IS UNNECESSARY AND DISPLAY LINE INDICATING POSITION ADJUSTMENT DIRECTION

S529 PERFORM FOLLOWING ADJUSTMENT ACCORDING TO SELECTED RESONANCE FREQUENCY TO BE SHIFTED AND SET POSITIONS OF FIRST TO n-TH ELASTIC MEMBER GROUPS:
(1) ADJUST AND SET POSITIONS OF FIRST TO n-TH ELASTIC MEMBER GROUPS SUCH THAT VALUE OF $$(1) \sum_i (k_{i\_zz} r_{pi\_y}^2)$$

CHANGES AND SHIFT RESONANCE FREQUENCY OF x ROTATION
(2) ADJUST AND SET POSITIONS OF FIRST TO n-TH ELASTIC MEMBER GROUPS SUCH THAT VALUE OF $$(2) \sum_i (k_{i\_zz} r_{pi\_x}^2)$$

CHANGES AND SHIFT RESONANCE FREQUENCY OF y ROTATION
(3) ADJUST AND SET POSITIONS OF FIRST TO n-TH ELASTIC MEMBER GROUPS SUCH THAT VALUE OF $$(3) \sum_i (k_{i\_xx} r_{pi\_y}^2 + k_{i\_yy} r_{pi\_x}^2)$$

CHANGES AND SHIFT RESONANCE FREQUENCY OF z ROTATION
(4) SET RIGIDITY $K_{n+1}$ OF n+1-th ELASTIC MEMBER GROUP, ARRANGE n+1-th ELASTIC MEMBER GROUP AT ORIGIN OF xyz COORDINATE SYSTEM, ADJUST VALUE OF $k_{n+1\_xx}$, AND SHIFT RESONANCE FREQUENCY OF x TRANSLATION
(5) SET RIGIDITY $K_{n+1}$ OF n+1-th ELASTIC MEMBER GROUP, ARRANGE n+1-th ELASTIC MEMBER GROUP AT ORIGIN OF xyz COORDINATE SYSTEM, ADJUST VALUE OF $k_{n+1\_yy}$, AND SHIFT RESONANCE FREQUENCY OF y TRANSLATION
(6) SET RIGIDITY $K_{n+1}$ OF n+1-th ELASTIC MEMBER GROUP, ARRANGE n+1-th ELASTIC MEMBER GROUP AT ORIGIN OF xyz COORDINATE SYSTEM, ADJUST VALUE OF $k_{n+1\_zz}$, AND SHIFT RESONANCE FREQUENCY OF z TRANSLATION

S531 RECALCULATE RESONANCE FREQUENCIES OF x TRANSLATION, y TRANSLATION, z TRANSLATION, x ROTATION, y ROTATION, AND z ROTATION FROM DIAGONAL LINEARIZATION TRANSLATIONAL MOTION EQUATION AND DIAGONAL LINEARIZATION ROTATIONAL MOTION EQUATION

S533 DISPLAY RECALCULATED RESONANCE FREQUENCIES OF x TRANSLATION, y TRANSLATION, z TRANSLATION, x ROTATION, y ROTATION, AND z ROTATION

Ⅷ

ADJUSTING METHOD AND ADJUSTING SYSTEM FOR RESONANCE FREQUENCY OF VIBRATION ISOLATOR, VIBRATION ISOLATOR, AND DESIGNING METHOD, DESIGNING SYSTEM, AND MANUFACTURING METHOD FOR VIBRATION ISOLATOR

TECHNICAL FIELD

The present invention relates to an adjusting method and an adjusting system for a resonance frequency of a vibration isolator, the vibration isolator, and a designing method, a designing system, and a manufacturing method for the vibration isolator.

BACKGROUND ART

A vibration isolator is set between a vibration source side and a vibration sensing side and suppresses transmission of vibration.

As the vibration isolator, there has been proposed, for example, a vibration isolator that increases attenuation in resonance to reduce the influence of the resonance of the isolator (see, Patent Literature 1 described below).

PRIOR ART LITERATURE

Patent Literature

Patent Literature 1: National Publication of International Patent Application No. 2014-535026

SUMMARY OF INVENTION

Problem to be Solved by Invention

The vibration isolator described in Patent Literature 1 described above attenuates the influence due to resonance with a viscoelastic material while performing vibration insulation in a high-frequency region. However, the number and the weight of vibration isolators themselves increase according to the dimension and the weight of a target object. Even if the resonance is attenuated, resonance in a fixed level is unavoidable.

In a conventional vibration isolator including a plurality of elastic members, it is necessary to perform selection and changes of the number, the arrangement, and the like of elastic members many times in a trial-and-error manner in order to achieve desired vibration suppression.

Therefore, an object of the present invention is to provide an adjusting method and an adjusting system for a resonance frequency of a vibration isolator and the vibration isolator that prevent resonance of the vibration isolator and with which, for the prevention of the resonance, the numbers and the weight of vibration isolators do not increase and selection and changes of the number, the arrangement, and the like of elastic members configuring the vibration isolator do not need to be performed many times.

An object of the present invention is to provide a designing method, a designing system, and a manufacturing method for a vibration isolator with which designing and manufacturing of a vibration isolator in which resonance does not occur can be easily performed.

Means for Solving Problem

An aspect of the present invention provides an adjusting method for a resonance frequency of a vibration isolator that is in contact with a vibration sensing side structure or a vibration source side structure on one side, the vibration isolator including first to n-th (n is an integer equal to or larger than 3) elastic member groups and/or an n+1-th elastic member group, each of which includes one or more elastic members, the first to n-th elastic member groups and/or the n+1-th elastic member group being located on an xy plane of an xyz coordinate system, one side of the first to n-th elastic member groups and/or the n+1-th elastic member group being a side with which the vibration sensing side structure or the vibration source side structure is in contact, and an xy coordinate system of the xyz coordinate system being a coordinate system obtained by, when a tensor of inertia I with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system being coaxial with the Z axis, the adjusting method including, when rigidity $K_i$ (i=1, 2, ..., and n) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$ of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the xy coordinate system of the first to n-th elastic member groups are represented as $r_{pi\_x}$ and $r_{pi\_y}$, while satisfying $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0,$$

at least one step of:
(1) a first step of adjusting positions of the first to n-th elastic member groups such that a value of $$\sum_i (k_{i\_zz} r_{pi\_y}^2)$$

changes and shifting a resonance frequency of an x-axial rotational motion;

(2) a second step of adjusting the positions of the first to n-th elastic member groups such that a value of $$\sum_i (k_{i\_zz} r_{pi\_x}^2)$$

changes and shifting a resonance frequency of a y-axial rotational motion;

(3) a third step of adjusting the positions of the first to n-th elastic member groups such that a value of $$\sum_i (k_{i\_xx} r_{pi\_y}^2 + k_{i\_yy} r_{pi\_x}^2)$$

changes and shifting a resonance frequency of a z-axial rotational motion;

(4) a fourth step of arranging the n+1-th elastic member group at an origin of the xyz coordinate, adjusting a value of $k_{n+1\_xx}$, and shifting a resonance frequency of an x-direction translational motion;

(5) a fifth step of arranging the n+1-th elastic member group at the origin of the xyz coordinate, adjusting a value of $k_{n+1\_yy}$, and shifting a resonance frequency of a y-direction translational motion; and (6) a sixth step of arranging the n+1-th elastic member group at the origin of the xyz coordinate, adjusting a value of $k_{n+1\_zz}$, and shifting a resonance frequency of a z-direction translational motion. Note that, when one side of the vibration isolator is a side with which the vibration sensing side structure is in contact, another side of the vibration isolator is a side with which the vibration source side structure is in contact and, when the one side of the vibration isolator is the side with which the vibration source side structure is in contact, the other side of the vibration isolator is the side with which the vibration sensing side structure is in contact.

In the adjusting method, $n=4$, the first and third elastic member groups may be located on an x axis of the xyz coordinate system, and the second and fourth elastic member groups are located on a y axis of the xyz coordinate system, the first step may be a step of adjusting a distance between the second and fourth elastic member groups and shifting the resonance frequency of the x-axial rotational motion, the second step may be a step of adjusting a distance between the first and third elastic member groups and shifting the resonance frequency of the y-axial rotational motion, and the third step may be a step of adjusting the distance between the second and fourth elastic member groups and/or the distance between the first and third elastic member groups and shifting the resonance frequency of the z-axial rotational motion.

Rigidities of the first and third elastic member groups may be equal, and rigidities of the second and fourth elastic member groups may be equal, and at least one of the first to third steps may be performed while arranging the first and third elastic member groups symmetrically with respect to the origin on the x axis of the xyz coordinate system and arranging the second and fourth elastic member groups symmetrically with respect to the origin on the y axis of the xyz coordinate system.

An aspect of the present invention provides a vibration isolator that is in contact with a vibration sensing side structure or a vibration source side structure on one side, the vibration isolator including first to n-th (n is an integer equal to or larger than 3) elastic member groups and/or an n+1-th elastic member group, each of which includes one or more elastic members, the first to n-th elastic member groups and/or the n+1-th elastic member group being located on an xy plane of an xyz coordinate system, one side of the first to n-th elastic member groups and/or the n+1-th elastic member group being a side with which the vibration sensing side structure or the vibration source side structure is in contact, and an xy coordinate system of the xyz coordinate system being a coordinate system obtained by, when a tensor of inertia I with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system being coaxial with the Z axis, the vibration isolator further including at least one shifter of: when rigidity $K_i$ (i=1, 2, . . . , and n) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$ of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the xy coordinate system of the first to n-th elastic member groups are represented as $r_{pi\_x}$ and $r_{pi\_y}$, (1) an x-axial rotational motion resonance frequency shifter that, while satisfying $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0,$$

adjusts positions of the first to n-th elastic member groups such that a value of $$\sum_i (k_{i\_zz} r_{pi\_y}^2)$$

changes and shifts a resonance frequency of an x-axial rotational motion;

(2) a y-axial rotational motion resonance frequency shifter that, while satisfying $$\sum_i k_{i\_xx} r_{pi\_x} = \sum_i k_{i\_yy} r_{pi\_y} = 0 \text{ and}$$

$$\sum_i k_{i\_yy} r_{pi\_x} r_{pi\_y} = \sum_i k_{i\_xx} r_{pi\_x} r_{pi\_y} = 0,$$

adjusts the positions of the first to n-th elastic member groups such that a value of $$\sum_i (k_{i\_zz} r_{pi\_x}^2)$$

changes and shifts a resonance frequency of a y-axial rotational motion;

(3) a z-axial rotational motion resonance frequency shifter that, while satisfying $$\sum_i k_{i\_xx} r_{pi\_x} = \sum_i k_{i\_yy} r_{pi\_y} = 0 \text{ and}$$

$$\sum_i k_{i\_yy} r_{pi\_x} r_{pi\_y} = \sum_i k_{i\_xx} r_{pi\_x} r_{pi\_y} = 0,$$

adjusts the positions of the first to n-th elastic member groups such that a value of $$\sum_i (k_{i\_xx} r_{pi\_y}^2 + k_{i\_yy} r_{pi\_x}^2)$$

changes and shifts a resonance frequency of a z-axial rotational motion;

(4) an x-direction translational motion resonance frequency shifter that, while satisfying $$\sum_i k_{i\_xx} r_{pi\_x} = \sum_i k_{i\_yy} r_{pi\_y} = 0 \text{ and}$$

$$\sum_i k_{i\_yy} r_{pi\_x} r_{pi\_y} = \sum_i k_{i\_xx} r_{pi\_x} r_{pi\_y} = 0,$$

arranges the n+1-th elastic member group at an origin of the xyz coordinate, adjusts a value of $k_{n+1\_xx}$, and shifts a resonance frequency of an x-direction translational motion;

(5) a y-axis translational motion resonance frequency shifter that, while satisfying $$\sum_i k_{i\_xx} r_{pi\_x} = \sum_i k_{i\_yy} r_{pi\_y} = 0 \text{ and}$$

$$\sum_i k_{i\_yy} r_{pi\_x} r_{pi\_y} = \sum_i k_{i\_xx} r_{pi\_x} r_{pi\_y} = 0,$$

arranges the n+1-th elastic member group at the origin of the xyz coordinate, adjusts a value of $k_{n+1\_yy}$, and shifts a resonance frequency of a y-direction translational motion; and (6) a z-direction translational motion resonance frequency shifter that, while satisfying, $$\sum_i k_{i\_xx} r_{pi\_x} = \sum_i k_{i\_yy} r_{pi\_y} = 0 \text{ and}$$

$$\sum_i k_{i\_yy} r_{pi\_x} r_{pi\_y} = \sum_i k_{i\_xx} r_{pi\_x} r_{pi\_y} = 0,$$

arranges the n+1-th elastic member group at the origin of the xyz coordinate, adjusts a value of $k_{n+1\_zz}$, and shifts a resonance frequency of a z-direction translational motion. Note that, when one side of the vibration isolator is a side with which the vibration sensing side structure is in contact, another side of the vibration isolator is a side with which the vibration source side structure is in contact and, when the one side of the vibration isolator is the side with which the vibration source side structure is in contact, the other side of the vibration isolator is the side with which the vibration sensing side structure is in contact.

In the vibration isolator, n=4, the first and third elastic member groups may be located on an x axis of the xyz coordinate system, and the second and fourth elastic member groups may be located on a y axis of the xyz coordinate system, the x-axial rotational motion resonance frequency shifter may adjust a distance between the second and fourth elastic member groups and shift the resonance frequency of the x-axial rotational motion, the y-axial rotational motion resonance frequency shifter may adjust a distance between the first and third elastic member groups and shift the resonance frequency of the y-axial rotational motion, and the z-axial rotational motion resonance frequency shifter may adjust the distance between the second and fourth elastic member groups and/or the distance between the first and third elastic member groups and shift the resonance frequency of the z-axial rotational motion.

Rigidities of the first and third elastic member groups may be equal, and rigidities of the second and fourth elastic member groups may be equal, and the x-axial rotational motion resonance frequency shifter, the y-axial rotational motion resonance frequency shifter, and the z-axial rotational motion resonance frequency shifter may perform the shift of the resonance frequency while arranging the first and third elastic member groups symmetrically with respect to the origin on the x axis of the xyz coordinate system and arranging the second and fourth elastic member groups symmetrically with respect to the origin on the y axis of the xyz coordinate system.

An aspect of the present invention provides a vibration isolator that is in contact with a vibration sensing side structure or a vibration source side structure on one side, the vibration isolator including:

a rotating member rotatable around a rotation axis; and a plurality of elastic members movably attached on the rotating member. Note that, when one side of the vibration isolator is a side with which the vibration sensing side structure is in contact, another side of the vibration isolator is a side with which the vibration source side structure is in contact and, when the one side of the vibration isolator is the side with which the vibration source side structure is in contact, the other side of the vibration isolator is the side with which the vibration sensing side structure is in contact.

One or more elastic members may be attachable on a position near the rotating member and the rotation axis.

The plurality of elastic members may include first to fourth elastic member groups, each of which includes one or more elastic members, one side of the first to fourth elastic member groups may be a side with which a vibration sensing side structure or a vibration source side structure is in contact, the vibration isolator may further include a position adjusting mechanism capable of respectively independently adjusting a distance between the first and third elastic member groups and a distance between the second and fourth elastic member groups, a line segment connecting the first and third elastic member groups and a line segment connecting the second and fourth elastic member groups may be orthogonal to one another, and the rotation axis may pass an intersection of the line segment connecting the first and third elastic member groups and the line segment connecting the second and fourth elastic member groups.

In the vibration isolator, the position adjusting mechanism may be capable of adjusting at least one of the distance between the first and third elastic member groups and the distance between the second and fourth elastic member groups such that distances of the elastic member groups from a center of the intersection are equal.

A fifth elastic member group including one or more elastic members may be attachable near the intersection.

An aspect of the present invention provides an adjusting method for a resonance frequency of the vibration isolator, the plurality of elastic members including first to n-th (n is an integer equal to or larger than 3) elastic member groups and/or an n+1-th elastic member group, each of which includes one or more elastic members, the first to n-th elastic member groups and/or the n+1-th elastic member group being located on an xy plane of an xyz coordinate system in which the rotation axis of the rotating member is coaxial with a z axis, one side of the first to n-th elastic member groups and/or the n+1-th elastic member group being a side with which the vibration sensing side structure or the vibration source side structure is in contact, and when the vibration sensing side structure and the vibration source side structure are arranged such that a Z axis coincides with the rotation axis of the rotating member when a tensor of inertia with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

the adjusting method including, when rigidity $K_i$ (i=1, 2, ..., and n) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$ of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the xy coordinate system of the first to n-th elastic member groups are represented as $r_{pi\_x}$ and $r_{pi\_y}$, while satisfying, in the xy coordinate system obtained by rotating an XY coordinate system around a Z axis by $$\theta = \tan^{-1}\left(\frac{2I_{XY}}{I_{XX} - I_{YY}}\right),$$

$$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0,$$

at least one step of;

(1) a first step of adjusting positions of the first to n-th elastic member groups such that a value of $$\sum_i (k_{i\_zz} r_{pi\_y}^2)$$

changes and shifting a resonance frequency of an x-axial rotational motion;

(2) a second step of adjusting the positions of the first to n-th elastic member groups such that a value of $$\sum_i (k_{i\_zz} r_{pi\_x}^2)$$

changes and shifting a resonance frequency of a y-axial rotational motion;

(3) a third step of adjusting the positions of the first to n-th elastic member groups such that a value of $$\sum_i (k_{i\_zz} r_{pi\_y}^2 + k_{i\_yy} r_{pi\_x}^2)$$

changes and shifting a resonance frequency of a z-axial rotational motion;

(4) a fourth step of arranging the n+1-th elastic member group at an origin of the xyz coordinate, adjusting a value of $k_{n+1\_xx}$, and shifting a resonance frequency of an x-direction translational motion;

(5) a fifth step of arranging the n+1-th elastic member group at the origin of the xyz coordinate, adjusting a value of $k_{n+1\_yy}$, and shifting a resonance frequency of a y-direction translational motion; and (6) a sixth step of arranging the n+1-th elastic member group at the origin of the xyz coordinate, adjusting a value of $k_{n+1\_zz}$, and shifting a resonance frequency of a z-direction translational motion.

An aspect of the present invention provides an adjusting method for a resonance frequency of the vibration isolator, the plurality of elastic members including first to fourth elastic member groups and/or a fifth member group, each of which includes one or more elastic members, the first to fourth elastic member groups and/or the fifth elastic member group being located on an xy plane of an xyz coordinate system in which the rotation axis of the rotating member is coaxial with a z axis, one side of the first to fourth elastic member groups and/or the fifth elastic member group being a side with which the vibration sensing side structure or the vibration source side structure is in contact, the adjusting method comprising, when the vibration sensing side structure or the vibration source side structure is arranged such that a Z axis coincides with the rotation axis of the rotating member when a tensor of inertia with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

and when rigidity $K_i$ (i=1, 2, 3, and 4) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_5$ of the n+1-th elastic member group is represented as $$[K_5] = \begin{bmatrix} k_{5\_xx} & 0 & 0 \\ 0 & k_{5\_yy} & 0 \\ 0 & 0 & k_{5\_zz} \end{bmatrix},$$

and an x coordinate and a y coordinate of the xy coordinate system of the first to n-th elastic member groups are represented as $r_{pi\_x}$ and $r_{pi\_y}$, a step of rotating the rotating member around a Z axis such that a line segment connecting the first and third elastic member groups and a line segment connecting the second and fourth elastic member groups coincide with an x axis and a y axis of the xy coordinate system obtained by rotating an XY coordinate system around the Z axis by $$\theta = \tan^{-1}\left(\frac{2I_{XY}}{I_{XX} - I_{YY}}\right);$$

and, when an x coordinate and a y coordinate of the xy coordinate system of the first to fourth elastic member groups are represented as $r_{pi\_x}$ and $r_{pi\_y}$, while satisfying $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0,$$

at least one step of:

(1) a first step of adjusting a distance between the second and fourth elastic member group and shifting a resonance frequency of an x-axial rotational motion;

(2) a second step of adjusting a distance between the first and third elastic member groups and shifting a resonance frequency of a y-axial rotational motion;

(3) a third step of adjusting the distance between the second and fourth elastic member groups and/or the distance between the first and third elastic member groups and shifting a resonance frequency of a z-axial rotational motion;

(4) a fourth step of arranging the n+1-th elastic member group at an origin of the xyz coordinate, adjusting a value of $k_{n+1\_xx}$, and shifting a resonance frequency of an x-direction translational motion;

(5) a fifth step of arranging the n+1-th elastic member group at the origin of the xyz coordinate, adjusting a value of $k_{n+1\_yy}$, and shifting a resonance frequency of a y-direction translational motion; and (6) a sixth step of arranging the n+1-th elastic member group at the origin of the xyz coordinate, adjusting a value of $k_{n+1\_zz}$, and shifting a resonance frequency of a z-direction translational motion.

Rigidities of the first and third elastic member groups may be equal, and rigidities of the second and fourth elastic member groups may be equal, and at least one of the first to third steps may be performed while arranging the first and third elastic member groups symmetrically with respect to the origin on the x axis of the xyz coordinate system and arranging the second and fourth elastic member groups symmetrically with respect to the origin on the y axis of the xyz coordinate system.

An aspect of the present invention provides a designing method for a vibration isolator that is in contact with a vibration sensing side structure or a vibration source side structure on one side, the vibration isolator including first to n-th (n is an integer equal to or larger than 3) elastic member groups and/or an n+1-th elastic member group, each of which includes one or more elastic members, the first to n-th elastic member groups and/or the n+1-th elastic member group being located on an xy plane of an xyz coordinate system, one side of the first to n-th elastic member groups and/or the n+1-th elastic member group being a side with which the vibration sensing side structure or the vibration source side structure is in contact, and an xy coordinate system of the xyz coordinate system being a coordinate system obtained by, when a tensor of inertia I with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system being coaxial with the Z axis, when rigidity $K_i$ (i=1, 2, ..., and n) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$ of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the xy coordinate system of the first to n-th elastic member groups are represented as $r_{pi\_x}$ and $r_{pi\_y}$, positions of the first to n-th elastic member groups and/or the n+1-th elastic member group are set to satisfy $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0.$$

Note that, when one side of the vibration isolator is a side with which the vibration sensing side structure is in contact, another side of the vibration isolator is a side with which the vibration source side structure is in contact and, when the one side of the vibration isolator is the side with which the vibration source side structure is in contact, the other side of the vibration isolator is the side with which the vibration sensing side structure is in contact.

When mass of the vibration sensing side structure or the vibration source side structure is represented as m, a z coordinate in the xyz coordinate system of a center of gravity of the vibration sensing side structure or the vibration source side structure is represented as $r_{pi\_z}$, and a tensor of inertia I' with respect to the xyz coordinate system is represented as $$I' = \begin{bmatrix} I_{xx} & I_{xy} & I_{xz} \\ I_{xy} & I_{yy} & I_{yx} \\ I_{xz} & I_{yz} & I_{zz} \end{bmatrix},$$

the designing method may include a step of calculating a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} + r_{pi\_z}\Theta_x\} = f_2(r_{g\_y}, \Theta_x)$$

$$\ddot{r}_{g\_z} = -\frac{1}{m}\sum_i k_{i\_zz} r_{g\_z} = f_3(r_{g\_z})$$

and
a diagonal linearization rotational motion equation $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz} r_{pi\_y}^2\Theta_x\right] = f_4(r_{g\_y}, \Theta_x)$$

$$\ddot{\Theta}_y = -\frac{1}{I_{yy}}\left[\sum_i \{k_{i\_xx}(r_{pi\_z}r_{g\_x} + r_{pi\_z}^2\Theta_y)\} + \sum_i k_{i\_zz} r_{pi\_y}^2\Theta_x\right] = f_5(r_{g\_x}, \Theta_y)$$

-continued $$\ddot{\Theta}_z = -\frac{1}{I_{zz}} \sum_i \{(k_{i\_xx} r_{pi\_y}^2 + k_{i\_yy} r_{pi\_x}^2)\Theta_z\} = f_6(\Theta_z),$$

and to prevent the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion from coinciding with frequency related to occurrence of resonance, at least one step of;

(1) a first step of adjusting positions of the first to n-th elastic member groups such that a value of $$\sum_i (k_{i\_zz} r_{pi\_y}^2)$$

changes and shifting the resonance frequency of the x-axial rotational motion;

(2) a second step of adjusting the positions of the first to n-th elastic member groups such that a value of $$\sum_i (k_{i\_zz} r_{pi\_x}^2)$$

changes and shifting the resonance frequency of the y-axial rotational motion;

(3) a third step of adjusting the positions of the first to n-th elastic member groups such that a value of $$\sum_i (k_{i\_xx} r_{pi\_y}^2 + k_{i\_yy} r_{pi\_x}^2)$$

changes and shifting the resonance frequency of the z-axial rotational motion;

(4) a fourth step of arranging the n+1-th elastic member group at an origin of the xyz coordinate, adjusting a value of $k_{n+1\_xx}$, and shifting the resonance frequency of the x-direction translational motion;

(5) a fifth step of arranging the n+1-th elastic member group at the origin of the xyz coordinate, adjusting a value of $k_{n+1\_yy}$, and shifting the resonance frequency of the y-direction translational motion; and (6) a sixth step of arranging the n+1-th elastic member group at the origin of the xyz coordinate, adjusting a value of $k_{n+1\_zz}$, and shifting the resonance frequency of the z-direction translational motion.

In the designing method, n=4, the first and third elastic member groups may be located on an x axis of the xyz coordinate system, and the second and fourth elastic member groups may be located on a y axis of the xyz coordinate system, the first step may be a step of adjusting a distance between the second and fourth elastic member groups and shifting the resonance frequency of the x-axial rotational motion, the second step may be a step of adjusting a distance between the first and third elastic member groups and shifting the resonance frequency of the y-axial rotational motion, and the third step may be a step of adjusting the distance between the second and fourth elastic member groups and/or the distance between the first and third elastic member groups and shifting the resonance frequency of the z-axial rotational motion.

Rigidities of the first and third elastic member groups may be equal, and rigidities of the second and fourth elastic member groups may be equal, and at least one of the first to third steps may be performed while arranging the first and third elastic member groups symmetrically with respect to the origin on the x axis of the xyz coordinate system and arranging the second and fourth elastic member groups symmetrically with respect to the origin on the y axis of the xyz coordinate system.

An aspect of the present invention provides a designing method for a vibration isolator in contact with a vibration sensing side structure or a vibration source side structure on one side, the designing method being executed by a computer, the vibration isolator including first to n-th (n is an integer equal to or larger than 3) elastic member groups, each of which includes one or more elastic members, the first to n-th elastic member groups being located on an xy plane of an xyz coordinate system, one side of the first to n-th elastic member groups and/or an n+1-th elastic member group being a side with which the vibration sensing side structure or the vibration source side structure is in contact, and an xy coordinate system of the xyz coordinate system being a coordinate system obtained by, when a tensor of inertia I with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system being coaxial with the Z axis, the designing method including:

a step of setting the tensor of inertia I with respect to the XYZ coordinate system having the origin in the center of gravity of the vibration sensing side structure or the vibration source side structure;

a step of setting a number n of the elastic member groups;

a step of setting rigidity $K_i$ (i=1, 2, . . . , and n) of the first to n-th elastic member groups $$[K_i] = \begin{bmatrix} k_{i\_xx} & 0 & 0 \\ 0 & k_{i\_yy} & 0 \\ 0 & 0 & k_{i\_zz} \end{bmatrix};$$

and a step of, when an x coordinate and a y coordinate of the xy coordinate system of the first to n-th elastic member groups are represented as $r_{pi\_x}$ and $r_{pi\_y}$, setting positions of the first to n-th elastic member groups to satisfy $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0.$$

Note that, when one side of the vibration isolator is a side with which the vibration sensing side structure is in contact, another side of the vibration isolator is a side with which the vibration source side structure is in contact and, when the one side of the vibration isolator is the side with which the vibration source side structure is in contact, the other side of the vibration isolator is the side with which the vibration sensing side structure is in contact.

The designing method can further include:

a step of setting mass m of the vibration sensing side structure or the vibration source side structure;

a step of setting a z coordinate $r_{pi\_z}$ in the xyz coordinate system of a center of gravity of the vibration sensing side structure or the vibration source side structure, a step of setting a tensor of inertia I' with respect to the xyz coordinate system $$I' = \begin{bmatrix} I_{xx} & I_{xy} & I_{xz} \\ I_{xy} & I_{yy} & I_{yz} \\ I_{xz} & I_{yz} & I_{zz} \end{bmatrix};$$

a step of setting a frequency related to occurrence of resonance; and a step of calculating a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x)$$

$$\ddot{r}_{g\_z} = -\frac{1}{m}\sum_i k_{i\_zz} r_{g\_z} = f_3(r_{g\_z})$$

and a diagonal linearization rotational motion equation $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz} r_{pi\_y}^2 \Theta_x\right] = f_4(r_{g\_y}, \Theta_x)$$

$$\ddot{\Theta}_y = -\frac{1}{I_{yy}}\left[\sum_i \{k_{i\_xx}(r_{pi\_z}r_{g\_x} + r_{pi\_z}^2\Theta_y)\} + \sum_i k_{i\_zz} r_{pi\_x}^2 \Theta_y\right] = f_5(r_{g\_x}, \Theta_y)$$

$$\ddot{\Theta}_z = -\frac{1}{I_{zz}}\sum_i \{(k_{i\_xx} r_{pi\_y}^2 + k_{i\_yy} r_{pi\_x}^2)\Theta_z\} = f_6(\Theta_z);$$

and, to prevent the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion from coinciding with the set frequency related to occurrence of resonance, at least one step of (1) a first step of adjusting and setting positions of the first to n-th elastic member groups such that a value of $$\sum_i (k_{i\_zz} r_{pi\_y}^2)$$

changes and shifting the resonance frequency of the x-axial rotational motion;

(2) a second step of adjusting and setting the positions of the first to n-th elastic member groups such that a value of $$\sum_i (k_{i\_zz} r_{pi\_x}^2)$$

changes and shifting the resonance frequency of the y-axial rotational motion;

(3) a third step of adjusting and setting the positions of the first to n-th elastic member groups such that a value of $$\sum_i (k_{i\_xx} r_{pi\_y}^2 + k_{i\_yy} r_{pi\_x}^2)$$

changes and shifting the resonance frequency of the z-axial rotational motion;

(4) a fourth step of setting rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at an origin of the xyz coordinate, adjusting a value of $k_{n+1\_xx}$, and shifting the resonance frequency of the x-direction translational motion;

(5) a fifth step of setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_yy}$, and shifting the resonance frequency of the y-direction translational motion; and (6) a sixth step of setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_zz}$, and shifting the resonance frequency of the z-direction translational motion.

The designing method may further include:

a step of setting mass m of the vibration sensing side structure or the vibration source side structure;

a step of setting a z coordinate $r_{pi\_z}$ in the xyz coordinate system of a center of gravity of the vibration sensing side structure or the vibration source side structure, a step of setting a tensor of inertia I with respect to the xyz coordinate system $$I' = \begin{bmatrix} I_{xx} & I_{xy} & I_{xz} \\ I_{xy} & I_{yy} & I_{yx} \\ I_{xy} & I_{yx} & I_{zz} \end{bmatrix},$$

a step of calculating a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} + r_{pi\_z}\Theta_x\} = f_2(r_{g\_y}, \Theta_x)$$

$$\ddot{r}_{g\_z} = -\frac{1}{m}\sum_i k_{i\_zz}r_{g\_z} = f_3(r_{g\_z})$$

and a diagonal linearization rotational motion equation $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz}r_{pi\_y}^2\Theta_x\right] = f_4(r_{g\_y}, \Theta_x)$$

$$\ddot{\Theta}_y = -\frac{1}{I_{yy}}\left[\sum_i \{k_{i\_xx}(r_{pi\_z}r_{g\_x} + r_{pi\_z}^2\Theta_y)\} + \sum_i k_{i\_zz}r_{pi\_x}^2\Theta_y\right] = f_5(r_{g\_x}, \Theta_y)$$

$$\ddot{\Theta}_z = -\frac{1}{I_{zz}}\sum_i \{(k_{i\_zz}r_{pi\_y}^2 + k_{i\_yy}r_{pi\_x}^2)\Theta_z\} = f_6(\theta_z);$$

a step of displaying set positions of the first to n-th elastic member groups and the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion; and a step of prompting for selection and input of a resonance frequency to be shifted out of the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion; and, when the selection and input of the resonance frequency to be shifted is performed, according to the selected resonance frequency to be shifted, at least one step of;

(1) a first step of adjusting and setting positions of the first to n-th elastic member groups such that a value of $$\sum_i (k_{i\_zz}r_{pi\_y}^2)$$

changes and shifting the resonance frequency of the x-axial rotational motion;

(2) a second step of adjusting and setting the positions of the first to n-th elastic member groups such that a value of $$\sum_i (k_{i\_zz} r_{pi\_x}^2)$$

changes and shifting the resonance frequency of the y-axial rotational motion;

(3) a third step of adjusting and setting the positions of the first to n-th elastic member groups such that a value of $$\sum_i (k_{i\_xx} r_{pi\_y}^2 + k_{i\_yy} r_{pi\_x}^2)$$

changes and shifting the resonance frequency of the z-axial rotational motion;

(4) a fourth step of setting rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at an origin of the xyz coordinate, adjusting a value of $k_{n+1\_xx}$, and shifting the resonance frequency of the x-direction translational motion;

(5) a fifth step of setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_yy}$, and shifting the resonance frequency of the y-direction translational motion; and (6) a sixth step of setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_zz}$, and shifting the resonance frequency of the z-direction translational motion.

In the designing method, $n=4$, the first and third elastic member groups may be located on an x axis of the xyz coordinate system, and the second and fourth elastic member groups may be located on a y axis of the xyz coordinate system, the first step may be a step of adjusting a distance between the second and fourth elastic member groups and shifting the resonance frequency of the x-axial rotational motion, the second step may be a step of adjusting a distance between the first and third elastic member groups and shifting the resonance frequency of the y-axial rotational motion, and the third step may be a step of adjusting the distance between the second and fourth elastic member groups and/or the distance between the first and third elastic member groups and shifting the resonance frequency of the z-axial rotational motion.

Rigidities of the first and third elastic member groups may be equal, and rigidities of the second and fourth elastic member groups may be equal, and at least one of the first to third steps may be performed while arranging the first and third elastic member groups symmetrically with respect to the origin on the x axis of the xyz coordinate system and arranging the second and fourth elastic member groups symmetrically with respect to the origin on the y axis of the xyz coordinate system.

The step of setting the tensor of inertia I' with respect to the xyz coordinate system may be a step of calculating the tensor of inertia I' on the basis of a tensor of inertia I with respect to the XYZ coordinate system.

The designing method may further include a step of setting an elastic member group arrangeable range, and the setting of the positions of the first to n-th elastic member groups may be performed within the elastic member group arrangeable range.

The set positions of the first to n-th elastic member groups may be displayed together with the elastic-member group arrangeable range.

The set positions of the first to n-th elastic member groups may be displayed together with the x axis and a y axis.

In the designing method, $n=4$, the first and third elastic member groups may be located on an x axis of the xyz coordinate system, and the second and fourth elastic member groups may be located on a y axis of the xyz coordinate system, the first step may be a step of adjusting a distance between the second and fourth elastic member groups and shifting the resonance frequency of the x-axial rotational motion, the second step may be a step of adjusting a distance between the first and third elastic member groups and shifting the resonance frequency of the y-axial rotational motion, the third step may be a step of adjusting the distance between the second and fourth elastic member groups and/or the distance between the first and third elastic member groups and shifting the resonance frequency of the z-axial rotational motion, and the designing method may further include a step of displaying an elastic member group for which position adjustment is necessary in order to shift the selected resonance frequency to be shifted distinguishably from an elastic member group for which the position adjustment is unnecessary and displaying a line indicating a position adjustment direction.

Rigidities of the first and third elastic member groups may be equal, and rigidities of the second and fourth elastic member groups may be equal, and at least one of the first to third steps may be performed while, when an instruction for moving one of the first and third elastic member groups on the x axis is input, arranging and displaying the other elastic member groups symmetrically with respect to the origin and, when an instruction for moving one of the second and fourth elastic member groups on the y axis is input, arranging and displaying the other elastic member group symmetrically with respect to the origin.

An aspect of the present invention provides a program for causing a computer to execute the designing method for the vibration isolator.

An aspect of the present invention provides a storage medium in which the program is stored.

An aspect of the present invention provides a manufacturing method for a vibration isolator including:

a step of designing a vibration isolator according to the designing method; and a step of manufacturing the designed vibration isolator.

An aspect of the present invention provides a manufacturing method for a vibration isolator including:

a step of designing a vibration isolator according to the designing method; and a step of manufacturing a structure to which the designed vibration isolator is attached.

An aspect of the present invention is a designing system for a vibration isolator in contact with a vibration sensing side structure or a vibration source side structure on one side, the vibration isolator including first to n-th (n is an integer equal to or larger than 3) elastic member groups, each of which includes one or more elastic members, the first to n-th elastic member groups being located on an xy plane of an xyz coordinate system, one side of the first to n-th elastic member groups and/or an n+1-th elastic member group being a side with which the vibration sensing side structure or the vibration source side structure is in contact, and an xy coordinate system of the xyz coordinate system being a coordinate system obtained by, when a tensor of inertia I with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system being coaxial with the Z axis, the designing system including:

a tensor-of-inertia setting unit that sets the tensor of inertia I with respect to the XYZ coordinate system having the origin in the center of gravity of the vibration sensing side structure or the vibration source side structure;

a number-of-elastic-member-groups setting unit that sets a number n of the elastic member groups;

a rigidity setting section that sets rigidity $K_i$ (i=1, 2, ..., and n) of the first to n-th elastic member groups $$[K_i] = \begin{bmatrix} k_{i\_xx} & 0 & 0 \\ 0 & k_{i\_yy} & 0 \\ 0 & 0 & k_{i\_zz} \end{bmatrix};$$

and an elastic-member-group-position setting section that, when an x coordinate and a y coordinate of the xy coordinate system of the first to n-th elastic member groups are represented as $r_{pi\_x}$ and $r_{pi\_y}$, sets positions of the first to n-th elastic member groups to satisfy $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0.$$

Note that, when one side of the vibration isolator is a side with which the vibration sensing side structure is in contact, another side of the vibration isolator is a side with which the vibration source side structure is in contact and, when the one side of the vibration isolator is the side with which the vibration source side structure is in contact, the other side of the vibration isolator is the side with which the vibration sensing side structure is in contact.

The designing system may further include:

a rigid-body-mass setting unit that sets mass m of the vibration sensing side structure or the vibration source side structure;

a rigid-body-center-of-gravity-coordinate setting unit that sets a z coordinate $r_{pi\_z}$ in the xyz coordinate system of a center of gravity of the vibration sensing side structure or the vibration source side structure;

a converted-tensor-of-inertia setting unit that sets a tensor of inertia I' with respect to the xyz coordinate system $$I' = \begin{bmatrix} I_{xx} & I_{xy} & I_{xz} \\ I_{xy} & I_{yy} & I_{yx} \\ I_{xz} & I_{yz} & I_{zz} \end{bmatrix};$$

a resonance-frequency calculating unit that calculates a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x)$$

$$\ddot{r}_{g\_z} = -\frac{1}{m}\sum_i k_{i\_zz} r_{g\_z} = f_3(r_{g\_z})$$

and
a diagonal linearization rotational motion equation $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz}r_{pi\_y}^2\Theta_x\right] = f_4(r_{g\_y}, \Theta_x)$$

-continued $$\ddot{\Theta}_y = -\frac{1}{I_{yy}}\left[\sum_i \{k_{i\_xx}(r_{pi\_z}r_{g\_x} + r_{pi\_z}^2 \Theta_y)\} + \sum_i k_{i\_zz}r_{pi\_x}^2 \Theta_y\right] = f_5(r_{g\_x}, \Theta_y)$$

$$\ddot{\Theta}_z = -\frac{1}{I_{zz}}\sum_i \{(k_{i\_xx}r_{pi\_y}^2 + k_{i\_yy}r_{pi\_x}^2)\Theta_z\} = f_6(\theta_z);$$

a resonance-related-frequency setting unit that sets a frequency related to occurrence of resonance; and an elastic-member-group-position adjusting unit that performs, to prevent the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion from coinciding with the set frequency related to occurrence of resonance, at least one of processings among:

(1) first processing for adjusting and setting positions of the first to n-th elastic member groups such that a value of $$\sum_i (k_{i\_zz}r_{pi\_y}^2)$$

changes and shifting the resonance frequency of the x-axial rotational motion;

(2) second processing for adjusting and setting the positions of the first to n-th elastic member groups such that a value of $$\sum_i (k_{i\_zz}r_{pi\_x}^2)$$

changes and shifting the resonance frequency of the y-axial rotational motion;

(3) third processing for adjusting and setting the positions of the first to n-th elastic member groups such that a value of $$\sum_i (k_{i\_xx}r_{pi\_y}^2 + k_{i\_yy}r_{pi\_x}^2)$$

changes and shifting the resonance frequency of the z-axial rotational motion;

(4) fourth processing for setting rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at an origin of the xyz coordinate, adjusting a value of $k_{n+1\_xx}$, and shifting the resonance frequency of the x-direction translational motion;

(5) fifth processing for setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_yy}$, and shifting the resonance frequency of the y-direction translational motion; and (6) sixth processing for setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_zz}$, and shifting the resonance frequency of the z-direction translational motion.

The designing system can further include:

a rigid-body-mass setting unit that sets mass m of the vibration sensing side structure or the vibration source side structure;

a rigid-body-center-of-gravity-coordinate setting unit that sets a z coordinate $r_{pi\_z}$ in the xyz coordinate system of a center of gravity of the vibration sensing side structure or the vibration source side structure;

a converted-tensor-of-inertia setting unit that sets a tensor of inertia I' with respect to the xyz coordinate system $$I' = \begin{bmatrix} I_{xx} & I_{xy} & I_{xz} \\ I_{xy} & I_{yy} & I_{yx} \\ I_{xz} & I_{yz} & I_{zz} \end{bmatrix};$$

a resonance-frequency calculating unit that calculates a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x)$$

-continued $$\ddot{r}_{g\_z} = -\frac{1}{m}\sum_i k_{i\_zz}r_{g\_z} = f_3(r_{g\_z})$$

and
a diagonal linearization rotational motion equation $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz}r_{pi\_y}^2\Theta_x\right] = f_4(r_{g\_y}, \Theta_x)$$

$$\ddot{\Theta}_y = -\frac{1}{I_{yy}}\left[\sum_i \{k_{i\_xx}(r_{pi\_z}r_{g\_x} + r_{pi\_z}^2\Theta_y)\} + \sum_i k_{i\_zz}r_{pi\_x}^2\Theta_y\right] = f_5(r_{g\_x}, \Theta_y)$$

$$\ddot{\Theta}_z = -\frac{1}{I_{zz}}\sum_i \{(k_{i\_xx}r_{pi\_y}^2 + k_{i\_yy}r_{pi\_x}^2)\Theta_z\} = f_6(\theta_z);$$

an elastic-member-group-arrangement display unit that displays set positions of the first to n-th elastic member groups and the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion;

a resonance-frequency selecting and inputting unit that prompts for selection and input of a resonance frequency to be shifted out of the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion; and an elastic-member-group-position adjusting unit that, when the selection and input of the resonance frequency to be shifted is performed, according to the selected resonance frequency to be shifted, performs at least one of processings among:

(1) first processing for adjusting and setting positions of the first to n-th elastic member groups such that a value of $$\sum_i (k_{i\_zz}r_{pi\_y}^2)$$

changes and shifting the resonance frequency of the x-axial rotational motion;

(2) second processing for adjusting and setting the positions of the first to n-th elastic member groups such that a value of $$\sum_i (k_{i\_zz}r_{pi\_x}^2)$$

changes and shifting the resonance frequency of the y-axial rotational motion;

(3) third processing for adjusting and setting the positions of the first to n-th elastic member groups such that a value of $$\sum_i (k_{i\_xx}r_{pi\_y}^2 + k_{i\_yy}r_{pi\_x}^2)$$

changes and shifting the resonance frequency of the z-axial rotational motion;

(4) a fourth processing of setting rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at an origin of the xyz coordinate, adjusting a value of $k_{n+1\_xx}$, and shifting the resonance frequency of the x-direction translational motion;

(5) fifth processing for setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_yy}$, and shifting the resonance frequency of the y-direction translational motion; and (6) sixth processing for setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_zz}$, and shifting the resonance frequency of the z-direction translational motion.

In the designing system, n=4, the first and third elastic member groups can be located on an x axis of the xyz coordinate system, and the second and fourth elastic member groups can be located on a y axis of the xyz coordinate system, the first processing can be processing for adjusting a distance between the second and fourth elastic member groups and shifting the resonance frequency of the x-axial rotational motion, the second processing can be processing for adjusting a distance between the first and third elastic member groups and shifting the resonance frequency of the y-axial rotational motion, and the third processing can be processing for adjusting the distance between the second and fourth elastic member groups and/or the distance between the first and third elastic member groups and shifting the resonance frequency of the z-axial rotational motion.

Rigidities of the first and third elastic member groups can be equal, and rigidities of the second and fourth elastic member groups can be equal, and at least one of the first processing to the third processing can be performed while arranging the first and third elastic member groups symmetrically with respect to the origin on the x axis of the xyz coordinate system and arranging the second and fourth elastic member groups symmetrically with respect to the origin on the y axis of the xyz coordinate system.

The converted-tensor-of-inertia setting unit can calculate the tensor of inertia I' on the basis of a tensor of inertia I with respect to the XYZ coordinate system.

The designing system can further include an elastic-member-group-arrangeable-range setting unit that sets an elastic member group arrangeable range, and the setting of the positions of the first to n-th elastic member groups can be performed within the elastic member group arrangeable range.

The elastic-member-group-arrangement display unit can display the set positions of the first to n-th elastic member groups together with the elastic-member group arrangeable range.

The elastic-member group-arrangement display unit can display the set positions of the first to n-th elastic member groups together with the x axis and a y axis.

In the designing system, $n=4$, the first and third elastic member groups can be located on an x axis of the xyz coordinate system, and the second and fourth elastic member groups can be located on a y axis of the xyz coordinate system, the first processing can be processing for adjusting a distance between the second and fourth elastic member groups and shifting the resonance frequency of the x-axial rotational motion, the second processing can be processing for adjusting a distance between the first and third elastic member groups and shifting the resonance frequency of the y-axial rotational motion, the third processing can be processing for adjusting the distance between the second and fourth elastic member groups and/or the distance between the first and third elastic member groups and shifting the resonance frequency of the z-axial rotational motion, and the elastic-member-group-arrangement display unit can display an elastic member group for which position adjustment is necessary in order to shift the selected resonance frequency to be shifted distinguishably from an elastic member group for which the position adjustment is unnecessary and display a line indicating a position adjustment direction.

Rigidities of the first and third elastic member groups can be equal, and rigidities of the second and fourth elastic member groups can be equal, and at least one of the first processing to the third processing can be performed while, when an instruction for moving one of the first and third elastic member groups on the x axis is input, arranging and displaying the other elastic member groups symmetrically with respect to the origin and, when an instruction for moving one of the second and fourth elastic member groups on the y axis is input, arranging and displaying the other elastic member group symmetrically with respect to the origin.

In this specification and the claims, the "frequency related to occurrence of resonance" manes a frequency at which a resonance phenomenon occurs or is assumed to occur in a vibration response of a vibration sensing side structure at the time when a vibration source is actuated in a system of a vibration source side structure—a vibration isolator—a vibration sensing side structure.

Advantageous Effects of Invention

With the adjusting method and the adjusting system for a resonance frequency of a vibration isolator and the vibration isolator according to the present invention, it is possible to suppress resonance of the vibration isolator and, for the prevention of the resonance, the numbers and the weight of vibration isolators do not increase and selection and changes of the number, the arrangement, and the like of elastic members configuring the vibration isolator do not need to be performed many times.

With the designing method, the designing system, and the manufacturing method for a vibration isolator according to the present invention, it is possible to easily perform designing and manufacturing of a vibration isolator in which resonance does not occur.

BRIEF DESCRIPTION OF DRAWINGS

FIG. 12 is an example of a graph showing, concerning a frequency, a relation between a vibration transmission ratio and a vibration input.

FIG. 14B is a flowchart of the adjusting method for a resonance frequency of the vibration isolator according to the first embodiment of the present invention.

FIG. 19A is a flowchart of an adjusting method for a resonance frequency of the vibration isolator according to the second embodiment of the present invention.

FIG. 20A is a flowchart of a designing method for a vibration isolator according to a third embodiment of the present invention.

FIG. 25B is a flowchart of the designing processing of the vibration isolator designing system according to the fifth embodiment of the present invention.

FIG. 25C is a flowchart of the designing processing of the vibration isolator designing system according to the fifth embodiment of the present invention.

DESCRIPTION OF EMBODIMENTS

Some illustrative embodiments of the present invention are explained below with reference to the drawings.
(A Principle of an Adjusting Method for a Resonance Frequency of a Vibration Isolator)

First, a principle of an adjusting method for a resonance frequency of a vibration isolator of the present invention is explained with reference to FIG. 1.
<An Analysis Model and an Equation of Motion>

Figure 1:
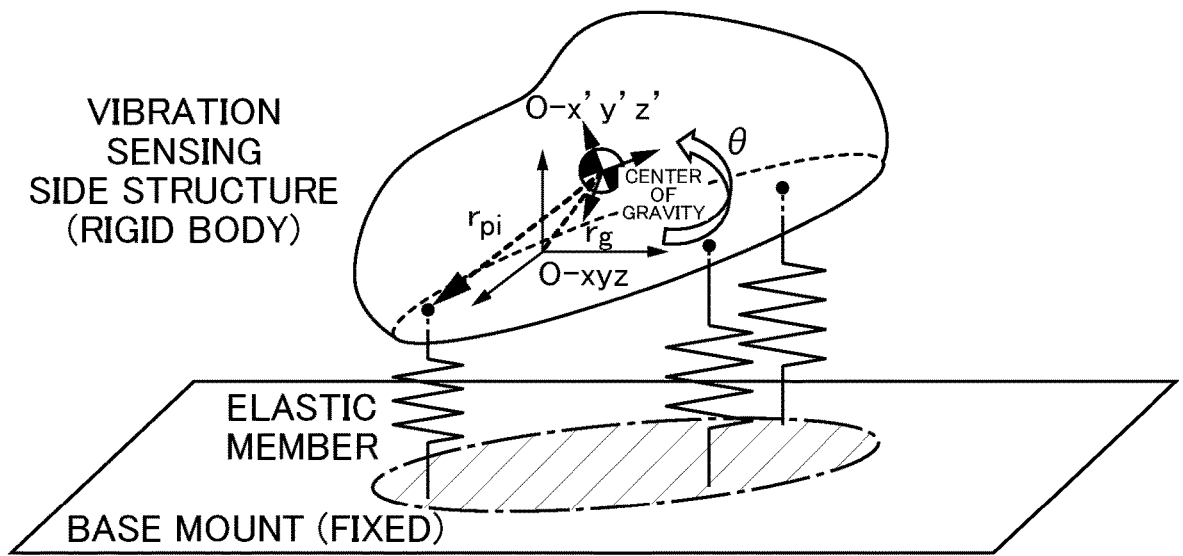
FIG. 1 is a diagram showing an analysis model of a vibration isolator.

FIG. 1 is a diagram showing an analysis model of the vibration isolator. In this analysis model, one end of an elastic member configuring the vibration isolator is in contact with a fixed base mount of the vibration isolator. A vibration sensing side structure, which is a rigid body, is in contact with the other end of the elastic member. The rigid body may be a vibration source side structure.

Definition of signs used below are shown in Table 1.

TABLE 1

| Sign | | |
|---|---|---|
| | $( )^T$ | Representing a transposed matrix |
| | $(\sim)$ | Representing a matrix synonymous with an outer product of a vector component. $a \times b = E^O[\tilde{a}][b]$ |
| | $(\cdot)$ | Representing time differential |
| | $[ ]$ | Representing a component of a vector in a coordinate system under consideration |
| Coordinate system | O-xyz | Inertia coordinate system |
| | O-x'y'z' | Vibration sensing side structure (rigid body) fixed coordinate system (The origin is a vibration sensing side structure (rigid body) center of gravity) |
| Time variable | $\omega$ | Angular velocity vector of a vibration sensing side structure (rigid body) |
| | $r_g$ | A position vector representing a vibration sensing side structure center of gravity position from the inertial coordinate system origin |

TABLE 1-continued

| | | |
|---|---|---|
| | $\Theta$ | A Eulerian angle (1-2-3) of a vibration sensing side structure coordinate system viewed from the inertial coordinate system |
| | $E(\Theta)$ | A coordinate transformation matrix from the vibration sensing side structure coordinate system into the inertial coordinate system |
| | $E_u(\Theta)$ | transformation matrix of $\Theta$ and $\omega$ taken into account at the Eulerian angle (1-2-3) |
| | L | Lagrangian |
| | U | Potential energy of a system |
| | T | Kinetic energy of the system |
| Initial condition | $\omega_0$ | Initial value of an angular velocity vector of the vibration sensing side structure (the rigid body) |
| | $r_{g0}$ | An initial value of a position vector representing a vibration sensing side structure center of gravity position from the inertia coordinate system origin |
| | $\Theta_0$ | An initial value of an Eulerian angle (1-2-3) of the vibration sensing side structure coordinate system viewed from the inertia coordinate system |
| Design value of physical value | i | Number of elastic members |
| | $[K_i]$ | A rigidity matrix of an elastic member |
| | $[M]$ | A mass matrix of the vibration sensing side structure (the rigid body) |
| | $[I]$ | Tensor of inertia |
| | $r_{Pi}$ | A position vector from a vibration sensing side structure (rigid body) mass center to a vibration sensing side structure attachment point of the elastic member (the other end of the elastic member) |

<Derivation of an Equation of Motion of Lagrange>

In the analysis model shown in FIG. 1, kinetic energy T of a system and potential energy U of the system are respectively as shown below.

$$T = \frac{1}{2}\{\omega^T I \omega + \dot{r}_g^T M \dot{r}_g\}$$

$$U = \sum_i \frac{1}{2}\{(r_g - r_{g0} + r_{pi} + r_{pio})^T K_i (r_g - r_{g0} + r_{pi} + r_{pio})\}$$

From the above, Lagrangian L is as follows.

$$L = T - U$$

$$= \frac{1}{2}\omega I \omega + \dot{r}_g M \dot{r}_g - \sum_i \frac{1}{2}\{(r_g - r_{g0} + r_{pi} + r_{pio}) K_i (r_g - r_{g0} + r_{pi} + r_{pio})\}$$

Accordingly, an equation of motion of Lagrange can be derived as follows.

$$\frac{d}{dt}\frac{\partial L}{\partial [\dot{r}_g]} - \frac{\partial L}{\partial [r_g]} = Q$$

$$\frac{d}{dt}\frac{\partial L}{\partial [\dot{\theta}]} - \frac{\partial L}{\partial [\theta]} = N$$

Terms are calculated as follows.

$$\frac{d}{dt}\frac{\partial L}{\partial [\dot{r}_g]} = [M][\ddot{r}_g] - \frac{\partial L}{\partial [r_g]} =$$

$$\sum_i [K_i]\{[r_g] - [r_{g0}] + ([E(\Theta)] - [E(\Theta_0)])[r_{pi}]\}$$

$$\frac{d}{dt}\frac{\partial L}{\partial [\dot{\Theta}]} =$$

$$[E_u(\Theta)]^T [I][\dot{\omega}] + [\dot{E}_u(\Theta)]^T [I][\omega] + [E_u(\Theta)]^T [\dot{I}][\omega] - \frac{\partial L}{\partial [\Theta]} =$$

$$-\begin{pmatrix} [\dot{\theta}]^T \frac{\partial [E_u(\Theta)]^T}{\partial \Theta_1} \\ [\dot{\theta}]^T \frac{\partial [E_u(\Theta)]^T}{\partial \Theta_2} \\ [\dot{\theta}]^T \frac{\partial [E_u(\Theta)]^T}{\partial \Theta_3} \end{pmatrix} [I][\omega] + \sum_i \begin{pmatrix} [r_{pi}]^T \frac{\partial [E(\Theta)]^T}{\partial \Theta_1} \\ [r_{pi}]^T \frac{\partial [E(\Theta)]^T}{\partial \Theta_2} \\ [r_{pi}]^T \frac{\partial [E(\Theta)]^T}{\partial \Theta_3} \end{pmatrix} [K_i] \Big\{ [r_g] - [r_{g0}] +$$

$$\sum_i ([E(\Theta)] - [E(\Theta_0)])[r_{pi}] \Big\}$$

The following definition is used in development of formula.

$$[\omega] = [E_u(\Theta)][\dot{\Theta}] = \begin{bmatrix} \cos\Theta_2\cos\Theta_3 & \sin\Theta_3 & 0 \\ -\cos\Theta_2\sin\Theta_3 & \cos\Theta_3 & 0 \\ \sin\Theta_2 & 0 & 1 \end{bmatrix} \begin{bmatrix} \dot{\Theta}_1 \\ \dot{\Theta}_2 \\ \dot{\Theta}_3 \end{bmatrix}$$

-continued $$[E(\Theta)] = \begin{bmatrix} \cos\Theta_2\cos\Theta_3 & -\cos\Theta_2\sin\Theta_3 & \sin\Theta_2 \\ \cos\Theta_1\sin\Theta_3 + \sin\Theta_1\sin\Theta_2\cos\Theta_3 & \cos\Theta_1\cos\Theta_3 - \sin\Theta_1\sin\Theta_2\sin\Theta_3 & -\sin\Theta_1\cos\Theta_2 \\ \sin\Theta_1\sin\Theta_3 - \cos\Theta_1\sin\Theta_2\cos\Theta_3 & \cos\Theta_1\sin\Theta_2\sin\Theta_3 + \sin\Theta_1\cos\Theta_3 & \cos\Theta_1\cos\Theta_2 \end{bmatrix}$$

In particular, $E(\Theta)$ represents a coordinate transformation matrix from a vibration sensing side structure coordinate system into an inertia coordinate system and $Eu(\Theta)$ is a transformation matrix representing a relation between angular velocity ω and time differential of an Eulerian angle.

It is assumed that there is no temporal change in I. Further, for simplification of the formula, $Er(\Theta)$ is defined as follows for convenience.

$$[E_r(\Theta)] = \begin{pmatrix} [r_{pi}]^T \frac{\partial [E(\Theta)]^T}{\partial \Theta_1} \\ [r_{pi}]^T \frac{\partial [E(\Theta)]^T}{\partial \Theta_2} \\ [r_{pi}]^T \frac{\partial [E(\Theta)]^T}{\partial \Theta_3} \end{pmatrix}$$

If the expression is developed and calculated, $$\left\{ [\dot{E}_u(\Theta)]^T - \begin{pmatrix} [\dot{\theta}]^T \frac{\partial [E_u(\Theta)]^T}{\partial \Theta_1} \\ [\dot{\theta}]^T \frac{\partial [E_u(\Theta)]^T}{\partial \Theta_1} \\ [\dot{\theta}]^T \frac{\partial [E_u(\Theta)]^T}{\partial \Theta_1} \end{pmatrix} \right\} [I][\omega] = [E_u(\Theta)]^T [\tilde{\omega}]^T [I][\omega]$$

is obtained.
Therefore, a translational motion equation and a rotational motion equation of the system can be respectively derived as follows,
<Translational Motion Equation>

$$[M][\ddot{r}_g] - \sum_i [K_i]\{[r_g] - [r_{g0}] + ([E(\Theta)] - [E(\Theta_0)])[r_{pi}]\} = Q$$

<Rotational Motion Equation>

$$[E_u(\Theta)]^T [I][\dot{\omega}] + [E_u(\Theta)]^T [\tilde{\omega}]^T [I][\omega] - \sum_i [E_r(\Theta)][K_i]\{[r_g] - [r_{g0}] + ([E(\Theta)] - [E(\Theta_0)])[r_{pi}]\} = N$$

<Linearization of an Equation of Motion>
Micro-displacement of $[rg] \ll 1$ and $[\Theta] \ll 1$ is assumed with respect to the equation of motion of Lagrange derived in the preceding item and the equation of motion is linearized. The equation of motion can be described in the following form when secondary or higher very small amounts are neglected.

$$[M][\ddot{r}_g] + \sum_i [K_i][r_g] - \sum_i [K_i][\tilde{r}_{pi}][\Theta] =$$

-continued $$Q + \sum_i [K_i][r_{g0}] + \sum_i [K_i][\tilde{r}_{pi}][\Theta_0]$$

$$[I][\dot{\theta}] + \sum_i [\tilde{r}_{pi}][K_i][r_g] - \sum_i [\tilde{r}_{pi}][K_i][\tilde{r}_{pi}][\Theta] =$$

where, from $$[E_u] = \begin{bmatrix} \cos\Theta_2\cos\Theta_3 & \sin\Theta_3 & 0 \\ -\cos\Theta_2\sin\Theta_3 & \cos\Theta_3 & 0 \\ \sin\Theta_2 & 0 & 1 \end{bmatrix} \approx \begin{bmatrix} 1 & \Theta_3 & 0 \\ -\Theta_3 & 1 & 0 \\ \Theta_2 & 0 & 1 \end{bmatrix}$$

$$E(\Theta) = \begin{bmatrix} \cos\Theta_2\cos\Theta_3 & -\cos\Theta_2\sin\Theta_3 & \sin\Theta_2 \\ \cos\Theta_1\sin\Theta_3 + \sin\Theta_1\sin\Theta_2\cos\Theta_3 & \cos\Theta_1\cos\Theta_3 - \sin\Theta_1\sin\Theta_2\sin\Theta_3 & -\sin\Theta_1\cos\Theta_2 \\ \sin\Theta_1\sin\Theta_3 - \cos\Theta_1\sin\Theta_2\cos\Theta_3 & \cos\Theta_1\sin\Theta_2\sin\Theta_3 + \sin\Theta_1\cos\Theta_3 & \cos\Theta_1\cos\Theta_2 \end{bmatrix} \approx$$

$$\begin{bmatrix} 1 & -\Theta_3 & \Theta_2 \\ \Theta_3 & 1 & -\theta_1 \\ -\Theta_2 & \theta_1 & 1 \end{bmatrix},$$

$$([E(\Theta)] - [E(\Theta_0)])[r_{pi}] \approx [\tilde{r}_{pi}][\Theta] - [\tilde{r}_{pi}][\Theta_0]$$

$$[E_u(\Theta)]^T [I][E_u(\Theta)] \approx [I]$$

$$[E_r(\Theta)][K_i] \approx [\tilde{r}_{pi}][K_i].$$

From the condition of the micro-displacement, this can be regarded as follow.

$$[\Theta_1, \Theta_2, \Theta_3] \approx [\Theta_x, \Theta_y, \Theta_z]$$

<Derivation of Eigenvalues>
When the equation of motion linearized in the preceding item is organized in a form of a matrix, an equation of motion can be derived in the following form. An eigenfrequency of the system is calculated by calculating eigenvalues for $M_{eff}$ and $K_{eff}$.

$$\begin{bmatrix} [M] & [0] & [0] & [0] \\ [0] & [I] & [0] & [0] \\ [0] & [0] & [1] & [0] \\ [0] & [0] & [0] & [1] \end{bmatrix} \frac{d}{dt} \begin{bmatrix} [\dot{r}_g] \\ [\dot{\theta}] \\ [r_g] \\ [\theta] \end{bmatrix} =$$

$$\begin{bmatrix} [0] & [0] & -\sum_i [K_i] & \sum_i [K_i][\tilde{r}_{pi}] \\ [0] & [0] & -\sum_i [\tilde{r}_{pi}][K_i] & \sum_i [\tilde{r}_{pi}][K_i][\tilde{r}_{pi}] \\ [1] & [0] & [0] & [0] \\ [0] & [1] & [0] & [0] \end{bmatrix} \begin{bmatrix} [\dot{r}_g] \\ [\dot{\theta}] \\ [r_g] \\ [\theta] \end{bmatrix} +$$

-continued $$\begin{bmatrix} Q + \sum_i [K_i][r_{g0}] + \sum_i [K][\tilde{r}_{pi}][\Theta_0] \\ N + \sum_i [\tilde{r}_{pi}][K_i][r_{g0}] + \sum_i [\tilde{r}_{pi}][K_i][\tilde{r}_{pi}][\Theta_0] \\ [0] \\ [0] \end{bmatrix} \Leftrightarrow$$

$$M_{eff} \frac{dX}{dt} = K_{eff} X + F_{eff}$$

where, $$X = \begin{bmatrix} [\dot{r}_g] \\ [\dot{\Theta}] \\ [r_g] \\ [\theta] \end{bmatrix}$$

$$M_{eff} = \begin{bmatrix} [M] & [0] & [0] & [0] \\ [0] & [I] & [0] & [0] \\ [0] & [0] & [1] & [0] \\ [0] & [0] & [0] & [1] \end{bmatrix}$$

$$K_{eff} = \begin{bmatrix} [0] & [0] & -\sum_i [K_i] & \sum_i [K_i][\tilde{r}_{pi}] \\ [0] & [0] & -\sum_i [\tilde{r}_{pi}][K_i] & \sum_i [\tilde{r}_{pi}][K_i][\tilde{r}_{pi}] \\ [1] & [0] & [0] & [0] \\ [0] & [1] & [0] & [0] \end{bmatrix}$$

$$F_{eff} = \begin{bmatrix} Q + \sum_i [K_i][r_{g0}] + \sum_i [K][\tilde{r}_{pi}][\Theta_0] \\ N + \sum_i [\tilde{r}_{pi}][K_i][r_{g0}] + \sum_i [\tilde{r}_{pi}][K_i][\tilde{r}_{pi}][\Theta_0] \\ [0] \\ [0] \end{bmatrix}$$

[0] represents a zero matrix of three rows and three columns and [1] represents a unit matrix of three rows and three columns.

<Diagonalization of a Linear Motion Equation>

From the equation of motion in the preceding item, since motions of the respective elastic members are linked when the elastic members are simply arranged, it is understood that a resonance frequency cannot be freely designed. Therefore, the rigidity of the elastic members and a mass characteristic of the vibration sensing side structure are defined as follows and expressions are further developed.

$$[K_i] = \begin{bmatrix} k_{i\_xx} & 0 & 0 \\ 0 & k_{i\_xx} & 0 \\ 0 & 0 & k_{i\_xx} \end{bmatrix} \quad [M] = \begin{bmatrix} m & 0 & 0 \\ 0 & m & 0 \\ 0 & 0 & m \end{bmatrix} \quad [I] = \begin{bmatrix} I_{x'x'} & I_{x'y'} & I_{x'z'} \\ I_{x'y'} & I_{y'y'} & I_{y'z'} \\ I_{x'z'} & I_{y'z'} & I_{z'z'} \end{bmatrix}$$

In order to make motion of each axis independent as much as possible, a derived following equation of motion is diagonalized as much as possible.

$$\begin{bmatrix} [\ddot{r}_g] \\ [\ddot{\Theta}] \end{bmatrix} = \begin{bmatrix} -\sum_i [M]^{-1}[K_i] & \sum_i [M]^{-1}[K_i][\tilde{r}_{pi}] \\ -\sum_i [I]^{-1}[\tilde{r}_{pi}][K_i] & \sum_i [I]^{-1}[\tilde{r}_{pi}][K_i][\tilde{r}_{pi}] \end{bmatrix} \begin{bmatrix} [r_g] \\ [\Theta] \end{bmatrix}$$

First, about a term concerning the translational motion equation, considering that $$-\sum_i [M]^{-1}[K_i]$$

is diagonalized and $$-\sum_i [M]^{-1}[K_i][\tilde{r}_{pi}]$$

is transformed into a zero matrix, $$-\sum_i [M]^{-1}[K_i] = \begin{bmatrix} -\sum_i \frac{k_{i\_xx}}{m} & 0 & 0 \\ 0 & -\sum_i \frac{k_{i\_yy}}{m} & 0 \\ 0 & 0 & -\sum_i \frac{k_{i\_zz}}{m} \end{bmatrix}$$

$$\sum_i [M]^{-1}[K_i][\tilde{r}_{pi}] = \begin{bmatrix} 0 & -\sum_i \frac{k_{i\_xx}}{m} r_{pi\_z} & \sum_i \frac{k_{i\_xx}}{m} r_{pi\_y} \\ \sum_i \frac{k_{i\_yy}}{m} r_{pi\_z} & 0 & -\sum_i \frac{k_{i\_yy}}{m} r_{pi\_x} \\ -\sum_i \frac{k_{i\_zz}}{m} r_{pi\_y} & \sum_i \frac{k_{i\_zz}}{m} r_{pi\_x} & 0 \end{bmatrix}$$

is obtained.

From arrangement limitation of the elastic members, $$\sum_i k_{i\_zz} r_{pi\_z} \neq 0$$

is obtained.

However, if the elastic members can be arranged to realize $$\sum_i k_{i\_xx} r_{pi\_x} = \sum_i k_{i\_yy} r_{pi\_y} = 0,$$

$$\sum_i [M]^{-1}[K][\tilde{r}_{pi}] = \begin{bmatrix} 0 & -\frac{1}{m} \sum_i k_{i\_xx} r_{pi\_z} & 0 \\ \frac{1}{m} \sum_i k_{i\_yy} r_{pi\_z} & 0 & 0 \\ 0 & 0 & 0 \end{bmatrix}$$

can be obtained. Consequently, the term concerning the translational motion can be diagonalized as much as possible.

Subsequently, considering that a term of the rotational motion equation $$\sum_i [I]^{-1}[\tilde{r}_{pi}][K_i][\tilde{r}_{pi}]$$

is transformed into a zero matrix and $$\sum_i [I]^{-1}[\tilde{r}_{pi}][K_i]$$

is diagonalized, based on the premise that $$\sum_i k_{i\_xx} r_{pi\_x} = \sum_i k_{i\_yy} r_{pi\_y} = 0$$

as explained above, $$-\sum_i [I]^{-1}[\tilde{r}_{pi}][K_i] =$$

$$\frac{1}{\det([I])} \begin{bmatrix} -(I_{x'y'}I_{z'z'} - I_{x'z'}I_{y'z'})\sum_i k_{i\_xx} r_{pi\_z} & (I_{y'y'}I_{z'z'} - I_{y'z'}^2)\sum_i k_{i\_yy} r_{pi\_z} & 0 \\ -(I_{x'x'}I_{z'z'} - I_{x'z'}^2)\sum_i k_{i\_xx} r_{pi\_z} & (I_{x'y'}I_{z'z'} - I_{x'z'}I_{y'z'})\sum_i k_{i\_yy} r_{pi\_z} & 0 \\ -(I_{x'x'}I_{y'z'} - I_{x'y'}I_{x'z'})\sum_i k_{i\_xx} r_{pi\_z} & (I_{x'y'}I_{y'z'} - I_{x'z'}I_{y'y'})\sum_i k_{i\_yy} r_{pi\_z} & 0 \end{bmatrix}$$

is obtained.

In the above explanation, if products of inertia can be set to 0, $$-\sum_i [I]^{-1}[\tilde{r}_{pi}][K_i] =$$

$$\frac{1}{\det([I])} \begin{bmatrix} 0 & I_{y'y'}I_{z'z'}\sum_i k_{i\_yy} r_{pi\_z} & 0 \\ -I_{x'x'}I_{z'z'}\sum_i k_{i\_xx} r_{pi\_z} & 0 & 0 \\ 0 & 0 & 0 \end{bmatrix}$$

can be set. However, it is unrealistic to set all the products of inertia to zero (completely match a machine axis and a principal axis of inertia) only with designing of the vibration sensing side structure. Therefore, at least one product of inertia is set sufficiently smaller than a value of a principal axis by designing of the vibration isolator. The products of inertia that cannot be set sufficiently small by the designing of the vibration isolator are designed to be sufficiently smaller than the value of the principal axis by designing of the vibration sensing side structure.

When $I_{x'x'}, I_{y'y'}, I_{z'z'} \gg I_{x'y'}, I_{y'z'}, I_{z'z'}$ is set by the designing of the vibration sensing side structure and the designing of the isolator, at this time, a secondary very small amount can be $$1 \gg \frac{I_{mn}}{I_{kk}I_{ll}} \approx 0.$$

(k, l, m, n=x, y, z and m≠n)

From the above expression, a tensor of inertia and an inverse matrix of the tensor or inertia can be approximated as follows.

$$[I] \approx \begin{bmatrix} I_{xx} & 0 & 0 \\ 0 & I_{yy} & 0 \\ 0 & 0 & I_{zz} \end{bmatrix} \therefore [I]^{-1} \approx \begin{bmatrix} 1/I_{xx} & 0 & 0 \\ 0 & 1/I_{yy} & 0 \\ 0 & 0 & 1/I_{zz} \end{bmatrix}$$

Accordingly, $$\sum_i [I]^{-1}[\tilde{r}_{pi}][K_i] \approx \begin{bmatrix} 0 & \sum_i \frac{k_{i\_yy} r_{pi\_z}}{I_{xx}} & 0 \\ -\sum_i \frac{k_{i\_xx} r_{pi\_z}}{I_{yy}} & 0 & 0 \\ 0 & 0 & 0 \end{bmatrix}$$

is obtained.

Further, based on the same premise, $$\sum_i [I]^{-1}[\tilde{r}_{pi}][K_i][\tilde{r}_{pi}] \approx$$

$$\begin{bmatrix} -\sum_i \frac{(k_{i\_yy} r_{pi\_z}^2 + k_{zz} r_{pi\_y}^2)}{I_{xx}} & \sum_i \frac{(k_{i\_xx} r_{pi\_x} r_{pi\_y})}{I_{xx}} & 0 \\ \sum_i \frac{(k_{i\_yy} r_{pi\_x} r_{pi\_y})}{I_{yy}} & -\sum_i \frac{(k_{i\_xx} r_{pi\_z}^2 + k_{i\_zz} r_{pi\_x}^2)}{I_{yy}} & 0 \\ 0 & 0 & -\sum_i \frac{(k_{i\_xx} r_{pi\_y}^2 + k_{i\_yy} r_{pi\_x}^2)}{I_{zz}} \end{bmatrix}$$

can be set.

If $$\sum_i k_{i\_yy} r_{pi\_x} r_{pi\_y} = \sum_i k_{i\_xx} r_{pi\_x} r_{pi\_y} = 0,$$

$$\sum_i [I]^{-1}[\tilde{r}_{pi}][K_i][\tilde{r}_{pi}] \approx$$

-continued $$\begin{bmatrix} -\sum_i \dfrac{(k_{i\_yy}r_{pi\_z}^2 + k_{i\_zz}r_{pi\_y}^2)}{I_{xx}} & 0 & 0 \\ 0 & -\sum_i \dfrac{(k_{i\_xx}r_{pi\_z}^2 + k_{i\_zz}r_{pi\_x}^2)}{I_{yy}} & 0 \\ 0 & 0 & -\sum_i \dfrac{(k_{i\_xx}r_{pi\_y}^2 + k_{i\_yy}r_{pi\_x}^2)}{I_{zz}} \end{bmatrix}$$

is obtained.

As a result of eliminating linkage of translational motions in the axial directions and rotational motions around the axes, the expression can be transformed as follows.

$$\begin{bmatrix} -\sum_i [M]^{-1}[K_i] & \sum_i [M]^{-1}[K_i][\tilde{r}_{pi}] \\ -\sum_i [I]^{-1}[\tilde{r}_{pi}][K_i] & \sum_i [I]^{-1}[\tilde{r}_{pi}][K_i][\tilde{r}_{pi}] \end{bmatrix} \approx$$

When the translational motion equation and the rotational motion equation are respectively organized, the translational motion equation and the rotational motion equation can be derived as follows.

<Diagonalized Translational Motion Equation>

$$\ddot{r}_{g\_x} = -\frac{1}{m}\sum_i k_{i\_xx}\{r_{g\_x} + r_{pi\_z}\Theta_y\} = f_1(r_{g\_x}, \Theta_y) \quad (3)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x)$$

$$\ddot{r}_{g\_z} = -\frac{1}{m}\sum_i k_{i\_zz}r_{g\_z} = f_3(r_{g\_z})$$

$$\begin{bmatrix} -\dfrac{\sum_i k_{i\_xx}}{m} & 0 & 0 & 0 & -\dfrac{\sum_i k_{i\_xx}r_{pi\_z}}{m} & 0 \\ 0 & -\dfrac{\sum_i k_{i\_yy}}{m} & 0 & \dfrac{\sum_i k_{i\_yy}r_{pi\_z}}{m} & 0 & 0 \\ 0 & 0 & -\dfrac{\sum_i k_{i\_zz}}{m} & 0 & 0 & 0 \\ 0 & \dfrac{\sum_i k_{i\_yy}r_{pi\_z}}{I_{xx}} & 0 & -\dfrac{\left(\sum_i k_{i\_yy}r_{pi\_z}^2 + \sum_i k_{i\_zz}r_{pi\_y}^2\right)}{I_{xx}} & 0 & 0 \\ -\dfrac{\sum_i k_{i\_xx}r_{pi\_z}}{I_{yy}} & 0 & 0 & 0 & -\dfrac{\left(\sum_i k_{i\_xx}r_{pi\_z}^2 + \sum_i k_{i\_zz}r_{pi\_x}^2\right)}{I_{yy}} & 0 \\ 0 & 0 & 0 & 0 & 0 & -\dfrac{\left(\sum_i k_{i\_xx}r_{pi\_y}^2 + \sum_i k_{i\_yy}r_{pi\_x}^2\right)}{I_{zz}} \end{bmatrix}$$

<Diagonalized Rotational Motion Equation>

$$\ddot{\Theta}_x = -\frac{1}{I_{xx}}\left[\sum_i \{k_{i\_yy}(-r_{pi\_z}r_{g\_y} + r_{pi\_z}^2 \Theta_x)\} + \sum_i k_{i\_zz}r_{pi\_y}^2 \Theta_x\right] = f_4(r_{g\_y}, \Theta_x) \quad (4)$$

$$\ddot{\Theta}_y = -\frac{1}{I_{yy}}\left[\sum_i \{k_{i\_xx}(r_{pi\_z}r_{g\_x} + r_{pi\_z}^2 \Theta_y)\} + \sum_i k_{i\_zz}r_{pi\_x}^2 \Theta_y\right] = f_5(r_{g\_x}, \Theta_y)$$

$$\ddot{\Theta}_z = -\frac{1}{I_{zz}}\sum_i \{(k_{i\_xx}r_{pi\_y}^2 + k_{i\_yy}r_{pi\_x}^2)\Theta_z\} = f_6(\Theta_z)$$

Note that, in the equations of motion, m, $I_{xx}$, $I_{yy}$, and $I_{zz}$ are parameters determined by a mass characteristic of the vibration sensing side structure.

Further, considering that a center of gravity position of the rigid body is sufficiently low ($r_{pi\_z} \approx 0$), Expressions (3) and (4) are solved. At this time, the equation of motion can be completely diagonalized as follows.

$$\begin{bmatrix} \ddot{r}_{g\_x} \\ \ddot{r}_{g\_y} \\ \ddot{r}_{g\_z} \\ \ddot{\Theta}_x \\ \ddot{\Theta}_y \\ \ddot{\Theta}_z \end{bmatrix} = \begin{bmatrix} -\frac{\sum_i k_{i\_xx}}{m} & 0 & 0 & 0 & 0 & 0 \\ 0 & -\frac{\sum_i k_{i\_yy}}{m} & 0 & 0 & 0 & 0 \\ 0 & 0 & -\frac{\sum_i k_{i\_zz}}{m} & 0 & 0 & 0 \\ 0 & 0 & 0 & -\frac{\sum_i k_{i\_zz}r_{pi\_y}^2}{I_{xx}} & 0 & 0 \\ 0 & 0 & 0 & 0 & -\frac{\sum_i k_{i\_zz}r_{pi\_x}^2}{I_{yy}} & 0 \\ 0 & 0 & 0 & 0 & 0 & -\frac{\left(\sum_i k_{i\_xx}r_{pi\_y}^2 + \sum_i k_{i\_yy}r_{pi\_x}^2\right)}{I_{zz}} \end{bmatrix} \begin{bmatrix} r_{g\_x} \\ r_{g\_y} \\ r_{g\_z} \\ \Theta_x \\ \Theta_y \\ \Theta_z \end{bmatrix}$$

This means that an equation of motion of six degrees of freedom can be rewritten as the following independent equation of motion in a one degree of freedom system.

$$\ddot{x} = \frac{k}{m}x$$

A resonance frequency f of the equation of motion is as follows.

$$f = \frac{1}{2\pi}\sqrt{\frac{k}{m}} \text{ [Hz]}$$

Accordingly, resonance frequencies of a six degrees of freedom motion are respectively calculated as shown in Table 2 below.

TABLE 2

| Six degrees of freedom motion | Resonance frequency [Hz] | Item that can be set and adjusted |
|---|---|---|
| x-direction translational motion | $\frac{1}{2\pi}\sqrt{\frac{\sum_i k_{i\_xx}}{m}}$ | $\sum_i k_{i\_xx}$ |

TABLE 2-continued

| Six degrees of freedom motion | Resonance frequency [Hz] | Item that can be set and adjusted |
|---|---|---|
| y-direction translational motion | $\dfrac{1}{2\pi}\sqrt{\dfrac{\sum_i k_{i\_yy}}{m}}$ | $\sum_i k_{i\_yy}$ |
| z-direction translational motion | $\dfrac{1}{2\pi}\sqrt{\dfrac{\sum_i k_{i\_zz}}{m}}$ | $\sum_i k_{i\_zz}$ |
| x-axial rotational motion | $\dfrac{1}{2\pi}\sqrt{\dfrac{\sum_i k_{i\_zz} r_{pi\_y}^2}{I_{xx}}}$ | $\sum_i k_{i\_zz} r_{pi\_y}^2$ |
| y-axial rotational motion | $\dfrac{1}{2\pi}\sqrt{\dfrac{\sum_i k_{i\_zz} r_{pi\_x}^2}{I_{yy}}}$ | $\sum_i k_{i\_zz} r_{pi\_x}^2$ |
| z-axial rotational motion | $\dfrac{1}{2\pi}\sqrt{\dfrac{\left(\sum_i k_{i\_xx} r_{pi\_y}^2 + \sum_i k_{i\_yy} r_{pi\_x}^2\right)}{I_{zz}}}$ | $\sum_i k_{i\_xx} r_{pi\_y}^2 + \sum_i k_{i\_yy} r_{pi\_x}^2$ |

The above parameters are derived from a case in which a center of gravity position of the rigid body is sufficiently low. However, when a center of gravity height cannot be neglected, similarly, the parameters are parameters dominant in determining a value of a resonance frequency.

Therefore, when the conditions (1) at least one product of inertia is set sufficiently smaller than a value of a principal axis by a function of the isolator (Ixx, Iyy, Izz>>Ixy, Ixz, Iyz is set by designing of a sensitive device and isolator designing) (condition 1), and (2)

$$\sum_i k_{i\_xx} r_{pi\_x} = \sum_i k_{i\_yy} r_{pi\_y} = 0 \text{ and}$$
$$\sum_i k_{i\_yy} r_{pi\_x} r_{pi\_y} = \sum_i k_{i\_xx} r_{pi\_x} r_{pi\_y} = 0$$

(condition 2)

are satisfied, since m, $I_{xx}$, $I_{yy}$, and $I_{zz}$ are values determined by the mass characteristic of the vibration sensing side structure, it is understood that the resonance frequency of the x-direction translational motion, the resonance frequency of the y-direction translational motion, the resonance frequency of the z-direction translational motion, the resonance frequency of the x-axial rotational motion, the resonance frequency of the y-axial rotational motion, and the resonance frequency of the z-axial rotational motion can be respectively shifted by setting and adjusting the values of the terms shown in Table 2 described above.

Therefore, the condition 1 and the condition 2 will be respectively discussed.

<About the Condition 1>

Figure 2:
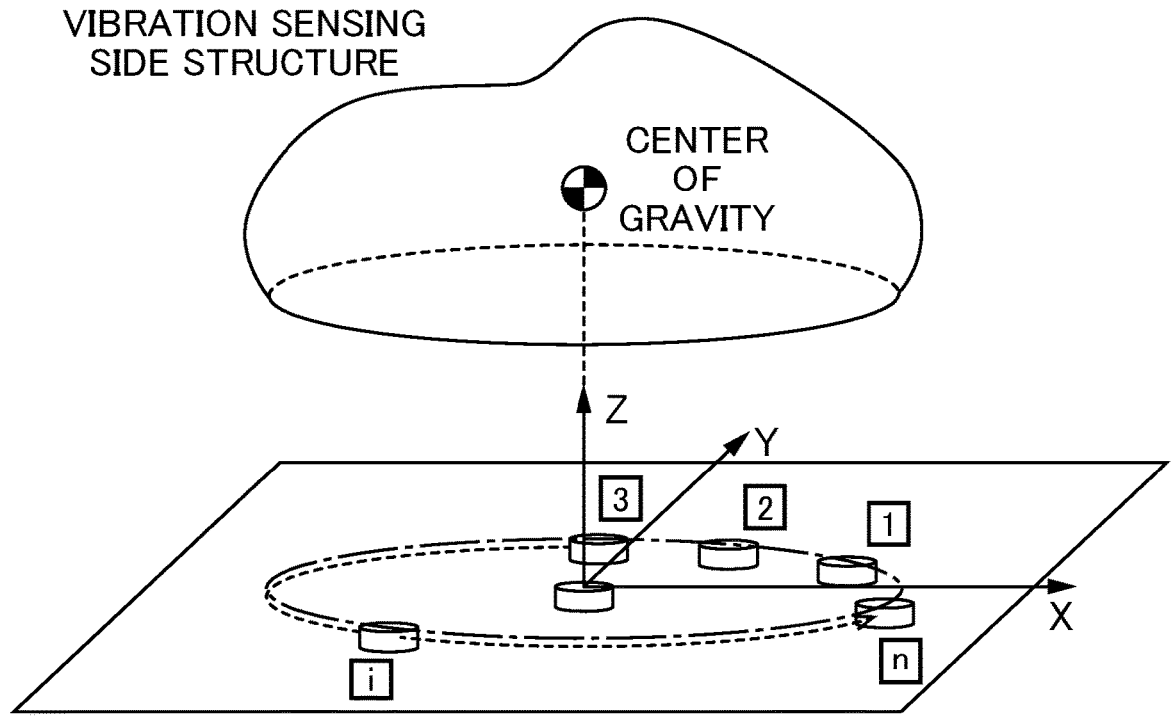
FIG. 2 is a diagram showing a definition of an XYZ coordinate system.

A plane on which elastic members are arranged is defined as an XY plane. An axis perpendicular to the XY plane is set as a Z-axis direction. An XYZ coordinate system having an origin at a point where the center of gravity position of the vibration sensing side structure is projected on the XY plane in parallel to the Z axis is defined (see FIG. 2).

A tensor of inertia of the vibration sensing side structure defined with respect to the XYZ coordinate system is defined as follows.

$$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix}$$

Coordinate transformation for rotation by θ with respect to the Z axis is considered. At this time, if θ satisfying $$\theta = \tan^{-1}\left(\dfrac{2I_{XY}}{I_{XX} - I_{YY}}\right)$$

is taken, a coordinate axis for setting Ixy to zero can be defined with respect to a disturbance sensitive device.

Figure 3:
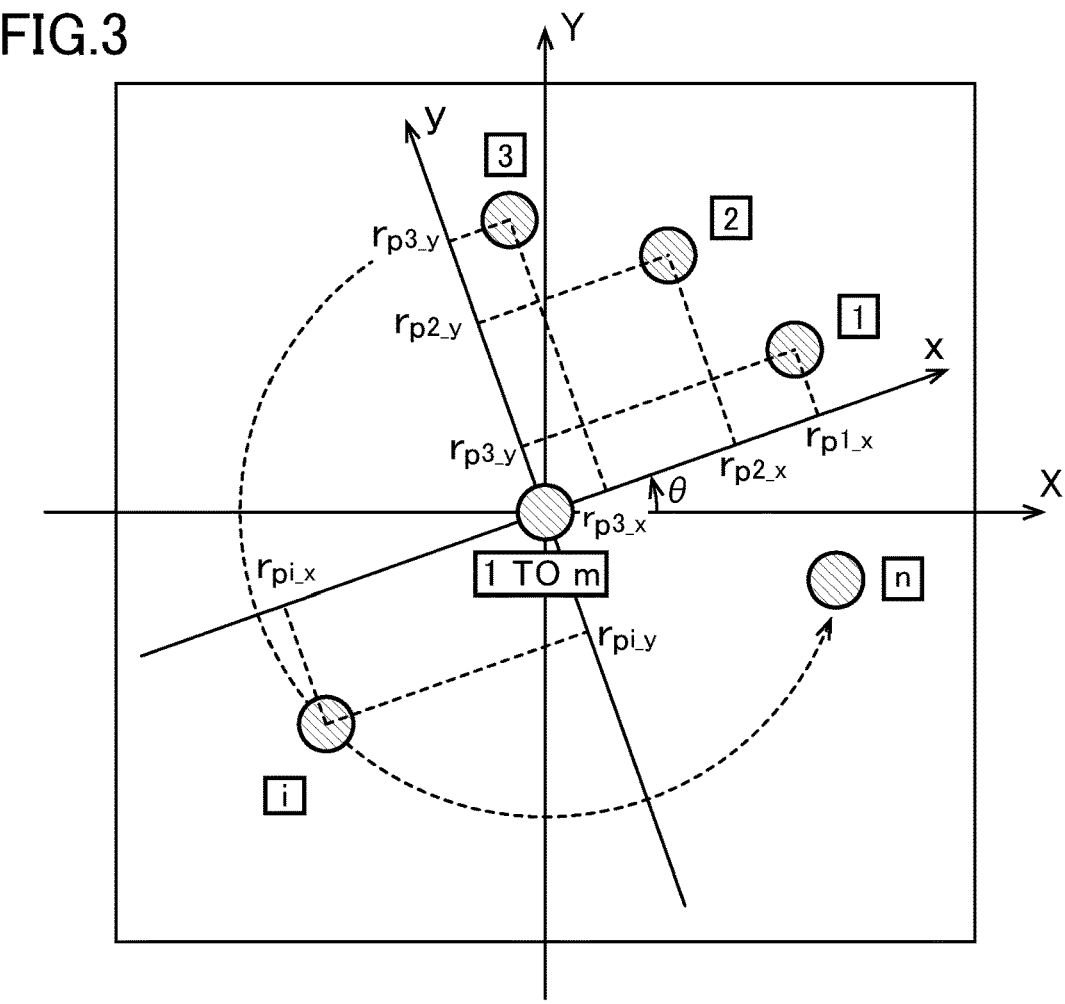
FIG. 3 is a diagram showing a definition of an xy coordinate system.

Accordingly, when an axis obtained by rotating the XY axis by θ is defined as an xy axis, the condition 1 can be satisfied by arranging the elastic members on the xy plane (see FIG. 3).

<About the Condition 2>

The elastic members only have to be arranged to satisfy the condition 2. Note that three or more elastic members are necessary to specify an attachment surface. About specific arrangement, an example in the case in which it is assumed that the same elastic members are used as all of the elastic members is explained below.

(1) When Three Elastic Members are Used

Figure 4:
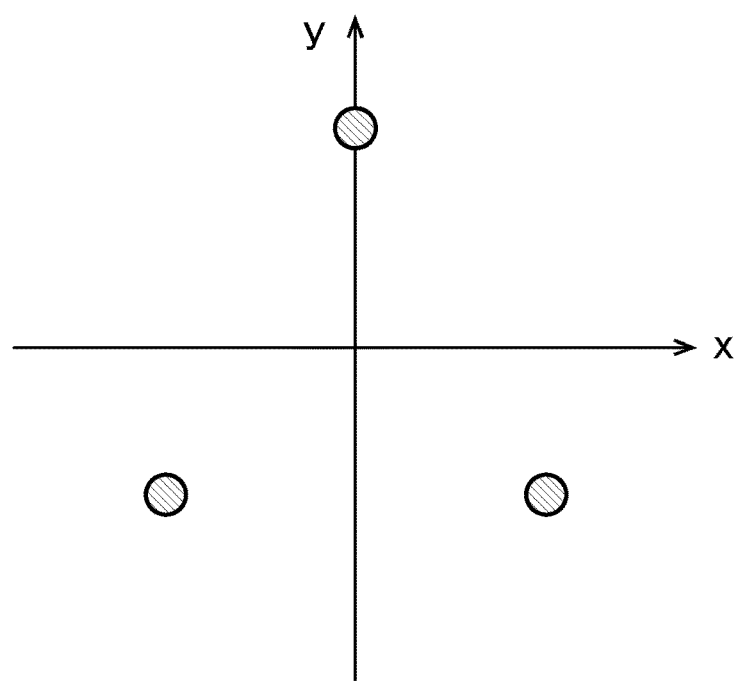
FIG. 4 is a diagram showing an example of arrangement that satisfies a condition 2.

For example, arrangement shown in FIG. 4 satisfies the condition 2. The number of elastic members is the smallest. However, for example, when the resonance frequency of the rotational motion around the x axis is adjusted, it is necessary to change the arrangement of all of the three elastic members.

(2) When Four Elastic Members are Used

Figure 5A:
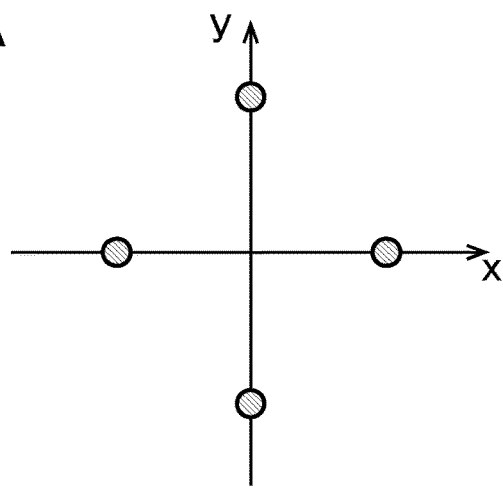
FIG. 5A is a diagram showing an example of arrangement that satisfies the condition 2.
Figure 5B:
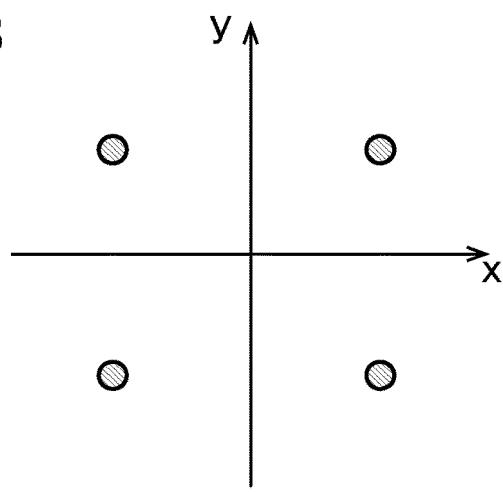
FIG. 5B is a diagram showing an example of arrangement that satisfies the condition 2.
Figure 5C:
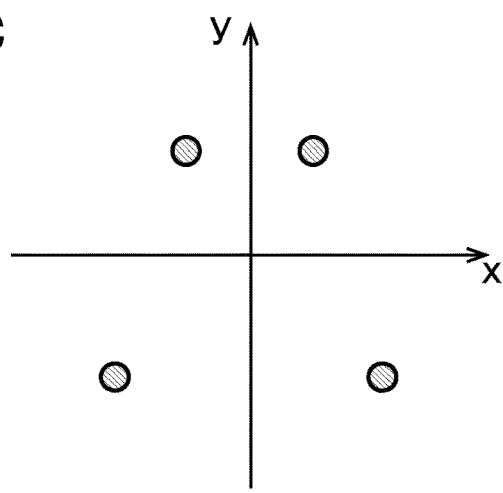
FIG. 5C is a diagram showing an example of arrangement that satisfies the condition 2.

For example, arrangement such as rhombus arrangement shown in FIG. 5A, rectangular arrangement shown in FIG. 5B, and trapezoidal arrangement shown in FIG. 5C satisfies the condition 2. At this time, in order to individually shift the resonance frequencies of the rotational motions around the x axis and the y axis, the number of elastic members, arrangement of which needs to be changed, is desirably the smallest. Such arrangement is the rhombus arrangement shown in FIG. 5A. Adjustment can be performed by changing the distance between diagonal two elastic members.

Subsequently, an adjusting method for the resonance frequencies will be discussed.

(1) Adjustment of the x-Direction Translational Motion Resonance Frequency

As shown in Table 2 described above, in order to shift the resonance frequency of the x-direction translational motion, a value of $$\sum_i k_{i\_xx}$$

only has to be adjusted. Since an elastic member arranged at the origin of the xy plane satisfies the condition 1, as one method for adjusting this value, it is conceivable to arrange one or more elastic members, the rigidity of which in the x direction is dominant, near the origin of the xy plane. In this case, an elastic member having rigidity in the x direction corresponding to an adjustment width of a desired resonance frequency only has to be arranged or elastic members as many as a number corresponding to the adjustment width of the desired resonance frequency only have to be arranged. Note that, in this method, the resonance frequency can be adjusted only in an increasing direction.

Figure 6A:
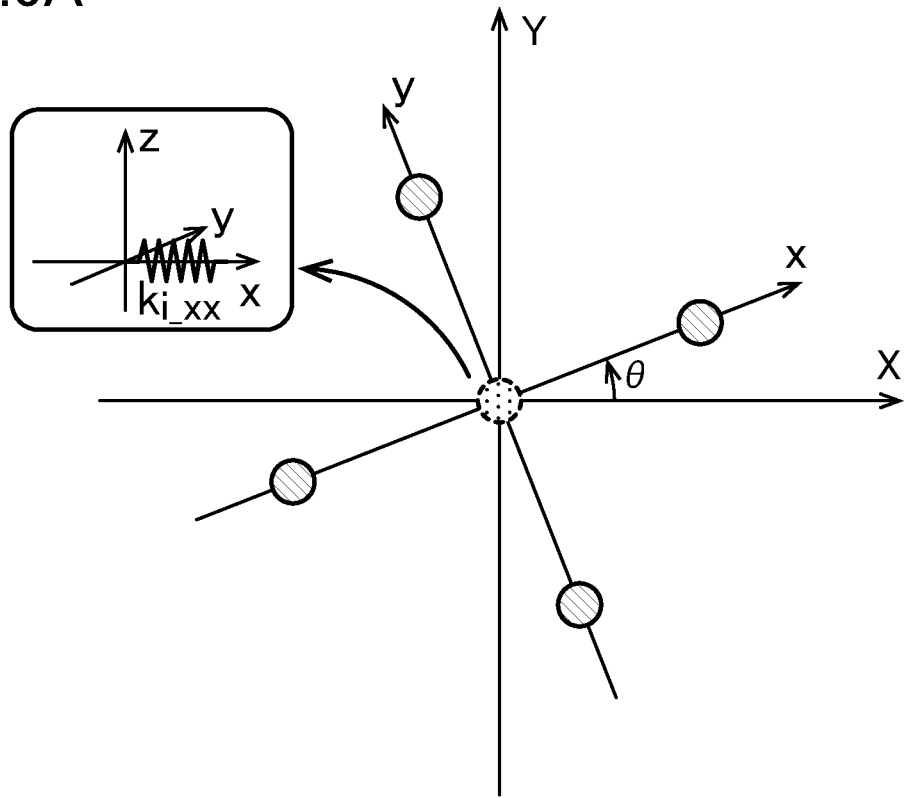
FIG. 6A is a diagram showing a configuration in which an elastic member in which rigidity in an x direction is dominant is additionally arranged near the origin of an xy plane.
Figure 6B:
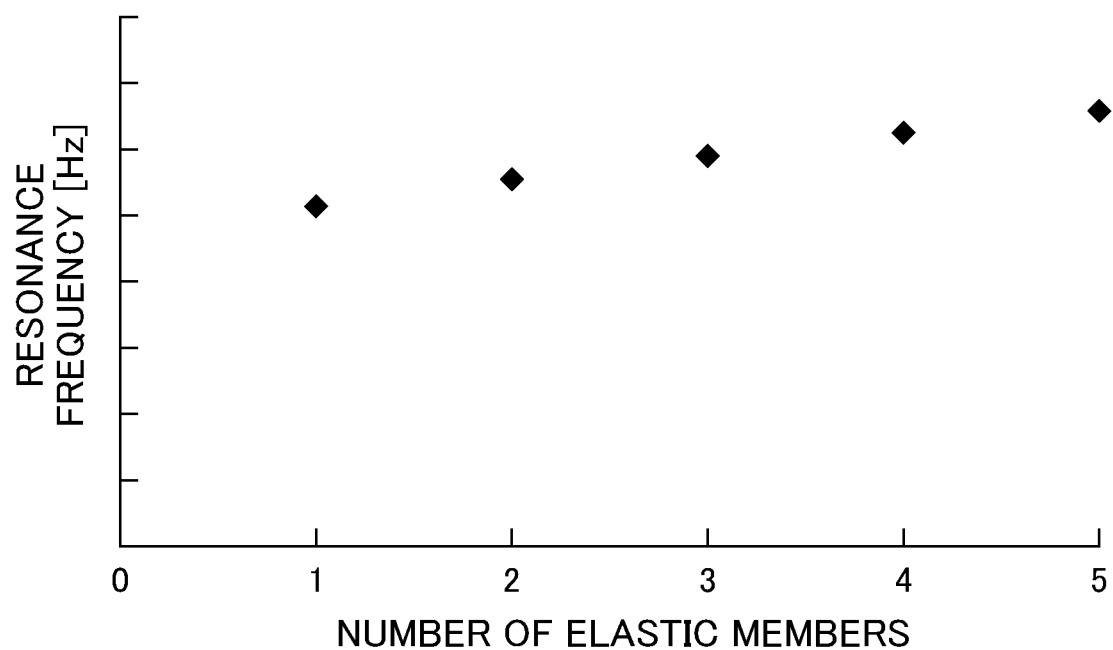
FIG. 6B is an example of a graph showing a relation between the number of elastic members arranged near the origin of the xy plane and a resonance frequency of an x-direction translational motion.

FIG. 6A is a diagram showing a configuration in which elastic members, the rigidity of which in the x direction is dominant, are additionally arranged near the origin of the xy plane when the elastic members are arranged in a rhombus shape. FIG. 6B is an example of a graph showing a relation between the number of elastic members arranged near the origin of the xy plane and the resonance frequency of the x-direction translational motion.

(2) Adjustment of the y-Direction Translational Motion Resonance Frequency

Figure 7:
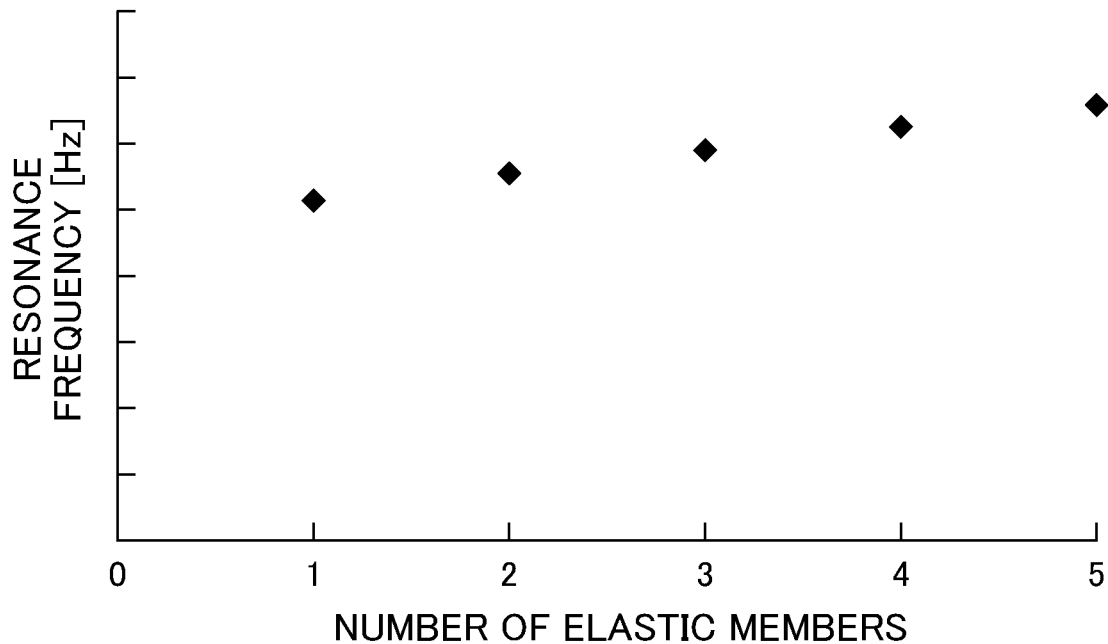
FIG. 7 is an example of a graph showing a relation between the number of elastic members arranged near the origin of the xy plane and a resonance frequency of a y-direction translational motion.

As shown in Table 2 described above, in order to shift the resonance frequency of the y-direction translational motion, a value of $$\sum_i k_{i\_yy}$$

only has to be adjusted. Since an elastic member arranged at the origin of the xy plane satisfies the condition 1, as one method for adjusting this value, it is conceivable to arrange one or more elastic members, the rigidity of which in the y direction is dominant, near the origin of the xy plane. In this case, an elastic member having rigidity in the y direction corresponding to an adjustment width of a desired resonance frequency only has to be arranged or elastic members as many as a number corresponding to the adjustment width of the desired resonance frequency only have to be arranged. Note that, in this method, the resonance frequency can be adjusted only in an increasing direction. FIG. 7 is an example of a graph showing a relation between the number of elastic members arranged near the origin of the xy plane and the resonance frequency of the y-direction translational motion.

(3) Adjustment of the z-Direction Translational Motion Resonance Frequency

Figure 8:
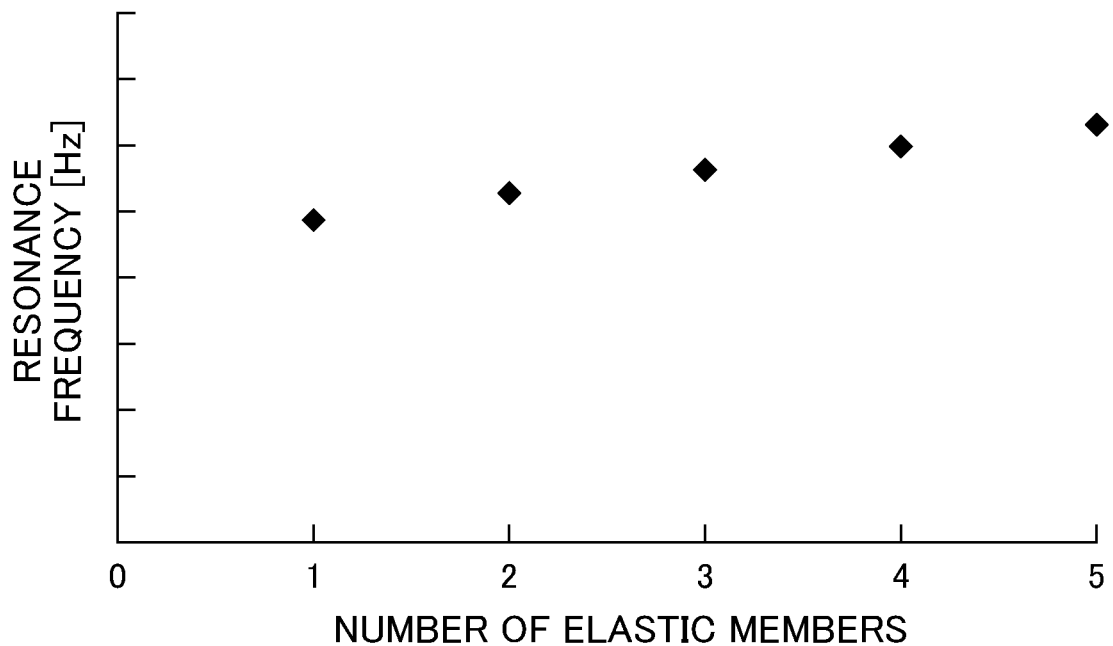
FIG. 8 is an example of a graph showing a relation between the number of elastic members arranged near the origin of the xy plane and a resonance frequency of a z-direction translational motion.

As shown in Table 2 described above, in order to shift the resonance frequency of the z-direction translational motion, a value of $$\sum_i k_{i\_zz}$$

only has to be adjusted. Since an elastic member arranged at the origin of the xy plane satisfies the condition 1, as one method for adjusting this value, it is conceivable to arrange one or more elastic members, the rigidity of which in the z direction is dominant, near the origin of the xy plane. In this case, an elastic member having rigidity in the z direction corresponding to an adjustment width of a desired resonance frequency only has to be arranged or elastic members as many as a number corresponding to the adjustment width of the desired resonance frequency only have to be arranged. Note that, in this method, the resonance frequency can be adjusted only in an increasing direction. FIG. 8 is an example of a graph showing a relation between the number of elastic members arranged near the origin of the xy plane and the resonance frequency of the z-direction translational motion.

(4) Adjustment of the x-Axial Rotational Motion Resonance Frequency

As shown in Table 2 described above, in order to shift the resonance frequency of the x-axial rotational motion, a value of $$\sum_i (k_{i\_zz} r_{pi\_y}^2)$$

only has to be adjusted. This is achieved by adjusting rigidity $k_{i\_zz}$ in the z direction and/or a y coordinate $r_{pi\_y}$ of the elastic members arranged on the xy plane.

Figure 9A:
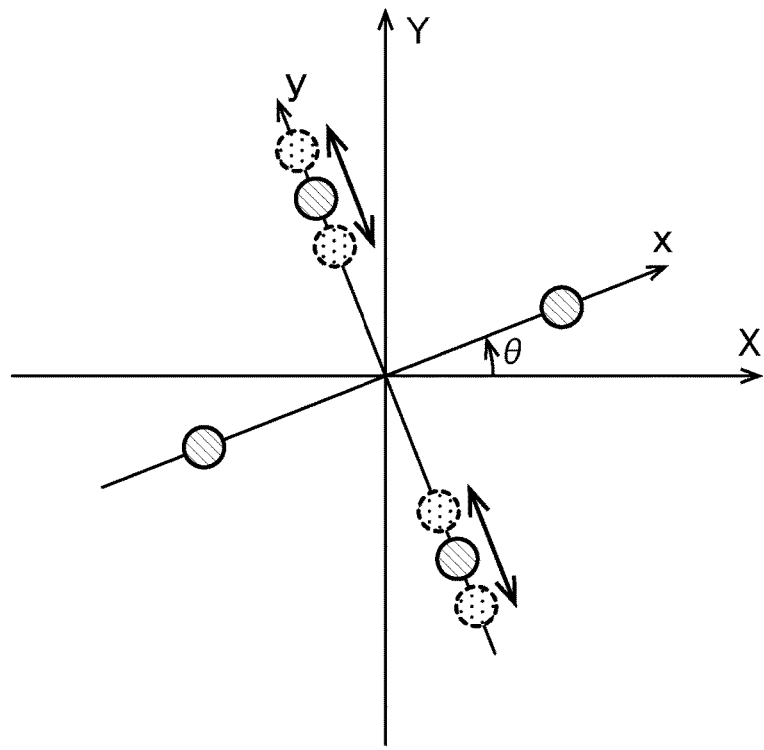
FIG. 9A is a diagram showing adjustment of a distance between elastic members on a y axis.
Figure 9B:
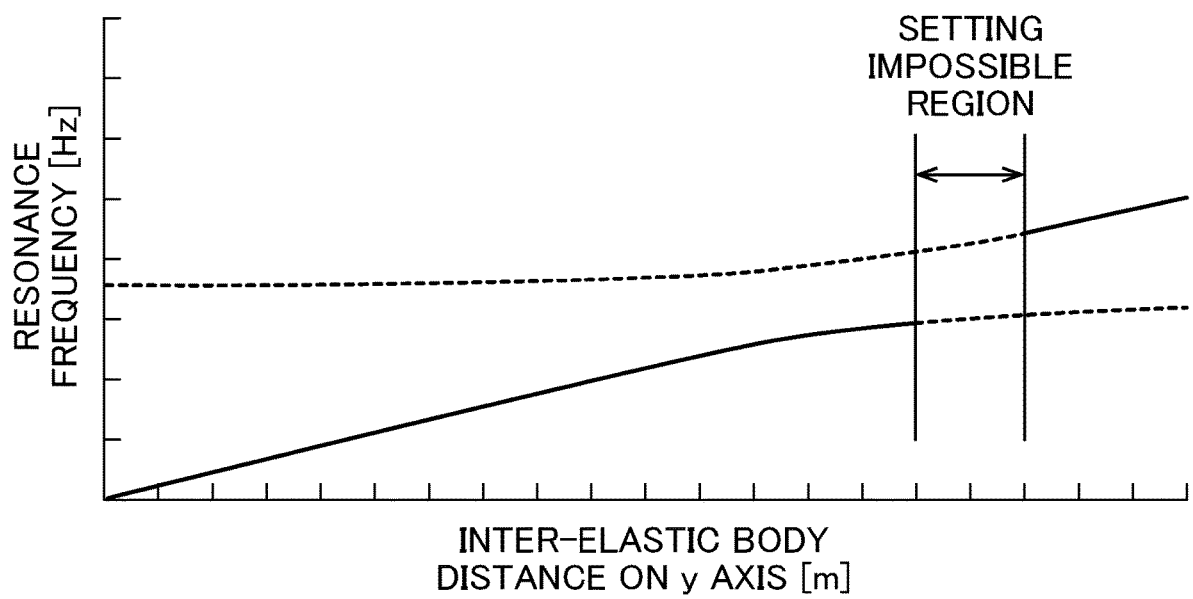
FIG. 9B is an example of a graph showing a relation between the inter-elastic member distance on the y axis and a resonance frequency of an x-axial rotational motion.

For example, in the rhombus arrangement of the same elastic members shown in FIG. 5A described above, when it is considered to adjust $$\sum_i (r_{pi\_y}^2)$$

by fixing the elastic members on the x axis in an initial state and adjusting the distance between the elastic members on the y axis as shown in FIG. 9A, a relation between the inter-elastic member distance on the y axis and the resonance frequency of the x-axial rotational motion is as shown in FIG. 9B. That is, the resonance frequency decreases if the inter-elastic member distance is reduced and the resonance frequency increases if the inter-elastic member distance is increased.

There is a region where setting of a resonance frequency is difficult (a setting impossible region) according to a change of mode shapes (a rotation mode and a translation mode) depending on the center of gravity height of the rigid body.

(5) Adjustment of the y-Axial Rotational Motion Resonance Frequency

As shown in Table 2 described above, in order to shift the resonance frequency of the y-axial rotational motion, a value of $$\sum_i (k_{i\_zz} r_{pi\_x}^2)$$

only has to be adjusted. This is achieved by adjusting rigidity $k_{i\_zz}$ in the z direction and/or an x coordinate $r_{pi\_x}$ of the elastic members arranged on the xy plane.

Figure 10A:
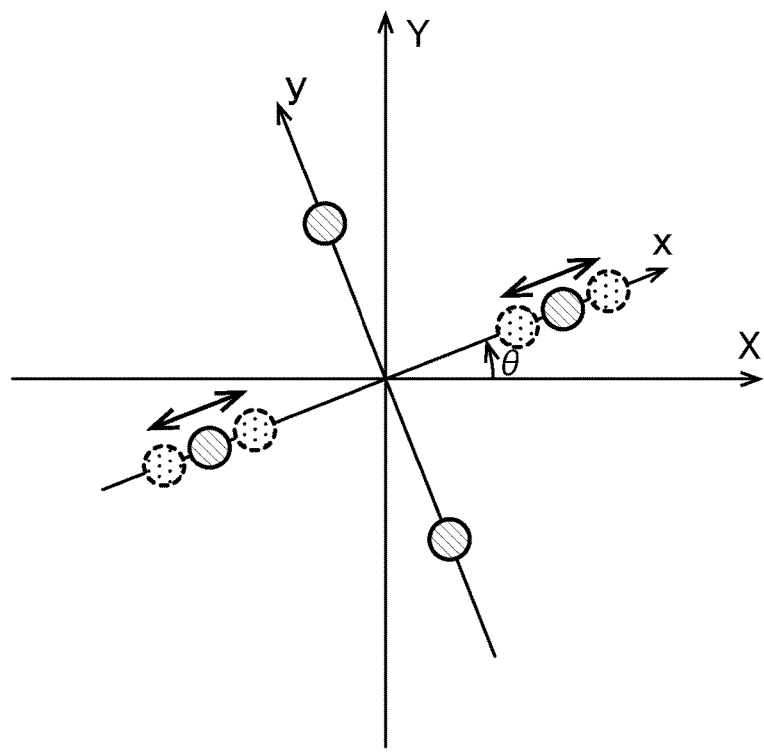
FIG. 10A is a diagram showing adjustment of a distance between elastic members on an x axis.
Figure 10B:
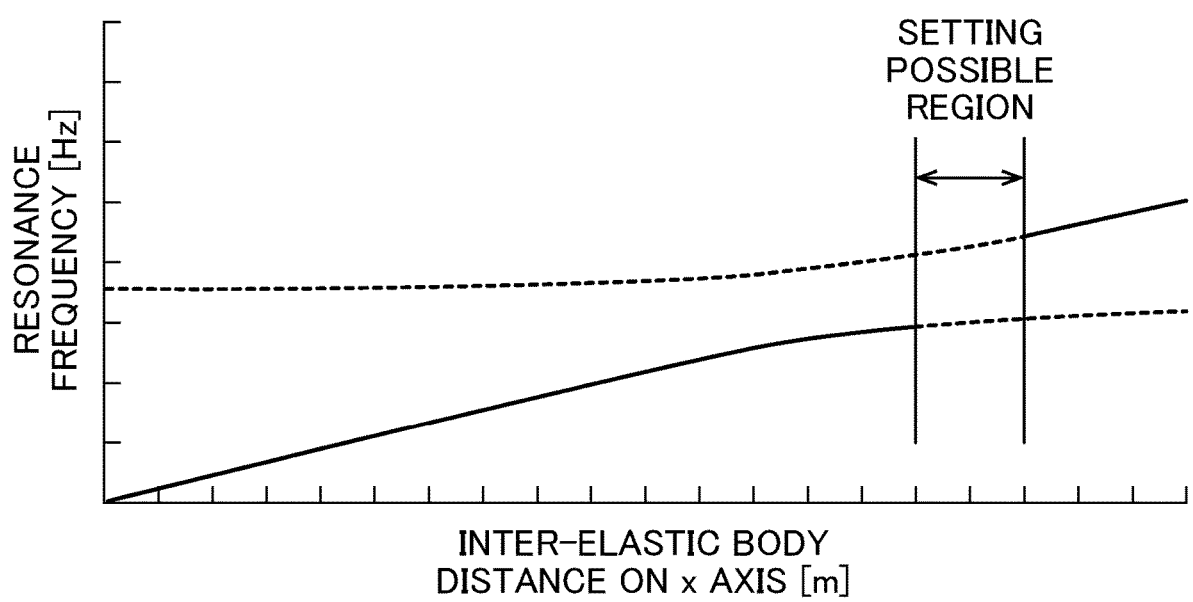
FIG. 10B is an example of a graph showing a relation between the inter-elastic member distance on the x axis and the resonance frequency of the x-axial rotational motion.

For example, in the rhombus arrangement of the same elastic members shown in FIG. 5A described above, when it is considered to adjust $$\sum_i (r_{pi\_x}^2)$$

by fixing the elastic members on the y axis in an initial state and adjusting the distance between the elastic members on the x axis as shown in FIG. 10A, a relation between the inter-elastic member distance on the x axis and the resonance frequency of the y-axial rotational motion is as shown in FIG. 10B. That is, the resonance frequency decreases if the inter-elastic member distance is reduced and the resonance frequency increases if the inter-elastic member distance is increased.

There is a region where setting of a resonance frequency is difficult (a setting impossible region) according to a change of mode shapes (a rotation mode and a translation mode) depending on the center of gravity height of the rigid body.

(6) Adjustment of the z-Axial Rotational Motion Resonance Frequency

As shown in Table 2 described above, in order to shift the resonance frequency of the z-axial rotational motion, a value of $$\sum_i (k_{i\_xx} r_{pi\_y}^2 + k_{i\_yy} r_{pi\_x}^2)$$

only has to be adjusted. This is achieved by adjusting the rigidity $k_{i\_xx}$ in the x direction, the rigidity $k_{i\_yy}$ in the y direction, the x coordinate $r_{pi\_x}$, and/or the y coordinate $r_{pi\_y}$ of the elastic members arranged on the xy plane.

Figure 11A:
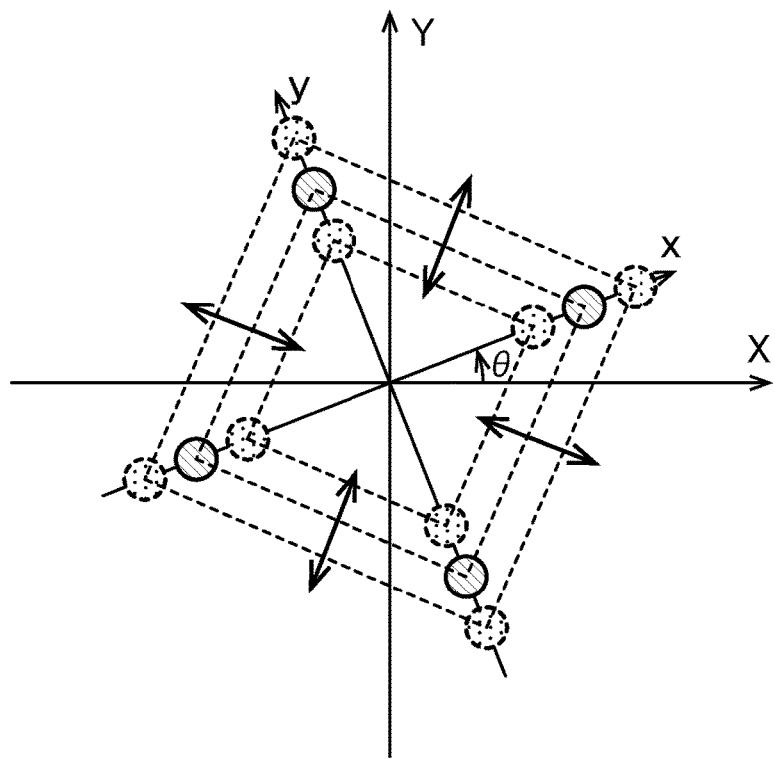
FIG. 11A is a diagram showing adjustment of the size of a rhombus.
Figure 11B:
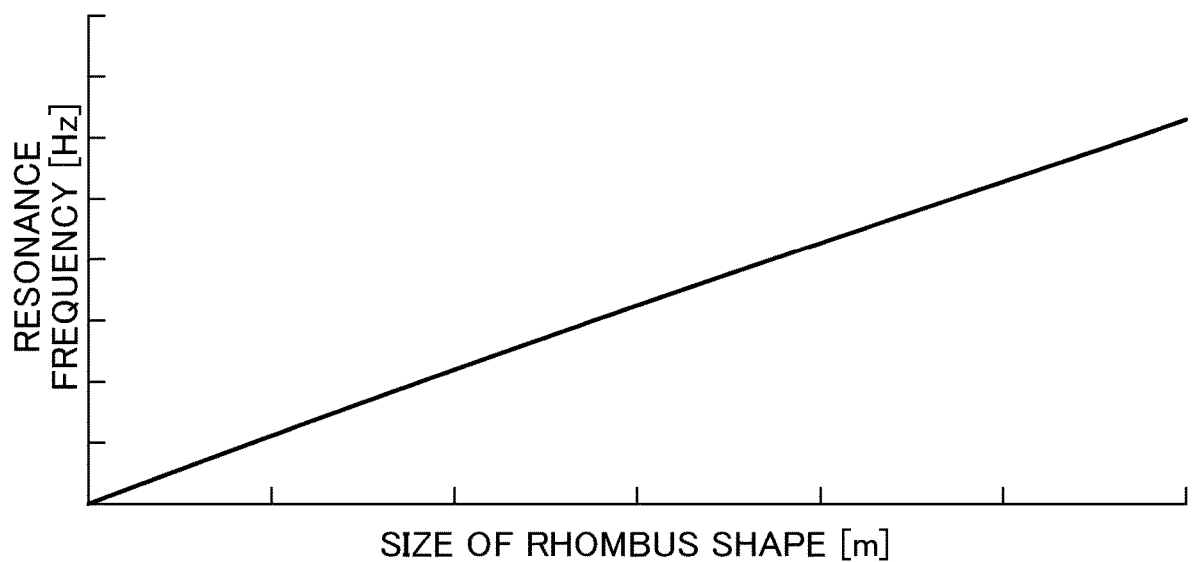
FIG. 11B is an example of a graph showing a relation between the length of one side of the rhombus and a resonance frequency of a z-axial rotational motion.

For simplification, for example, in the rhombus arrangement of the same elastic members shown in FIG. 5A described above, when it is considered to adjust $$\sum_i (r_{pi\_y}^2 + r_{pi\_x}^2)$$

by changing the rhombus arrangement in an initial state in a similar shape as shown in FIG. 11A, a relation between the length of one side of the rhombus in the similar shape in the rhombus arrangement in the initial state and the resonance frequency of the z-axial rotational motion is as shown in FIG. 11B. That is, in the similar shape in the rhombus arrangement in the initial state, the resonance frequency decreases if the length of the one side of the rhombus is reduced and the resonance frequency increases if the length of the one side of the rhombus is increased.

It is possible to respectively individually adjust the resonance frequencies according to the adjusting methods explained above. An example of an adjusting method for a resonance frequency for suppressing resonance of the vibration isolator using these adjusting methods is explained.

FIG. 12 is an example of a graph showing, concerning a frequency, a relation between a vibration transmission ratio and a vibration input at the time when the vibration isolator is applied. A solid line indicates the vibration transmission ratio at the time when the vibration isolator is applied and the broken line indicates the vibration input.

A large insulation characteristic is obtained in a high-frequency region by the application of the vibration isolator. However, in principle, in a low-frequency region, six resonance frequencies of a resonance frequency in an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion appear. On the other hand, three peaks of A, B, and C are present in the vibration input in the low-frequency region.

The peak A of the vibration input is not a problem because the peak A deviates from all of the resonance frequencies. However, the peak B of the vibration input coincides with the y-axial rotational resonance frequency and the peak C of the vibration input coincides with the y-direction translational resonance frequency. Therefore, since (vibration response)=(vibration input)×(vibration transmission ratio), as a result, a large response appears.

Therefore, a method of individually adjusting the resonance frequencies is effective. In this example, the resonance frequency of the y-direction translational motion is shifted using the adjusting method of (2) described above. The resonance frequency of the y-axial rotational motion is shifted using the adjusting method of (5) described above. Consequently, it is possible to minimize a vibration response due to an amplification region.

First Embodiment

Figure 13:
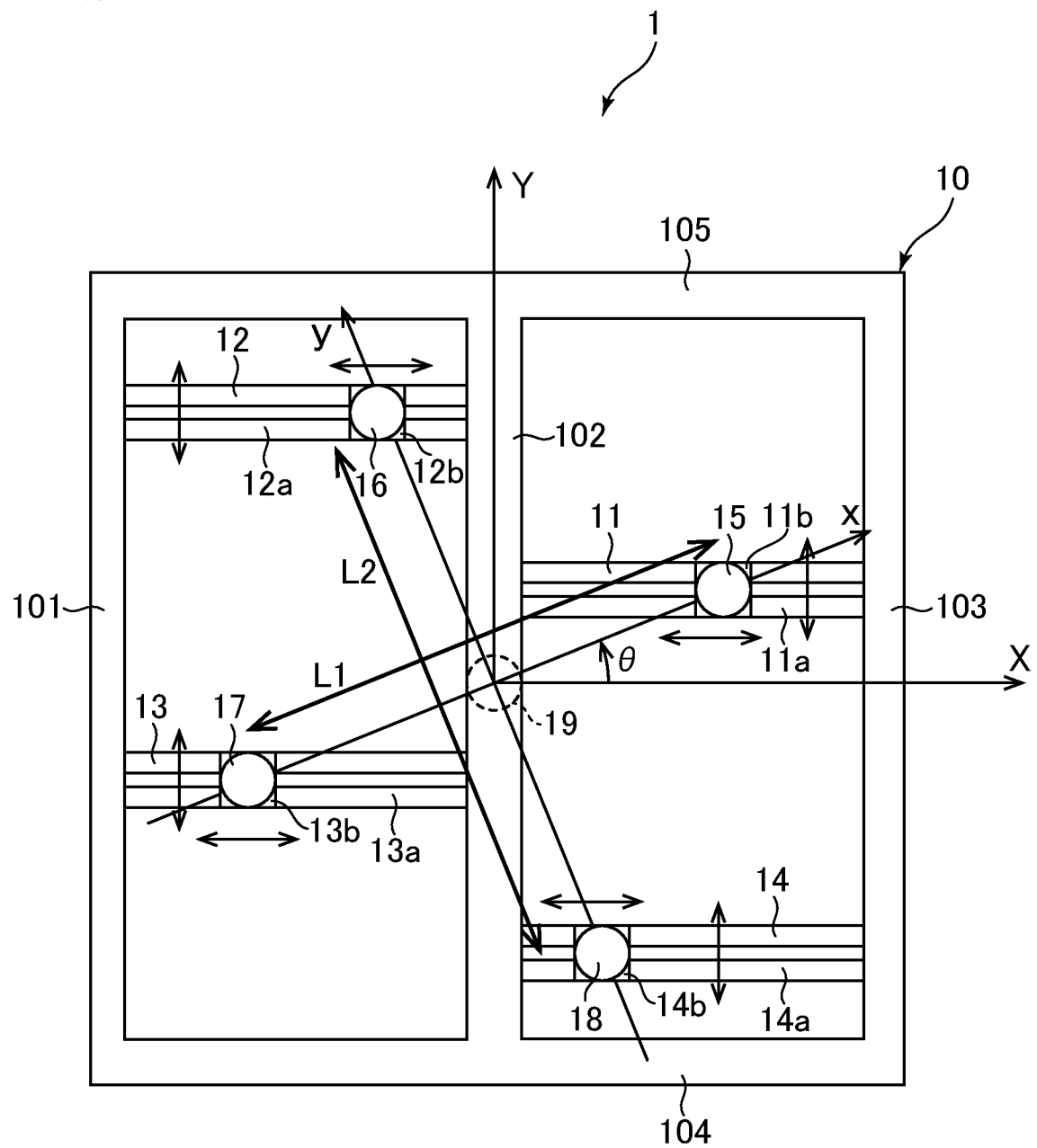
FIG. 13 is a top schematic view of a vibration isolator 1 according to a first embodiment of the present invention.

FIG. 13 is a top schematic view of a vibration isolator 1 according to a first embodiment of the present invention. The vibration isolator 1 includes a frame 10, a first slide member 11, a second slide member 12, a third slide member 13, a fourth slide member 14, a first elastic member 15, a second elastic member 16, a third elastic member 17, and a fourth elastic member 18.

The frame 10 includes a first frame section 101, a second frame section 102, a third frame section 103, a fourth frame section 104, and a fifth frame section 105. The first frame section 101, the second frame section 102, and the third frame section 103 are linear frame sections parallel to one another. The fourth frame section 104 and the fifth frame section 105 are linear frame sections parallel to each other in a direction orthogonal to the first to third frame sections 101 to 103. A rectangular outer peripheral section of the frame 10 is configured by the first, third, fourth, and fifth frame sections 101, 103, 104, and 105. The second frame section 102 is disposed on a line connecting a midpoint of the fourth frame section 104 and a midpoint of the fifth frame section 105. An elastic member 19 can be attached to the center of the second frame section 102.

The first to fourth slide members 11 to 14 respectively include a linear first slide member main body 11a and a first slide plate 11b, a linear second slide member main body 12a and a second slide plate 12b, a linear third slide member main body 13a and a third slide plate 13b, and a linear fourth slide member main body 14a and a fourth slide plate 14b.

The first and fourth slide member main bodies 11a and 14a are disposed between the second frame section 102 and the third frame section 103 and respectively coupled to the second and third frame sections 102 and 103 to be slidable in a direction parallel to an extending direction of the second and third frame sections 102 and 103. The first slide member 11 is disposed on the fifth frame section 105 side of the fourth slide member 14. The second and third slide member main bodies 12a and 13a are disposed between the first frame section 101 and the second frame section 102 and respectively coupled to the first and second frame sections 101 and 102 to be slidable in a direction parallel to an extending direction of the first and second frame sections 101 and 102. The second slide member 12 is disposed on the fifth frame section 105 side of the third slide member 13.

The first to fourth slide plates 11b to 14b are respectively coupled to the first to fourth slide member main bodies 11a to 14a to be slidable in a direction parallel to an extending direction of the first to fourth slide member main bodies 11a to 14a. The first to fourth elastic members 15 to 18 are respectively attached to the first to fourth slide plates 11b to 14b.

With such a configuration, it is possible to adjust the positions of the first elastic member 15 and the fourth elastic member 18 to any positions in a region surrounded by the second frame section 102, the third frame section 103, the fourth frame section 104, and the fifth frame section 105. It is possible to adjust the positions of the second elastic member 16 and the third elastic member 17 to any positions in a region surrounded by the first frame section 101, the second frame section 102, the fourth frame section 104, and the fifth frame section 105.

On the first to fourth elastic members 15 to 18, a not-shown vibration sensing side structure is attached directly or via an attachment member, or the first to fourth elastic members 15 to 18 and the vibration sensing side structure are in contact with one another without them attached. On the opposite side of a side of the frame 10 where the first to fourth elastic members 15 to 18 are attached, a not-shown vibration source side structure is attached directly or via an attachment member or, the frame 10 and the vibration sensing side structure are in contact with one another without them attached.

Figure 14A:
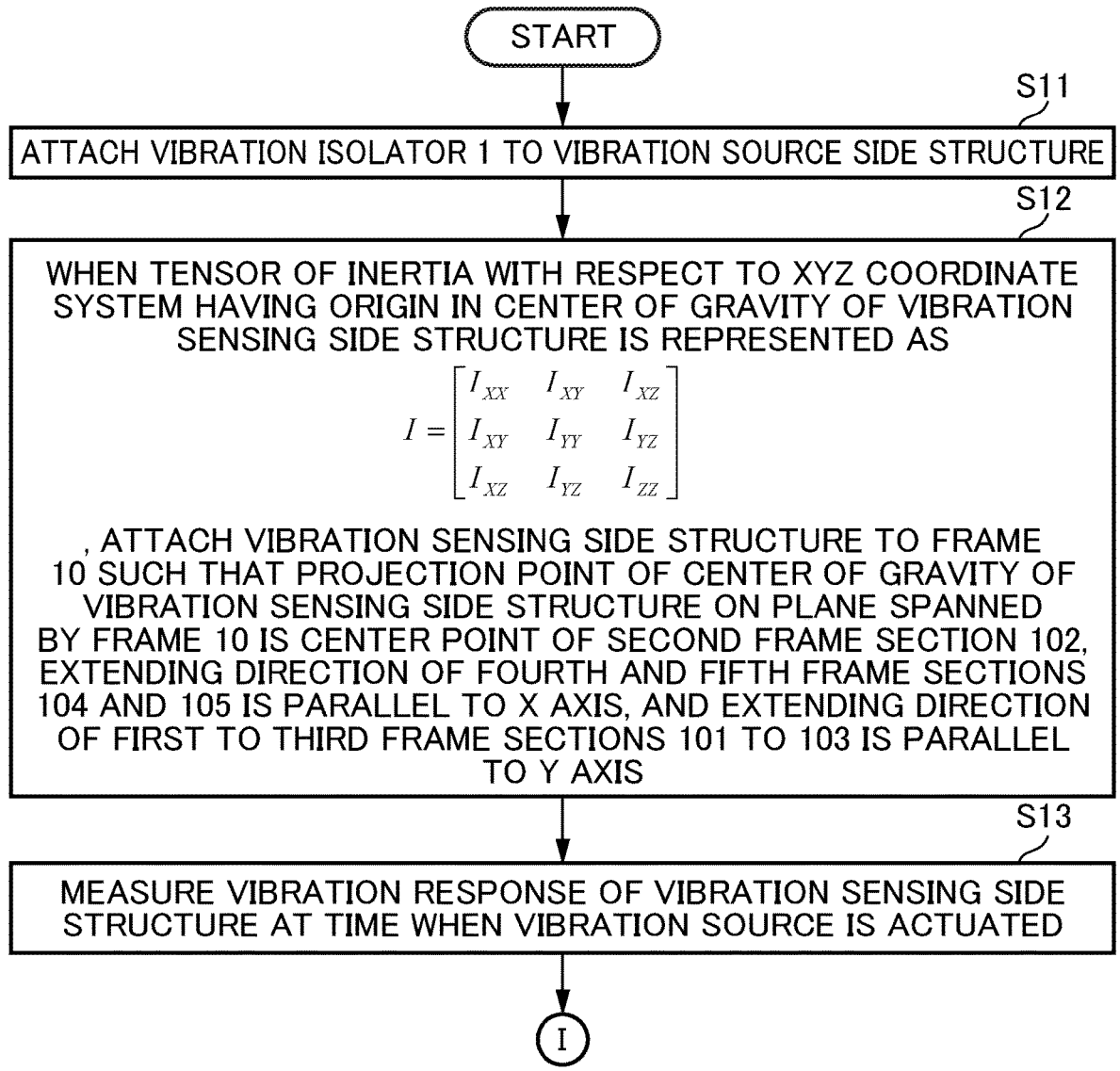
FIG. 14A is a flowchart of an adjusting method for a resonance frequency of the vibration isolator according to the first embodiment of the present invention.

Based on the apparatus configuration explained above, an adjusting method for a resonance frequency of the vibration isolator according to the first embodiment of the present invention is explained below with reference to a flowchart of FIG. 14.

First, the vibration isolator 1 is attached to the vibration source side structure (S11).

Subsequently, when a tensor of inertia with respect to an XYZ coordinate system having an origin in the center of gravity of the vibration sensing side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

the vibration sensing side structure is attached to the frame 10 such that a projection point of the center of gravity of the vibration sensing side structure on a plane spanned by the frame 10 is a center point of the second frame section 102, an extending direction of the fourth and fifth frame sections 104 and 105 is parallel to an X axis, and an extending direction of the first to third frame sections 101 to 103 is parallel to a Y axis (S12).

A frequency characteristic of a vibration response of the vibration sensing side structure at the time when a vibration source is actuated is measured (S13).

When a resonance phenomenon is present in the measured vibration response in a frequency coinciding with any one of a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion, the vibration sensing side structure is detached from the vibration isolator 1, and resonance frequency adjustment explained below is performed (S14).

In an xy coordinate system obtained by rotating an XY coordinate system around a Z axis by $$\theta = \tan^{-1}\left(\frac{2I_{XY}}{I_{XX} - I_{YY}}\right),$$

when rigidity $K_i$ (i=1, 2, 3, and 4) of the first to fourth elastic members 15 to 18 is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_5$ of the fifth elastic member is represented as $$[K_5] = \begin{bmatrix} k_{5\_xx} & 0 & 0 \\ 0 & k_{5\_yy} & 0 \\ 0 & 0 & k_{5\_zz} \end{bmatrix},$$

and an x coordinate and a y coordinate of the xy coordinate system of the first to fifth elastic members 15 to 19 are represented as $r_{pi\_x}$, and $r_{pi\_y}$, the following adjustment is performed to shift the resonance frequencies while satisfying the condition 2 described above.

(1) When a vibration input is present in a frequency coinciding with the resonance frequency of the x-axial rotational motion, the positions of the first to fourth elastic members 15 to 18 are adjusted such that a value of $$\sum_i (k_{i\_zz} r_{pi\_y}^2)$$

changes.

(2) When a vibration input is present in a frequency coinciding with the resonance frequency of the y-axial rotational motion, the positions of the first to fourth elastic members 15 to 18 are adjusted such that a value of $$\sum_i (k_{i\_zz} r_{pi\_x}^2)$$

changes.

(3) When a vibration input is present in a frequency coinciding with the resonance frequency of the z-axial rotational motion, the positions of the first to fourth elastic members 15 to 18 are adjusted such that a value of $$\sum_i (k_{i\_xx} r_{pi\_y}^2 + k_{i\_yy} r_{pi\_x}^2)$$

changes.

(4) When a vibration input is present in a frequency coinciding with the resonance frequency of the x-direction translational motion, the fifth elastic member 19 having dominant rigidity in the x direction is attached to the center of the second frame section 102.

(5) When a vibration input is present in a frequency coinciding with the resonance frequency of the y-direction translational motion, the fifth elastic member 19 having dominant rigidity in the y direction is attached to the center of the second frame section 102.

(6) When a vibration input is present in a frequency coinciding with the resonance frequency of the z-direction translational motion, the fifth elastic member 19 having dominant rigidity in the z direction is attached to the center of the second frame section 102.

After the adjustment of the resonance frequencies, as in step S12, the vibration sensing side structure is attached to the vibration isolator 1 again (S15).

In particular, when the first elastic member 15 and the third elastic member 17 are located on the x axis and the second elastic member 16 and the fourth elastic member 18 are located on the y axis, about the adjustment in (1) described above, it is possible to adjust a distance L2 between the second elastic member 16 and the fourth elastic member 18 and shift the resonance frequency of the x-axial rotational motion. About the adjustment in (2) described above, it is possible to adjust a distance L1 between the first elastic member 15 and the third elastic member 17 and shift the resonance frequency of the y-axial rotational motion. About the adjustment of (3) described above, it is possible to adjust the distance L2 between the second elastic member 16 and the fourth elastic member 18 and/or the distance between the first elastic member 15 and the third elastic member 17 and shift the resonance frequency of the z-axial rotational motion. In this case, the rigidities of the elastic members may be adjusted by adjustment of the rigidities of the elastic members themselves, replacement with elastic members having different rigidities, addition of elastic members, and the like instead of and/or in addition to the adjustment of the distances among the elastic members.

According to this embodiment, it is possible to respectively individually adjust the six resonance frequencies of the resonance frequency in the x-direction translational motion, the resonance frequency of the y-direction translational motion, the resonance frequency of the z-direction translational motion, the resonance frequency of the x-axial rotational motion, the resonance frequency of the y-axial rotational motion, and the resonance frequency of the z-axial rotational motion, which occur in principle.

Therefore, when there is a resonance frequency coinciding with a frequency related to occurrence of resonance among the resonance frequencies, it is possible to prevent resonance of the vibration isolator by shifting the resonance frequency. For the prevention of the resonance, it is unnecessary to increase the number and the weight of vibration isolators. It is unnecessary to perform selection and changes of the number, the disposition, and the like of the elastic members configuring the vibration isolator many times.

According to progress of development of a vibration source device and a vibration sensitive device, it is possible to perform resonance prevention corresponding to the developed vibration source device and the developed vibration sensitive device. Therefore, rework of designing of the vibration source device and the vibration sensitive device decreases.

In the embodiment, the number of elastic members arranged in positions other than the center of the second frame section 102 is four. However, the number may be reduced to three, or may be increased and any appropriate number of elastic members may be arranged, and the adjustment of the resonance frequencies may be performed while satisfying the condition 2 described above.

In the embodiment, the number of elastic members arranged in each position is one. However, a plurality of elastic members may be arranged in each position.

Second Embodiment

Figure 15:
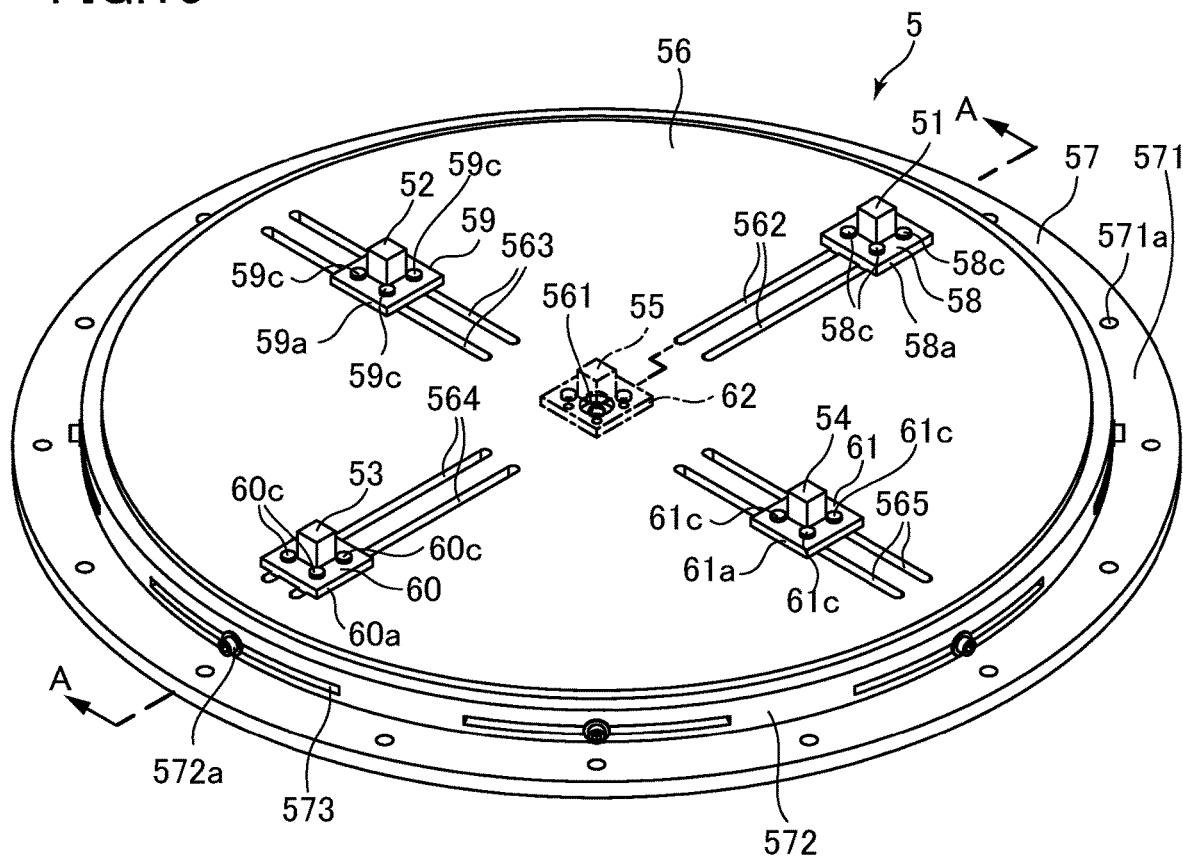
FIG. 15 is a perspective view of a vibration isolator 5 according to a second embodiment of the present invention.
Figure 16:
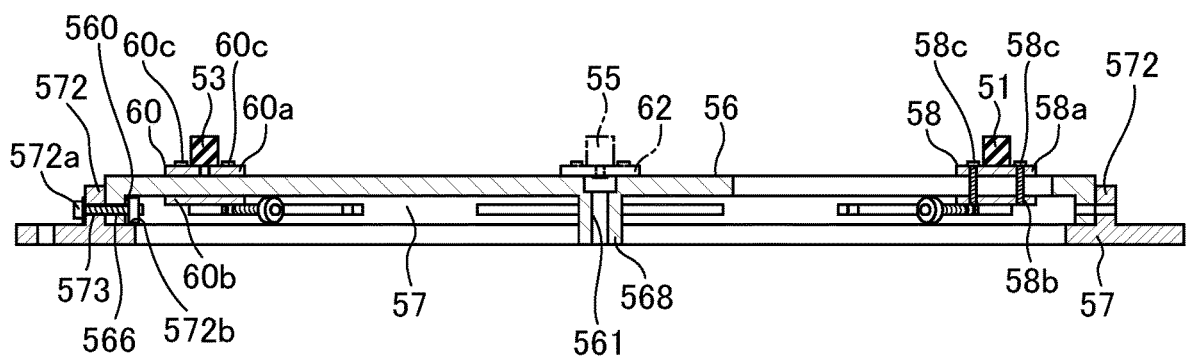
FIG. 16 is an A-A sectional view of the vibration isolator 5 according to the second embodiment of the present invention.
Figure 17:
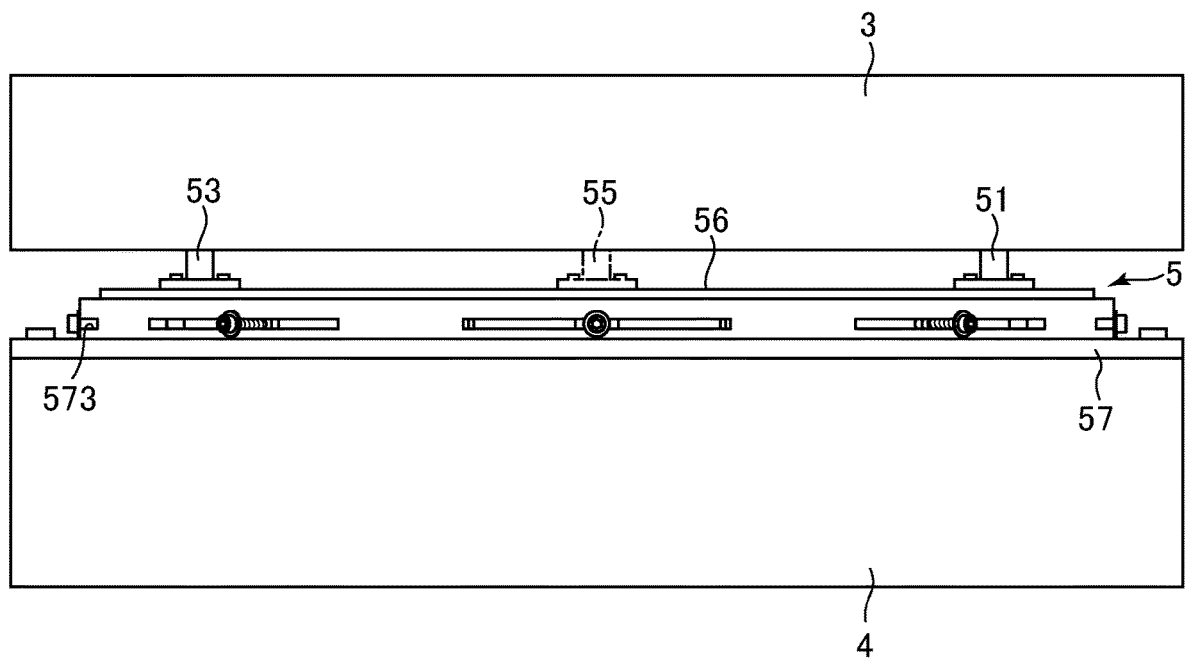
FIG. 17 is a side view of a state in which a vibration sensing side structure and a vibration source side structure are attached to the vibration isolator according to the second embodiment of the present invention.
Figure 18:
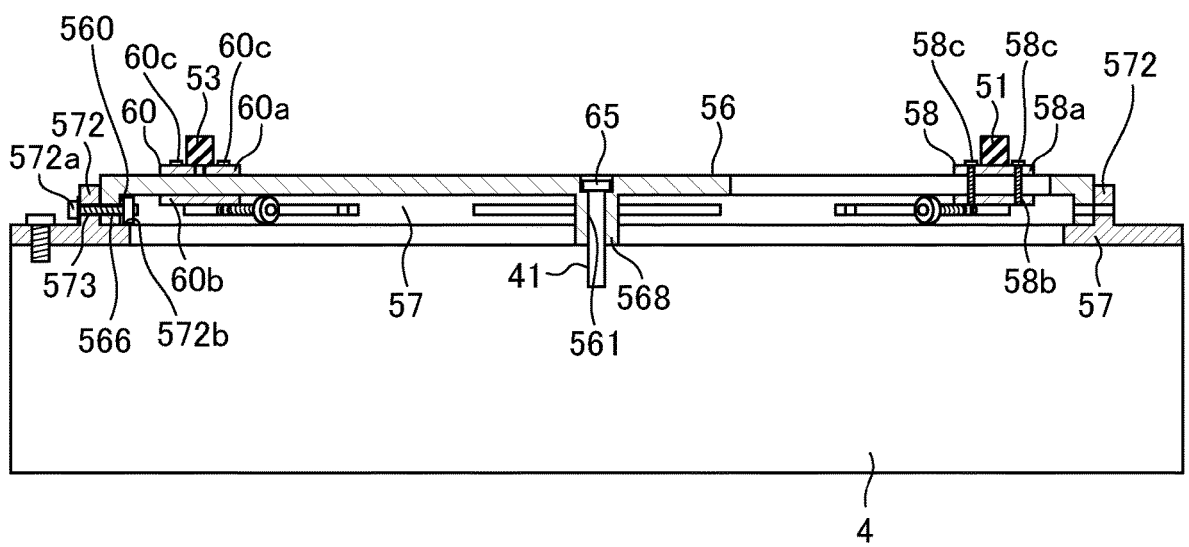
FIG. 18 is a diagram showing an example of a rotating method for a rotating member of the vibration isolator according to the second embodiment of the present invention.

FIGS. 15 and 16 are respectively a perspective view and an A-A sectional view of a vibration isolator 5 according to a second embodiment of the present invention. FIG. 17 is a side view of a state in which a vibration sensing side structure and a vibration source side structure are attached to the vibration isolator according to the second embodiment of the present invention. FIG. 18 is a diagram showing an example of a rotating method for a rotating member of the vibration isolator according to the second embodiment of the present invention. The vibration isolator 5 includes a first elastic member 51, a second elastic member 52, a third elastic member 53, a fourth elastic member 54, a fifth elastic member 55, a rotating member 56, an outer ring frame 57, a first slide section 58, a second slide section 59, a third slide section 60, and a fourth slide section 61.

As the first to fourth elastic members 51 to 54, any appropriate elastic member such as an elastic member including rubber or an elastic member including a spring may be used. However, an elastic member having equal rigidity in the horizontal direction and the vertical direction is desirable. As the fifth elastic member 55, any appropriate elastic member such as an elastic member including rubber or an elastic member including a spring may be used.

The rotating member 56 has a disk-like shape having a first tubular section 560 that falls from the circumferential edge of the rotating member 56. A convex section 568 is formed in the center of a principal plane on a vibration source side structure 4 side of the rotating member 56. A positioning pin hole 561 piercing through the rotating member 56 including the convex section 568 in the thickness direction is formed in the center of the other principal plane of the rotating member 56. As explained below, the rotating member 56 is capable of rotating around a rotation axis which passes the center of the rotating member 56 and is orthogonal to the principal plane. In the rotating member 56, a first position adjustment slit 562, a second position adjustment slit 563, a third position adjustment slit 564, and a fourth position adjustment slit 565, each of which includes a pair of slits extending in the radial direction from positions a predetermined distance apart from the center of the rotating member 56, are formed. The first and third position adjustment slits 562 and 564 are arranged on the same straight line passing the center of the rotating member 56. The second and fourth position adjustment slits 563 and 565 are arranged on the same straight line orthogonal to the straight line and passing the center of the rotating member 56.

The first to fourth slide sections 58 to 61 respectively include rectangular first to fourth elastic member attachment plates 58a to 61a and rectangular first to fourth position fixing plates 58b to 61b. Screw holes are formed at four corners in each of the first elastic member attachment plate 58a and the first position fixing plate 58b. The first elastic member attachment plate 58a and the first position fixing plate 58b are coupled to each other by bolts 58c to be opposed to each other across the rotating member 56. The second to fourth elastic member attachment plates 59a to 61a and the second to fourth position fixing plates 59b to 61b are respectively coupled by bolts 59c to 61c in the same manner.

In such a configuration, when the coupling of the elastic member attachment plates and the position fixing plates by the bolts is loosened, the first to fourth slide sections 58 to 61 become capable of sliding with respect to the rotating member 56 respectively via the first to fourth position adjustment slits 562 to 565 and capable of moving from one ends to the other ends of the first to fourth position adjustment slits 562 to 565. When the bolts coupling the elastic member attachment plates and the position fixing plates are tightened, the first to fourth slide sections 58 to 61 can be fixed to the rotating member 56.

The first to fourth elastic members 51 to 54 are respectively attached on the first to fourth slide sections 58 to 61 by screws. Accordingly, the positions of the first to fourth elastic members 51 to 54 can be respectively adjusted from one ends to the other ends of the first to fourth position adjustment slits 562 to 565. That is, in orthogonal two line segments having an intersection in the center of the rotating member 56 that the rotation axis of the rotating member 56 passes, it is possible to respectively independently adjust a distance L1 between the first and third elastic members 51 and 53 and a distance L2 between the second and fourth elastic members 52 and 54.

The outer ring frame 57 has a cylindrical shape and includes, at an end portion thereof, a flange section 571 formed to project both inward and outward in the radial direction and a second tubular section 572 standing from the flange section 571. In a portion outward in the radial direction of the flange section 571, fixing holes 571a for fixing the outer ring frame 57 to the vibration source side structure 4 with bolts are formed at predetermined intervals. In the second tubular section 572, second angle adjustment slits 573 extending in the circumferential direction are formed at predetermined intervals.

The first tubular section 560 of the rotating member 56 is placed on a portion inward in the radial direction of the flange section 571 of the outer ring frame 57. The rotating member 56 is rotatable around a rotation axis passing the center of the rotating member 56 and orthogonal to a principal plane of the rotating member 56. Consequently, adjustment of a rotation angle can be performed. In this embodiment, as shown in FIG. 18, a positioning pin 65 is inserted through the first positioning pin hole 561 of the rotating member 56 and a second positioning pin hole 41 formed in the vibration source side structure 4 attached to the outer ring frame 57. Consequently, it is possible to accurately rotate the rotating member 56 and perform adjustment of the rotation angle. Note that it goes without saying that it is possible to rotate the rotating member 56 even if such a positioning pin is not used.

In the first tubular section 560 of the rotating member 56, first angle adjustment slits 566 extending in the circumferential direction are formed at predetermined intervals. A bolt 572a passing through the first angle adjustment slit 566 and the second angle adjustment slit 573 of the outer ring frame 57 is tightened by a nut 572b. Consequently, it is possible to fix the rotating member 56, the rotation angle of which is adjusted, to the outer ring frame 57.

A screw hole for fixing an elastic member attachment plate 62 is formed in the center of the principal plane on the elastic member attachment side of the rotating member 56. Consequently, the fifth elastic member 55 can be attached to the rotating member 56 via the elastic member attachment plate 62.

Figure 19B:
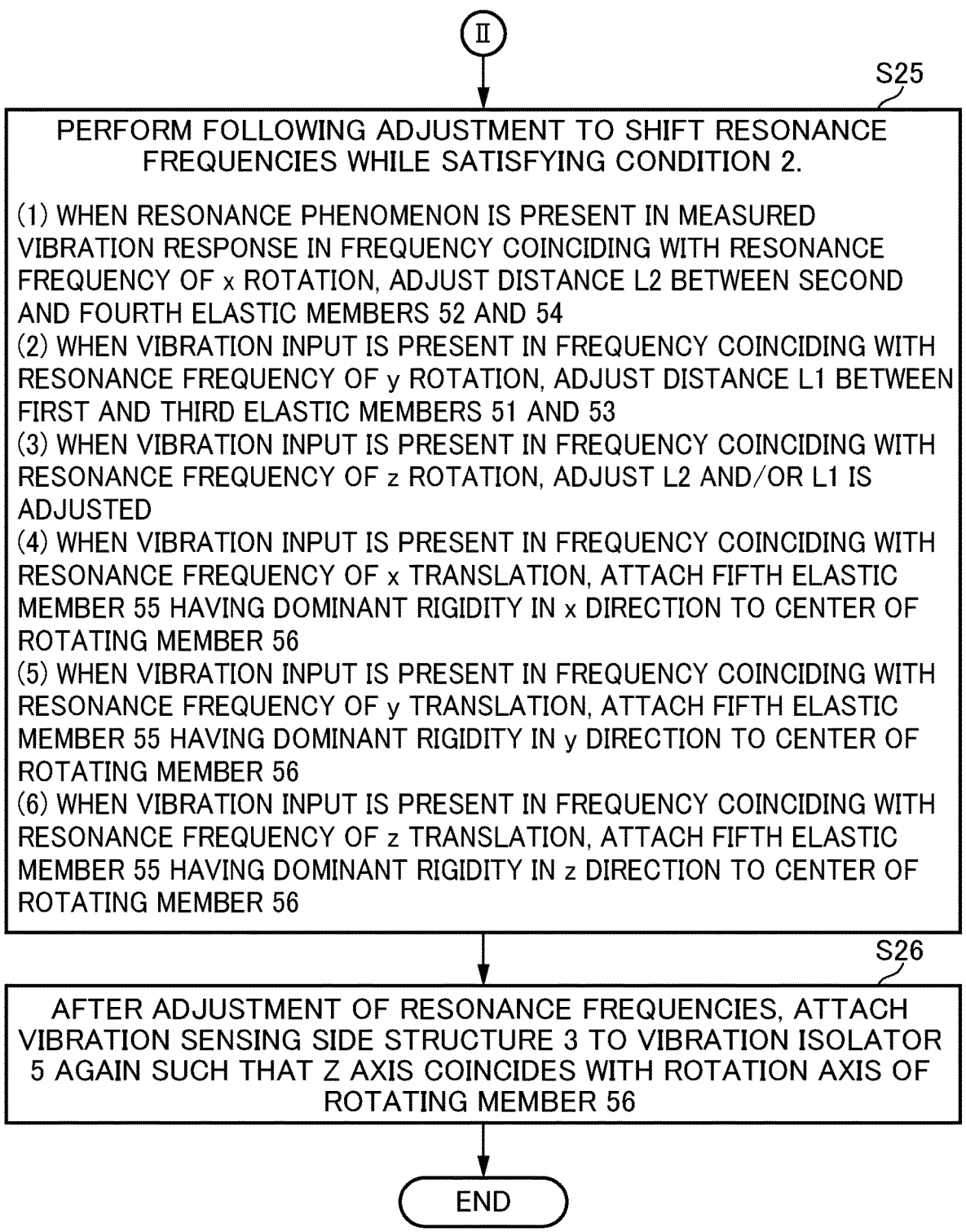
FIG. 19B is a flowchart of the adjusting method for a resonance frequency of the vibration isolator according to the second embodiment of the present invention.

Based on the apparatus configuration explained above, an adjusting method for a resonance frequency of the vibration isolator according to the second embodiment of the present invention is explained below with reference to a flowchart of FIG. 19.

First, the vibration isolator 5 is attached to the vibration source side structure 4 (S21).

Subsequently, when a tensor of inertia with respect to an XYZ coordinate system having an origin in the center of gravity of a vibration sensing side structure 3 is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

the vibration sensing side structure 3 is attached to the vibration isolator 5 such that a Z axis coincides with the rotation axis of the rotating member 56 (S22).

A frequency characteristic of a vibration response of the vibration sensing side structure at the time when a vibration source is actuated is measured (S23).

When a resonance phenomenon is present in the measured vibration response in a frequency coinciding with any one of a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion, the vibration sensing side structure 3 is detached from the vibration isolator 5, and resonance frequency adjustment explained below is performed (S24).

First, when rigidity $K_i$ (i=1, 2, 3, and 4) of the first to fourth elastic members 51 to 54 is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_5$ of the fifth elastic member 55 is represented as $$[K_5] = \begin{bmatrix} k_{5\_xx} & 0 & 0 \\ 0 & k_{5\_yy} & 0 \\ 0 & 0 & k_{5\_zz} \end{bmatrix},$$

and an x coordinate and a y coordinate of the xy coordinate system of the first to fifth elastic members 51 to 55 are represented as $r_{pi\_x}$ and $r_{pi\_x}$, the rotating member 56 is rotated around the rotation axis of the rotating member 56 such that a line segment connecting the first and third elastic members 51 and 53 and a line segment connecting the second and fourth elastic members 52 and 54 coincide with an x axis and a y axis of an xy coordinate system obtained by rotating an XY coordinate system around the Z axis by $$\theta = \tan^{-1}\left(\frac{2I_{XY}}{I_{XX} - I_{YY}}\right). \quad (S25)$$

Subsequently, the following adjustment is performed to shift the resonance frequencies while satisfying the condition 2 described above (S26).

(1) When a vibration input is present in a frequency coinciding with the resonance frequency of the x-axial rotational motion, the distance L2 between the second and fourth elastic members 52 and 54 is adjusted.

(2) When a vibration input is present in a frequency coinciding with the resonance frequency of the y-axial rotational motion, the distance L1 between the first and third elastic members 51 and 53 is adjusted.

(3) When a vibration input is present in a frequency coinciding with the resonance frequency of the z-axial rotational motion, the distance L2 between the second and fourth elastic members 52 and 54 and/or the distance L1 between the first and third elastic members 51 and 53 is adjusted.

(4) When a vibration input is present in a frequency coinciding with the resonance frequency of the x-direction translational motion, the fifth elastic member 55 having dominant rigidity in the x direction is attached to the center of the rotating member 56 via the elastic member attachment plate 62.

(5) When a vibration input is present in a frequency coinciding with the resonance frequency of the y-direction translational motion, the fifth elastic member 55 having dominant rigidity in the y direction is attached to the center of the rotating member 56 via the elastic member attachment plate 62.

(6) When a vibration input is present in a frequency coinciding with the resonance frequency of the z-direction translational motion, the fifth elastic member 55 having dominant rigidity in the z direction is attached to the center of the rotating member 56 via the elastic member attachment plate 62.

When rigidities of the first and third elastic members 51 and 53 are equal and rigidities of the second and fourth elastic members 52 and 54 are equal, the condition 1 described above can be satisfied by performing the adjustment of (1) to (3) while arranging the first and third elastic members 51 and 53 and the second and fourth elastic members 52 and 54 to be symmetrical with respect to the center of the rotating member 56. The adjustment is easier if a position adjusting mechanism for the elastic members is any appropriate mechanism capable of adjusting at least one of the distance L1 between the first and third elastic members 51 and 53 and the distance L2 between the second and fourth elastic members 52 and 54 such that distances from the center of the rotating member 56 to the elastic member groups are equal.

After the adjustment of the resonance frequencies, the vibration sensing side structure 3 is attached to the vibration isolator 5 again such that the Z axis coincides with the rotation axis of the rotating member 56 (S27).

With such a configuration, this embodiment has the following advantages in addition to the advantages in the first embodiment. That is, in the first embodiment, complicated adjustment for simultaneously performing the adjustment of θ and the positions of the elastic members is required. However, according to this embodiment, adjustment of θ can be performed on all the elastic members at a time. Thereafter, the position adjustment for the elastic members can be performed. Therefore, it is possible to easily adjust the resonance frequencies.

In the embodiment, the number of elastic members arranged in positions other than the center of the rotating member 56 is four. However, any appropriate number of elastic members may be disposed by changing the number and the disposition of the position adjustment slits and using another any appropriate mechanism, and the adjustment of the resonance frequencies may be performed while satisfying the condition 2 described above.

In the embodiment, the distances among the elastic members are adjusted. However, the rigidities of the elastic members may be adjusted by adjustment of the rigidities of the elastic members themselves, replacement with elastic members having different rigidities, addition of elastic members, and the like instead of and/or in addition to the adjustment of the distances among the elastic members.

In the embodiment, the number of elastic members arranged in the positions is one. However, a plurality of elastic members may be arranged in the positions.

Third Embodiment

Figure 20B:
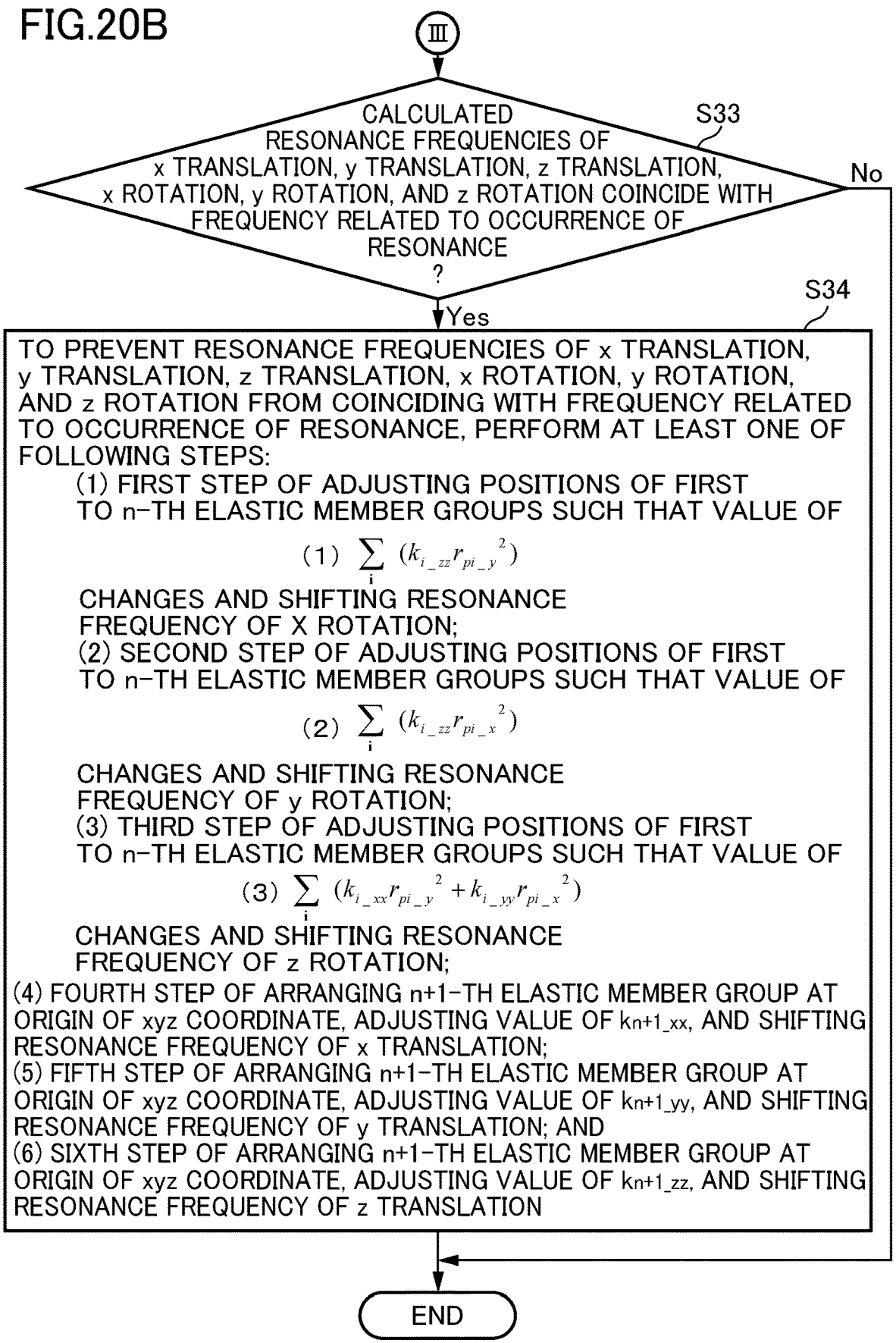
FIG. 20B is a flowchart of the designing method for the vibration isolator according to the third embodiment of the present invention.

A designing method for a vibration isolator according to a third embodiment of the present invention is explained below with reference to a flowchart of FIG. 20. Note that, in this embodiment, the vibration isolator may be configured by only three or more elastic members.

The vibration isolator to be designed includes first to n-th (n is an integer equal to or larger than 3) elastic member groups and/or an n+1-th elastic member group, each of which includes one or more elastic members, the first to n-th elastic member groups and/or the n+1-th elastic member group is located on an xy plane of an xyz coordinate system, one side of the first to n-th elastic member groups and/or the n+1-th elastic member group is a side with which a vibration sensing side structure or a vibration source side structure is in contact, and an xy coordinate system of the xyz coordinate system is a coordinate system obtained by, when a tensor of inertia I with respect to an XYZ coordinate system having an origin in the center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system is coaxial with the Z axis.

Based on such a premise, first, when rigidity $K_i$ (i=1, 2, . . . , and n) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$ of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the xy coordinate system of the first to n-th elastic member groups are represented as $r_{pi\_x}$ and $r_{pi\_y}$, positions of the first to n-th elastic member groups and/or the n+1-th elastic member group are set to satisfy the condition 2 described above (S31).

Subsequently, when the mass of the vibration sensing side structure or the vibration source side structure is represented as m, a z coordinate in the xyz coordinate system of the center of gravity of the vibration sensing side structure or the vibration source side structure is represented as $r_{pi\_z}$, and a tensor of inertia I' with respect to the xyz coordinate system is represented as $$I' = \begin{bmatrix} I_{xx} & I_{xy} & I_{xz} \\ I_{xy} & I_{yy} & I_{yx} \\ I_{xz} & I_{yz} & I_{zz} \end{bmatrix},$$

a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion are calculated from the diagonal linearization translational motion equation of Expression (3) described above and the diagonal linearization rotational motion equation of Expression (4) described above (S32).

When the calculated resonance frequencies do not coincide with a frequency related to occurrence of resonance, which is a frequency at which a resonance phenomenon occurs or is conceivably occur in a vibration response of a vibration sensing side structure at the time when a vibration source is actuated in a system of a vibration source side structure—a vibration isolator—a vibration sensing side structure, the designing method ends. When the calculated resonance frequencies coincide with the frequency related to occurrence of resonance, the designing method proceeds to the next step (S33).

When the calculated frequencies coincide with the frequency related to occurrence of resonance, at least one step of the following steps is performed to prevent the calculated resonance frequencies from coinciding with the frequency related to occurrence of resonance:

(1) a first step of adjusting positions of the first to n-th elastic member groups such that a value of $$\sum_i (k_{i\_zz} r_{pi\_y}^2)$$

changes and shifting the resonance frequency of the x-axial rotational motion;

(2) a second step of adjusting the positions of the first to n-th elastic member groups such that a value of $$\sum_i (k_{i\_zz} r_{pi\_x}^2)$$

changes and shifting the resonance frequency of the y-axial rotational motion;

(3) a third step of adjusting the positions of the first to n-th elastic member groups such that a value of $$\sum_i (k_{i\_xx} r_{pi\_y}^2 + k_{i\_yy} r_{pi\_x}^2)$$

changes and shifting the resonance frequency of the z-axial rotational motion;

(4) a fourth step of arranging the n+1-th elastic member group at an origin of the xyz coordinate, adjusting a value of $k_{n+1\_xx}$, and shifting the resonance frequency of the x-direction translational motion;

(5) a fifth step of arranging the n+1-th elastic member group at the origin of the xyz coordinate, adjusting a value of $k_{n+1\_yy}$, and shifting the resonance frequency of the y-direction translational motion; and (6) a sixth step of arranging the n+1-th elastic member group at the origin of the xyz coordinate, adjusting a value of $k_{n+1\_zz}$, and shifting the resonance frequency of the z-direction translational motion (S34).

In step S34, when n=4, if the first elastic member 15 and the third elastic member 17 are located on the x axis and the second elastic member 16 and the fourth elastic member 18 are located on the y axis, about the adjustment of (1) described above, it is possible to adjust the distance L2 between the second elastic member 16 and the fourth elastic member 18 and shift the resonance frequency of the x-axial rotational motion. About the adjustment in (2) described above, it is possible to adjust the distance L1 between the first elastic member 15 and the third elastic member 17 and shift the resonance frequency of the y-axial rotational motion. About the adjustment of (3) described above, it is possible to adjust the distance L2 between the second elastic member 16 and the fourth elastic member 18 and/or the distance between the first elastic member 15 and the third elastic member 17 and shift the resonance frequency of the z-axial rotational motion. In this case, the rigidities of the elastic members may be adjusted by adjustment of the rigidities of the elastic members themselves, replacement with elastic members having different rigidities, addition of elastic members, and the like instead of and/or in addition to the adjustment of the distances among the elastic members.

In this case, further, when rigidities of the first and third elastic member groups are equal and rigidities of the second and fourth elastic member groups are equal, at least one of the first to third steps may be performed while arranging the first and third elastic member groups symmetrically with respect to the origin on the x axis of the xyz coordinate system and arranging the second and fourth elastic member groups symmetrically with respect to the origin on the y axis of the xyz coordinate system.

It is possible to manufacture a structure to which the vibration isolator designed according to the designing method is attached.

According to this embodiment, it is possible to respectively individually adjust the six resonance frequencies of the resonance frequency in the x-direction translational motion, the resonance frequency of the y-direction translational motion, the resonance frequency of the z-direction translational motion, the resonance frequency of the x-axial rotational motion, the resonance frequency of the y-axial rotational motion, and the resonance frequency of the z-axial rotational motion, which occur in principle.

Therefore, when there is a resonance frequency coinciding with a frequency related to occurrence of resonance among the resonance frequencies, it is possible to prevent resonance of the vibration isolator by shifting the resonance frequency.

According to progress of development of a vibration source device and a vibration sensitive device, it is possible to perform resonance prevention corresponding to the developed vibration source device and the developed vibration sensitive device. Therefore, rework of designing of the vibration source device and the vibration sensitive device decreases.

In particular, it is possible to perform designing of a vibration isolator while confirming the number, the arrangement, the rigidities, and the like of elastic member groups considering a frequency related to occurrence of resonance. In that case, it is possible to confirm the six resonance frequencies described above and the number, the arrangement, the rigidities, and the like of the elastic member groups from a tensor of inertia, the mass, and the center of gravity height of a vibration sensing side structure or a vibration source side structure to which the vibration isolator is attached without using the detailed design information such as CAD data and the like.

There is an advantage that, only with arrangement and setting of elastic member groups that satisfy the condition 2 in step S31 described above, in particular, in the case of rhombus arrangement, even when adjustment is necessary thereafter, the distance between opposed elastic member groups only has to be adjusted in a direction between the opposed elastic member groups.

Fourth Embodiment

Figure 21:
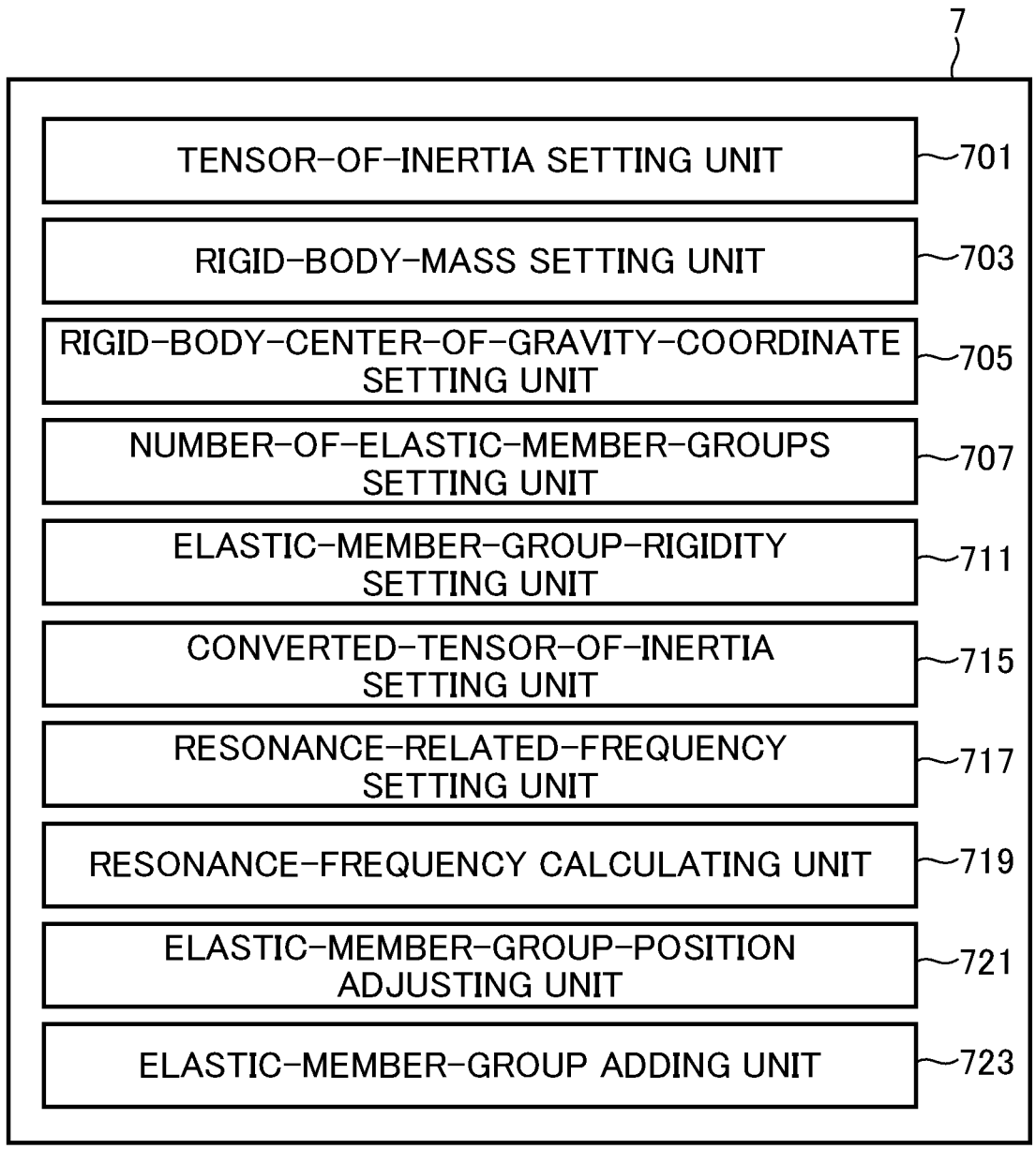
FIG. 21 is a diagram showing an overall configuration of a designing system for a vibration isolator according to a fourth embodiment of the present invention.

FIG. 21 is a diagram showing an overall configuration of a designing system for a vibration isolator according to a fourth embodiment of the present invention. A vibration isolator designing system 7 includes a tensor-of-inertia setting unit 701, a rigid-body-mass setting unit 703, a rigid-body-center-of-gravity-coordinate setting unit 705, a number-of-elastic-member-groups setting unit 707, an elastic-member-group-rigidity setting unit 711, a converted-tensor-of-inertia setting unit 715, a resonance-related-frequency setting unit 717, a resonance-frequency calculating unit 719, an elastic-member-group-position adjusting unit 721, and an elastic-member-group adding unit 723. The vibration isolator designing system 7 may be, for example, a server, a PC, or a mobile device such as a smart phone or a tablet computer. The vibration isolator designing system 7 is not limited to these devices and may be appropriate any devices. The vibration isolator designing system 7 does not need to be configured as one physical device and may be configured from a plurality of physical devices. Note that, in this embodiment, the vibration isolator may be configured by only three or more physical devices.

The tensor-of-inertia setting unit 701 sets, according to, for example, an input from a user, a tensor of inertia I with respect to an XYZ coordinate system having an origin in the center of gravity of a vibration sensing side structure or a vibration source side structure in contact with a vibration isolator.

The rigid-body-mass setting unit 703 sets, according to, for example, an input from the user, mass m of the vibration sensing side structure or the vibration source side structure in contact with the vibration isolator (S403).

The rigid-body-center-of-gravity-coordinate setting unit 705 sets, according to, for example, an input from the user, a z coordinate $r_{pi\_z}$ of an xyz coordinate system of the center of gravity of the vibration sensing side structure or the vibration source side structure in contact with the vibration isolator.

The number-of-elastic-member-groups setting unit 707 sets a number n of elastic member groups according to, for example, an input from the user.

The elastic-member-group-rigidity setting unit 711 sets rigidity $K_i$ (i=1, 2, . . . , and n) of the first to n-th elastic member groups $$[K_i] = \begin{bmatrix} k_{i\_xx} & 0 & 0 \\ 0 & k_{i\_yy} & 0 \\ 0 & 0 & k_{i\_zz} \end{bmatrix}$$

according to, for example, an input from the user.

The converted-tensor-of-inertia setting unit 715 sets a tensor of inertia with respect to an xyz coordinate system $$I' = \begin{bmatrix} I_{xx} & I_{xy} & I_{xz} \\ I_{xy} & I_{yy} & I_{yx} \\ I_{xz} & I_{yz} & I_{zz} \end{bmatrix}$$

according to an input from the user and conversion from the tensor of inertia I with respect to the XYZ coordinate system.

The resonance-related-frequency setting unit 717 sets a frequency related to occurrence of resonance according to, for example, an input from the user.

The resonance-frequency calculating unit 719 calculates a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion are calculated from the diagonal linearization translational motion equation of Expression (3) described above and the diagonal linearization rotational motion equation of Expression (4) described above on the basis of values of the set parameters.

When an x coordinate and a y coordinate of the xy coordinate system of the first to n-th elastic member groups are represented as $r_{pi\_x}$ and $r_{pi\_y}$, the elastic-member-group-position adjusting unit 721 shifts the resonance frequencies as explained below to prevent the calculated resonance frequencies from coinciding with the set frequency related to occurrence of resonance while satisfying the condition 2 described above.

When it is necessary to shift the resonance frequencies of the x-direction translational motion, the y-direction translational motion, and the z-direction translational motion in the adjustment described above, the elastic-member-group adding unit 723 performs additional arrangement of elastic member groups for arranging the n+1-th elastic member group in the origin of the xyz coordinate, adjusting values of $k_{n+1\_xx}$, $k_{n+1\_yy}$, and $k_{n+1\_zz}$, and shifting the resonance frequencies.

Figure 22:
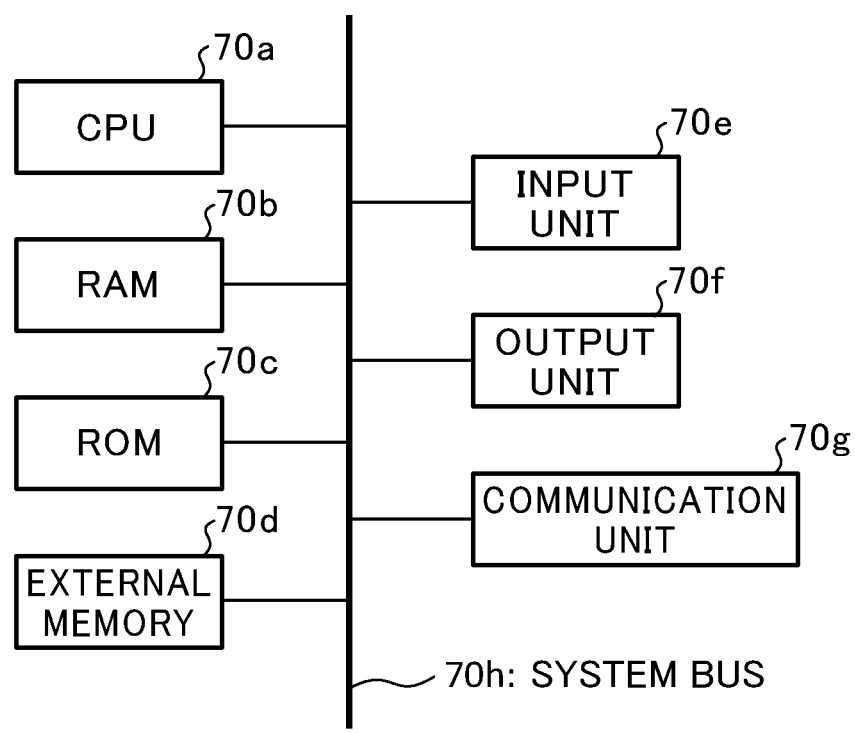
FIG. 22 is a diagram showing an example of a hardware configuration of the vibration isolator designing system according to the fourth embodiment of the present invention.

FIG. 22 is a diagram showing an example of a hardware configuration of the vibration isolator designing system 7 according to this embodiment. The vibration isolator designing system 7 includes a CPU 70a, a RAM 70b, a ROM 70c, an external memory 70d, an input unit 70e, an output unit 70f, and a communication unit 70g. The RAM 70b, the ROM 70c, the external memory 70d, the input unit 70e, the output unit 70f, and the communication unit 70g are connected to the CPU 70a via a system bus 70h.

The CPU 70a collectively controls the devices connected to the system bus 70h.

In the ROM 70c and the external memory 70d, a BIOS or an OS, which is a control program of the CPU 70a, various programs and data necessary for realizing functions executed by a computer, and the like are stored.

The RAM 70b functions as a main memory, a work area, and the like of the CPU. The CPU 70a loads programs and the like necessary in execution of processing from the ROM 70c and the external memory 70d to the RAM 70b and executes the loaded programs to realize various operations.

The external memory 70d is configured from, for example, a flash memory, a hard disk, a DVD-RAM, or a USB memory.

The input unit 70e receives an operation instruction and the like from the user and the like. The input unit 70e is configured from an input device such as an input button, a keyboard, a pointing device, a wireless remote controller, a microphone, or a camera.

The output unit 70f outputs data to be processed by the CPU 70a and data to be stored in the RAM 70b, the ROM 70c, and the external memory 70d. The output unit 70f is configured from an output device such as a CRT display, an LCD, an organic EL panel, a printer, or a speaker.

The communication unit 70g is an interface for performing connection to and communication with an external apparatus via a network or directly. The communication unit 70g is configured from an interface such as a serial interface or a LAN interface.

The sections of the vibration isolator designing system 7 shown in FIG. 21 are realized by various programs stored in the ROM 70c and the external memory 70d using the CPU 70a, the RAM 70b, the ROM 70c, the external memory 70d, the input unit 70e, the output unit 70f, the communication unit 70g, and the like as resources.

Figure 23C:
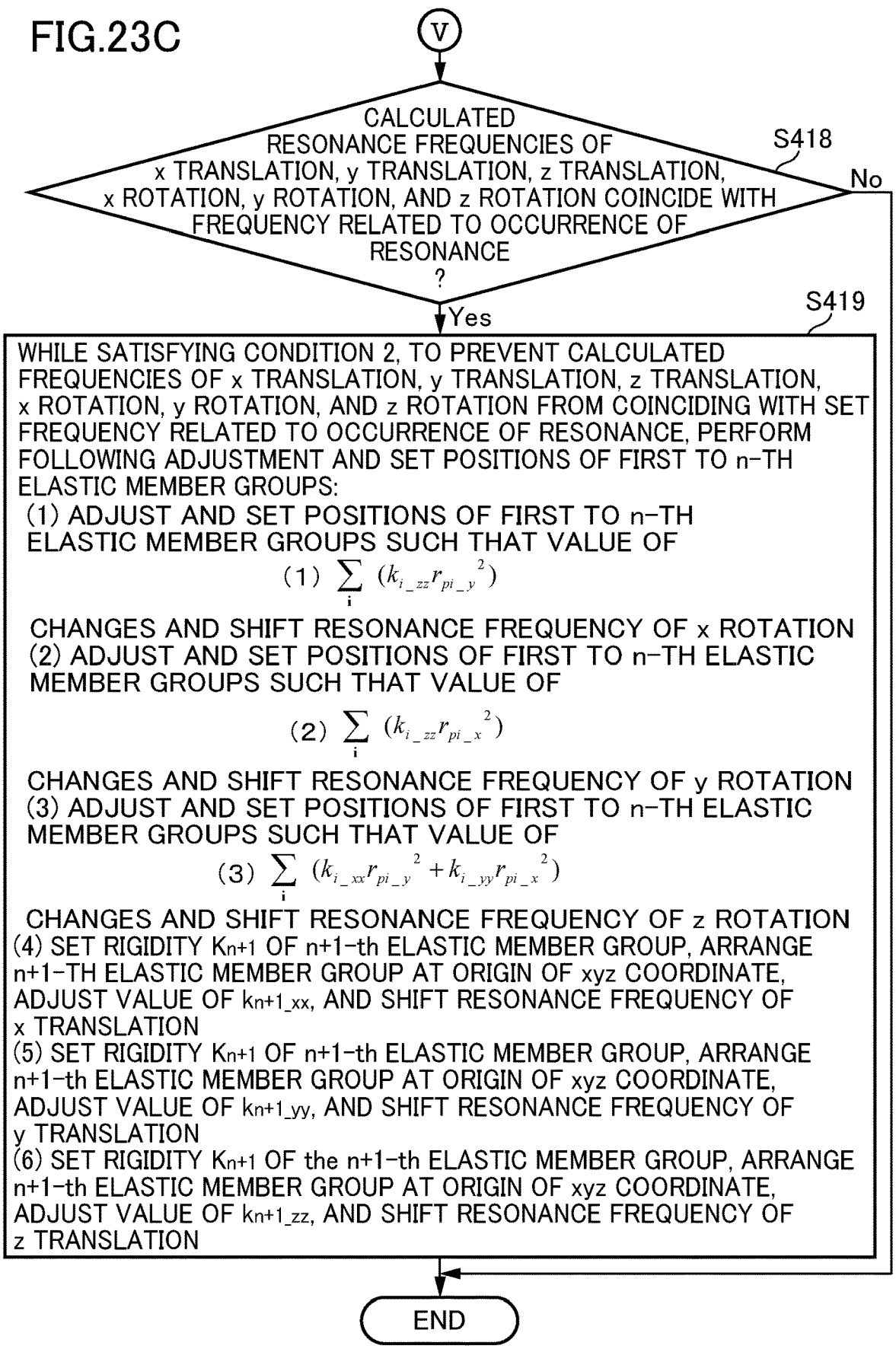
FIG. 23A is a flowchart of designing processing of the vibration isolator designing system according to the fourth embodiment of the present invention.
FIG. 23B is a flowchart of the designing processing of the vibration isolator designing system according to the fourth embodiment of the present invention.
FIG. 23 C is a flowchart of the designing processing of the vibration isolator designing system according to the fourth embodiment of the present invention.

Based on the system configuration explained above, an example of designing processing of the vibration isolator designing system according to the fourth embodiment of the present invention is explained below with reference to FIGS. 21 and 23 and the like. FIG. 23 is a flowchart of the designing processing of the vibration isolator designing system according to this embodiment.

The vibration isolator to be designed includes first to n-th (n is an integer equal to or larger than 3) elastic member groups and/or an n+1-th elastic member group, each of which includes one or more elastic members, the first to n-th elastic member groups and/or the n+1-th elastic member group is located on an xy plane of an xyz coordinate system, one side of the first to n-th elastic member groups and/or the n+1-th elastic member group is a side with which a vibration sensing side structure or a vibration source side structure is in contact, and an xy coordinate system of the xyz coordinate system is a coordinate system obtained by, when a tensor of inertia I with respect to an XYZ coordinate system having an origin in the center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system is coaxial with the Z axis.

Based on such a premise, first, the tensor-of-inertia setting unit 701 sets, according to, for example, an input from the user, the tensor of inertia I with respect to the XYZ coordinate system having the origin in the center of gravity of the vibration sensing side structure or the vibration source side structure in contact with the vibration isolator (S401).

The rigid-body-mass setting unit 703 sets, according to, for example, an input from the user, mass m of the vibration sensing side structure or the vibration source side structure in contact with the vibration isolator (S403).

The rigid-body-center-of-gravity-coordinate setting unit 705 sets, according to, for example, an input from the user, a z coordinate $r_{pi\_z}$ of the xyz coordinate system of the center of gravity of the vibration sensing side structure or the vibration source side structure in contact with the vibration isolator (S405).

The number-of-elastic-member-groups setting unit 707 sets a number n of elastic member groups according to, for example, an input from the user (S407).

The elastic-member-group-rigidity setting unit 711 sets rigidity $K_i$ (i=1, 2, . . . , and n) of the first to n-th elastic member groups $$[K_i] = \begin{bmatrix} k_{i\_xx} & 0 & 0 \\ 0 & k_{i\_yy} & 0 \\ 0 & 0 & k_{i\_zz} \end{bmatrix}$$

according to, for example, an input from the user (S409).

The converted-tensor-of-inertia setting unit 715 sets a tensor of inertia with respect to the xyz coordinate system $$I' = \begin{bmatrix} I_{xx} & I_{xy} & I_{xz} \\ I_{xy} & I_{yy} & I_{yx} \\ I_{xz} & I_{yz} & I_{zz} \end{bmatrix}$$

according to an input from the user and conversion from the tensor of inertia I with respect to the XYZ coordinate system (S413).

The resonance-related-frequency setting unit 717 sets a frequency related to occurrence of resonance according to, for example, an input from the user (S415).

The resonance-frequency calculating unit 719 calculates a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion are calculated from the diagonal linearization translational motion equation of Expression (3) described above and the diagonal linearization rotational motion equation of Expression (4) described above on the basis of values of the set parameters (S417).

When the calculated resonance frequencies do not coincide with the set frequency related to occurrence of resonance, the designing processing ends. When the calculated resonance frequencies coincide with the set frequency related to the occurrence of resonance, the designing processing proceeds to the next step (S418).

When the calculated frequencies coincide with the frequency related to occurrence of resonance, the elastic-member-group-position adjusting unit 721 performs, when an x coordinate and a y coordinate of the xy coordinate system of the first to n-th elastic member groups are represented as $r_{pi\_x}$ and $r_{pi\_y}$, the following adjustment to prevent the calculated resonance frequencies from coinciding with the set frequency related to occurrence of resonance while satisfying the condition 2 described above and sets positions of the first to n-th elastic member groups (S419).

(1) The elastic-member-group-position adjusting unit 721 adjusts and sets positions of the first to n-th elastic member groups such that a value of $$\sum_i (k_{i\_zz} r_{pi\_y}^2)$$

changes and shifts the resonance frequency of the x-axial rotational motion.

(2) The elastic-member-group-position adjusting unit 721 adjusts and sets the positions of the first to n-th elastic member groups such that a value of $$\sum_i (k_{i\_zz} r_{pi\_x}^2)$$

changes and shifts the resonance frequency of the y-axial rotational motion.

(3) The elastic-member-group-position adjusting unit 721 adjusts and sets the positions of the first to n-th elastic member groups such that a value of $$\sum_i (k_{i\_xx} r_{pi\_y}^2 + k_{i\_yy} r_{pi\_x}^2)$$

changes and shifts the resonance frequency of the z-axial rotational motion.

(4) The elastic-member-group-rigidity setting unit 711 sets rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix}$$

according to, for example, an input from the user and the elastic-member-group adding unit 723 arranges the n+1-th elastic member group at an origin of the xyz coordinate, adjusts a value of $k_{n+1\_xx}$, and shifts the resonance frequency of the x-direction translational motion.

(5) The elastic-member-group-rigidity setting unit 711 sets the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix}$$

according to, for example, an input from the user and the elastic-member-group adding unit 723 arranges the n+1-th elastic member group at the origin of the xyz coordinate, adjusts a value of $k_{n+1\_yy}$, and shifts the resonance frequency of the y-direction translational motion.

(6) The elastic-member-group-rigidity setting unit 711 sets the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix}$$

according to, for example, an input from the user and the elastic-member-group adding unit 723 arranges the n+1-th elastic member group at the origin of the xyz coordinate, adjusts a value of $k_{n+1\_zz}$, and shifts the resonance frequency of the z-direction translational motion.

In particular, when n=4, if the first elastic member 15 and the third elastic member 17 are located on the x axis and the second elastic member 16 and the fourth elastic member 18 are located on the y axis, about the adjustment of (1) described above, it is possible to adjust the distance L2 between the second elastic member 16 and the fourth elastic member 18 and shift the resonance frequency of the x-axial rotational motion. About the adjustment in (2) described above, it is possible to adjust the distance L1 between the first elastic member 15 and the third elastic member 17 and shift the resonance frequency of the y-axial rotational motion. About the adjustment of (3) described above, it is possible to adjust the distance L2 between the second elastic member 16 and the fourth elastic member 18 and/or the distance between the first elastic member 15 and the third elastic member 17 and shift the resonance frequency of the z-axial rotational motion. In this case, the rigidities of the elastic members may be adjusted by adjustment of the rigidities of the elastic members themselves, replacement with elastic members having different rigidities, addition of elastic members, and the like instead of and/or in addition to the adjustment of the distances among the elastic members.

In this case, further, when rigidities of the first and third elastic member groups are equal and rigidities of the second and fourth elastic member groups are equal, at least one of the first to third adjustments may be performed while arranging the first and third elastic member groups symmetrically with respect to the origin on the x axis of the xyz coordinate system and arranging the second and fourth elastic member groups symmetrically with respect to the origin on the y axis of the xyz coordinate system.

It is possible to manufacture a structure to which the vibration isolator designed according to the designing method is attached.

With such a configuration, this embodiment has the following advantage in addition to the advantages of the third embodiment. That is, it is possible to automatically design arrangement of the elastic member groups avoiding the frequency related to occurrence of resonance.

Fifth Embodiment

Figure 24:
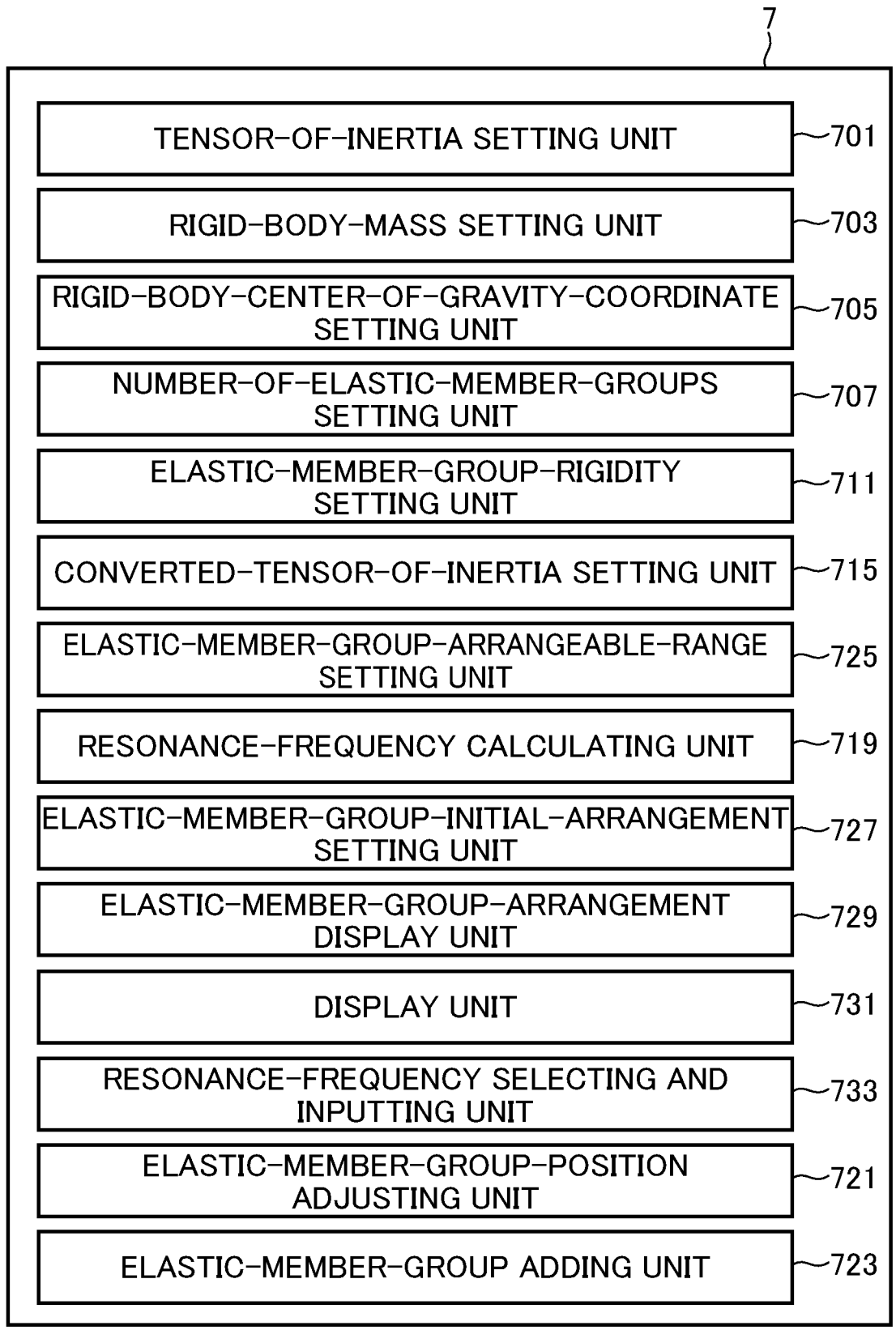
FIG. 24 is a diagram showing an overall configuration of a designing system for a vibration isolator according to a fifth embodiment of the present invention.

FIG. 24 is a diagram showing an overall configuration of a designing system for a vibration isolator according to a fifth embodiment of the present invention. The configuration of the vibration isolator designing system according to the fifth embodiment of the present invention is explained with reference to FIG. 24. In FIG. 24, portions corresponding to the portions shown in FIG. 21 are denoted by the same reference numerals and signs. Redundant explanation of the fourth embodiment is omitted. Note that, in this embodiment, the vibration isolator may be configured by only three or more elastic members.

The vibration isolator designing system 7 includes the tensor-of-inertia setting unit 701, the rigid-body-mass setting unit 703, the rigid-body-center-of-gravity-coordinate setting unit 705, the number-of-elastic-member-groups setting unit 707, the elastic-member-group-rigidity setting unit 711, the converted-tensor-of-inertia setting unit 715, the resonance-frequency calculating unit 719, the elastic-member-group-position adjusting unit 721, the elastic-member-group adding unit 723, an elastic-member group-arrangeable-range setting unit 725, an elastic-member group-initial-arrangement setting unit 727, an elastic-member-group-arrangement display unit 729, a display unit 731, and a resonance-frequency selecting and inputting unit 733.

The elastic-member-group-arrangeable-range setting unit 725 sets an elastic member group arrangeable range according to, for example, an input from a user.

The elastic-member-group-initial-arrangement setting unit 727 calculates initial arrangement of the first to n-th elastic member groups satisfying the condition 2 described above.

The elastic-member group-arrangement display unit 729 displays set positions of the first to n-th elastic member groups and resonance frequencies calculated by the resonance-frequency calculating unit 719. When a resonance frequency to be shifted is selected, the elastic-member-group-arrangement display unit 729 displays an elastic member group for which position adjustment is necessary in order to shift the selected resonance frequency distinguishably from an elastic member group for which the position adjustment is unnecessary and displays a line indicating a position adjustment direction.

The display unit 731 is a display or the like. Various data is displayed on the display unit 731.

The resonance-frequency selecting and inputting unit 733 prompts for selection and input of a resonance frequency to be shifted out of the resonance frequencies calculated by the resonance-frequency calculating unit 719.

Figure 25A:
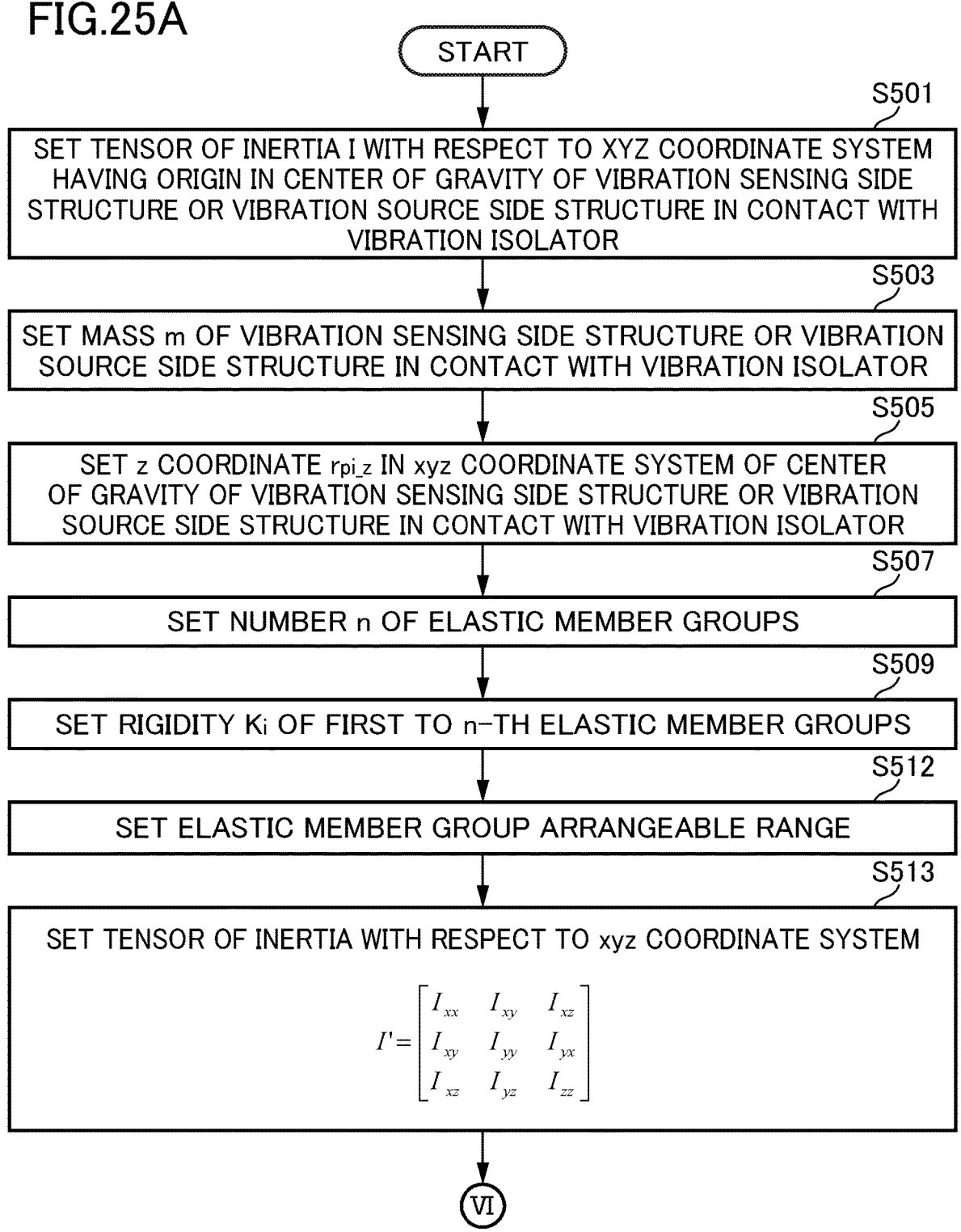
FIG. 25A is a flowchart of designing processing of the vibration isolator designing system according to the fifth embodiment of the present invention.
Figure 26:
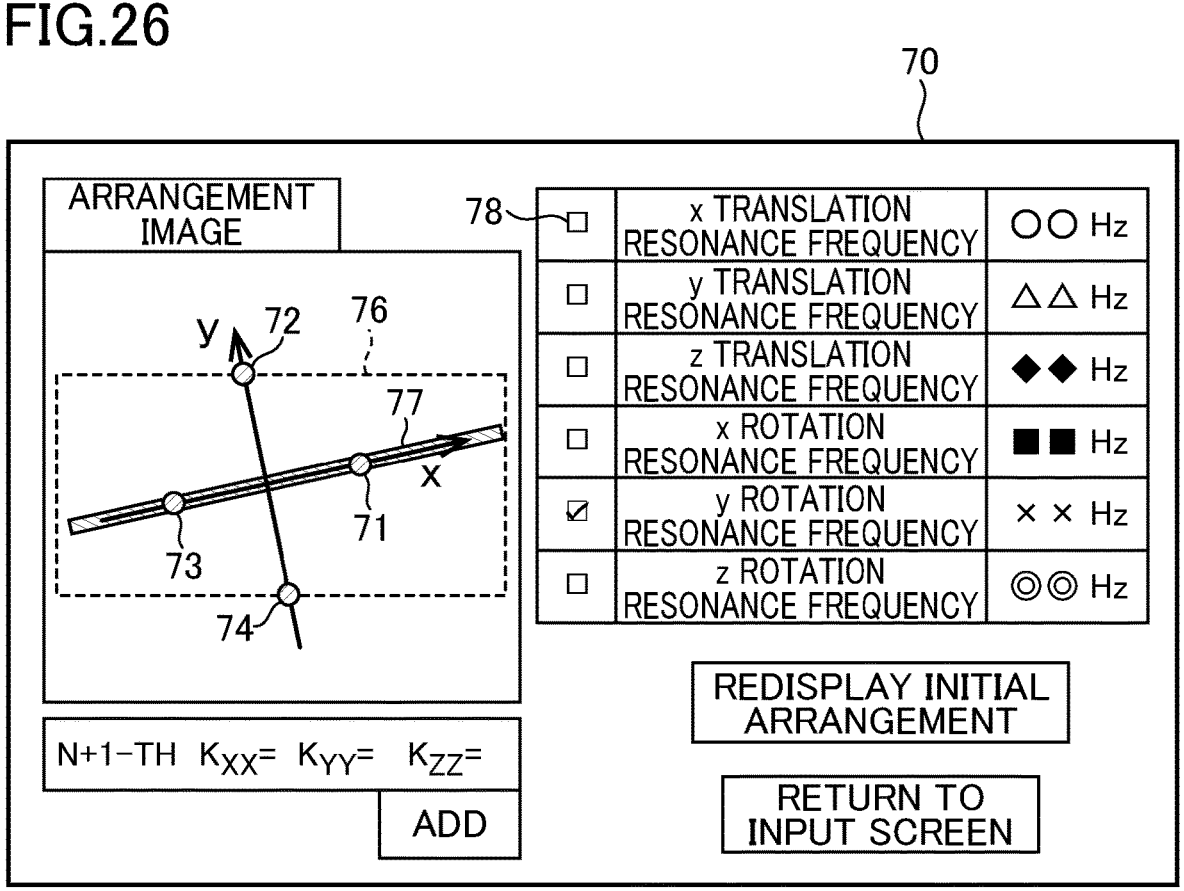
FIG. 26 is an example of a display screen of the vibration isolator designing system according to the fifth embodiment of the present invention.

Based on the system configuration explained above, an example of designing processing for the vibration isolator designing system according to the fifth embodiment of the present invention is explained below with reference to FIGS. 24 to 26 and the like. FIG. 25 is a flowchart of the designing processing for the vibration isolator designing system according to this embodiment. FIG. 26 is an example of a display screen of the vibration isolator designing system according to this embodiment.

Steps up to step S509 are the same as steps S401 to S409 in the fourth embodiment. Therefore, the explanation of the steps is omitted. However, in this embodiment, as an example, in the following explanation, the number of elastic members is set to four by the number-of-elastic-member-groups setting unit 707 and equal rigidity is set for first to fourth elastic members 71 to 74 by the elastic-member-group-rigidity setting unit 711.

An elastic member group arrangeable range on an XY plane, for example, a rectangular range having vertexes at (1000 mm, 600 mm), (−1000 mm, 600 mm), (−1000 mm, −600 mm), and (1000 mm, −600 mm) is designated according to a user input, whereby the elastic-member-group-arrangeable-range setting unit 725 sets an elastic member group arrangeable range 76 (S512).

The converted-tensor-of-inertia setting unit 715 sets a tensor of inertia with respect to an xyz coordinate system $$I' = \begin{bmatrix} I_{xx} & I_{xy} & I_{xz} \\ I_{xy} & I_{yy} & I_{yx} \\ I_{xz} & I_{yz} & I_{zz} \end{bmatrix}$$

according to an input from the user and conversion from a tensor of inertia I with respect to an XYZ coordinate system (S513).

The resonance-frequency calculating unit 719 calculates a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from the diagonal linearization translational motion equation of Expression (3) described above and the diagonal linearization rotational motion equation of Expression (4) described above on the basis of values of the set parameters (S517).

In rhombus arrangement in which first and third elastic members 71 and 73 are arranged on an x axis and second and fourth elastic members 72 and 74 are arranged on a y axis, the elastic-member-group-initial-arrangement setting unit 727 calculates, as initial arrangement, arrangement in which a rhombus is the largest in the elastic member group arrangeable range, for example, arrangement in which a y coordinate of the first elastic member 71 is the largest (S519).

The elastic-member-group-arrangement display unit 729 displays the positions of the first to fourth elastic members 71 to 74 set as the initial arrangement on a display screen 70 of the display unit 731 such as a display together with the x axis and the y axis of a xy coordinate system and the elastic member group arrangeable range 76 and displays the resonance frequencies calculated by the resonance-frequency calculating unit 719 on the display screen 70 (S521).

The resonance-frequency selecting and inputting unit 733 displays checkboxes 78 respectively on the left of the resonance frequencies calculated by the resonance-frequency calculating unit 719 and prompts for selection and input of a resonance frequency to be shifted out of the resonance frequencies (S523).

When there is no selection and input of a resonance frequency to be shifted, the designing processing is ended. When there is selection and input of a resonance frequency to be shifted, the designing processing proceeds to the next step (S525).

The user views the displayed calculated resonance frequencies. When there is a frequency same as or close to a resonance frequency related to resonance, the user checks a checkbox of the resonance frequency with a mouse or the like. In the following explanation, as an example, the resonance frequency of the y-axial rotational motion is checked.

When there is the selection and input of the resonance frequency to be shifted in this way, the elastic-member-group-arrangement display unit 729 displays an elastic member group for which position adjustment is necessary in order to shift the selected resonance frequency distinguishably from an elastic member group for which the position adjustment is unnecessary and displays a line indicating a position adjusting direction (S527). In this embodiment, the first and third elastic members 71 and 73 for which the position adjustment is necessary in order to shift the resonance frequency of the y-axial rotational motion are flashed. A grid line 77 indicating a position adjusting direction is displayed along the x axis.

The following adjustment is performed according to the selected resonance frequency to be shifted, and the positions of the first to n-th elastic member groups are set (S529).

(1) The elastic-member-group-position adjusting unit 721 adjusts and sets the positions of the first to n-th elastic member groups such that a value of $$\sum_i (k_{i\_zz} r_{pi\_y}^2)$$

changes and shifts the resonance frequency of the x-axial rotational motion.

(2) The elastic-member-group-position adjusting unit 721 adjusts and sets the positions of the first to n-th elastic member groups such that a value of $$\sum_i (k_{i\_zz} r_{pi\_x}^2)$$

changes and shifts the resonance frequency of the y-axial rotational motion.

(3) The elastic-member-group-position adjusting unit 721 adjusts and sets the positions of the first to n-th elastic member groups such that a value of $$\sum_i (k_{i\_xx} r_{pi\_y}^2 + k_{i\_yy} r_{pi\_x}^2)$$

changes and shifts the resonance frequency of the z-axial rotational motion.

(4) The elastic-member-group-rigidity setting unit 711 sets a rigidity $K_{n+1}$ of an n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix}$$

according to, for example, an input from the user. The elastic-member-group adding unit 723 arranges the n+1-th elastic member group at the origin of the xyz coordinate system, adjusts a value of $k_{n+1\_xx}$, and shifts the resonance frequency of the x-direction translational motion.

(5) The elastic-member-group-rigidity setting unit 711 sets the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix}$$

according to, for example, an input from the user. The elastic-member-group adding unit 723 arranges the n+1-th elastic member group at the origin of the xyz coordinate system, adjusts a value of $k_{n+1\_yy}$, and shifts the resonance frequency of the y-direction translational motion.

(6) The elastic-member-group-rigidity setting unit 711 sets the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix}$$

according to, for example, an input from the user. The elastic-member-group adding unit 723 arranges the n+1-th elastic member group at the origin of the xyz coordinate system, adjusts a value of $k_{n+1\_zz}$, and shifts the resonance frequency of the z-direction translational motion.

In this embodiment, when the user drags the first elastic member 71 on the x axis with the mouse, the elastic-member-group-position adjusting unit 721 moves the third elastic member 73 symmetrically to the first elastic member 71 with respect to the origin. The elastic-member-group-arrangement display unit 729 displays the moved third elastic member 73.

The resonance-frequency calculating unit 719 recalculates a resonance frequency of the x-direction translational motion, a resonance frequency of the y-direction translational motion, a resonance frequency of the z-direction translational motion, a resonance frequency of the x-axial rotational motion, a resonance frequency of the y-axial rotational motion, and a resonance frequency of the z-axial rotational motion from the diagonal linearization translational motion equation of Expression (3) described above and the diagonal linearization rotational motion equation of Expression (4) described above on the basis of values of the changed parameters (S531).

The elastic-member-group-arrangement display unit 729 displays the resonance frequencies recalculated by the resonance-frequency calculating unit 719 on the display unit 731

(S533). The designing processing returns to step S523. The resonance-frequency selecting and inputting unit 733 displays the checkboxes 78 respectively on the left of the recalculated resonance frequencies and prompts for selection and input of a resonance frequency to be shifted out of the resonance frequencies. The processing explained above is repeated.

With such a configuration, this embodiment has the following advantage in addition to the advantages of the third embodiment. That is, it is possible to design, considering a frequency related to occurrence of resonance, the six resonance frequencies and the number, the arrangement, the rigidities, and the like of elastic member groups while confirming the six resonance frequencies and the number, the arrangement, the rigidities, and the like of elastic member groups on a screen.

The present invention is explained above concerning the several embodiments for illustration. However, the present invention is not limited to the embodiments. It would be obvious for those skilled in the art that various modifications and corrections can be made concerning forms and details without departing from the scope and the spirit of the present invention.

REFERENCE SIGNS LIST 1, 5 vibration isolator
10 frame
11 to 14 first to fourth slide members
11a to 14a first to fourth slide member main bodies
11b to 14b first to fourth slide plates
15 to 19, 51 to 55 first to fifth elastic members
101 to 105 first to fifth frame sections
3 vibration sensing side structure
4 vibration source side structure
41 second positioning pin hole
56 rotating member
560 first tubular section
561 positioning pin hole
562 to 565 first to fourth position adjustment slits
566 first angle adjustment slit
568 convex section
57 outer ring frame
571 flange section
571a fixing hole
572 second tubular section
572a bolt
572b nut
573 second angle adjustment slit
58 to 61 first to fourth slide sections
58a to 61a first to fourth elastic member attachment plates
58b to 61b first to fourth position fixing plates
59c to 61c bolt
62 elastic member attachment plate
65 pin
7 vibration isolator designing system
70 display screen
71 to 74 first to fourth elastic members
76 elastic member group arrangeable range
77 grid line
78 checkbox
701 tensor-of-inertia setting unit
703 rigid-body-mass setting unit
705 rigid-body-center-of-gravity-coordinate setting unit
707 number-of-elastic-member-groups setting unit
711 elastic-member-group-rigidity setting unit
715 converted-tensor-of-inertia setting unit
717 resonance-related-frequency setting unit
719 resonance-frequency calculating unit
721 elastic-member-group-position adjusting unit
723 elastic-member-group adding unit
725 elastic-member group-arrangeable-range setting unit
727 elastic-member-group-initial-arrangement setting unit
729 elastic-member group-arrangement display unit
731 display unit
733 resonance-frequency selecting and inputting unit

The invention claimed is:
1. An adjusting method for a resonance frequency of a vibration isolator that is in contact with a vibration sensing side structure or a vibration source side structure on one side,
the vibration isolator including first to n-th (n is an integer equal to or larger than 3) elastic member groups and/or an n+1-th elastic member group, each of which includes one or more elastic members,
the first to n-th elastic member groups and/or the n+1-th elastic member group being located on an xy plane of an xyz coordinate system,
one side of the first to n-th elastic member groups and/or the n+1-th elastic member group being a side with which the vibration sensing side structure or the vibration source side structure is in contact, and
an xy coordinate system of the xyz coordinate system being a coordinate system obtained by, when a tensor of inertia I with respect to an XYZ coordinate system having an origin in a center of gravity of the vibration sensing side structure or the vibration source side structure is represented as

$$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system being coaxial with the Z axis,
the adjusting method comprising, when rigidity $K_i$ (i=1, 2, ..., and n) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$ of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the xy coordinate system of the first to n-th elastic member groups are represented as $r_{pi\_x}$ and $r_{pi\_y}$, while satisfying $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0,$$

at least one step of:
(1) a first step of adjusting positions of the first to n-th elastic member groups such that a value of $$\sum_i (k_{i\_zz} r_{pi\_y}^2)$$

changes and shifting a resonance frequency of an x-axial rotational motion;
(2) a second step of adjusting the positions of the first to n-th elastic member groups such that a value of $$\sum_i (k_{i\_zz} r_{pi\_x}^2)$$

changes and shifting a resonance frequency of a y-axial rotational motion;
(3) a third step of adjusting the positions of the first to n-th elastic member groups such that a value of $$\sum_i (k_{i\_xx} r_{pi\_y}^2 + k_{i\_yy} r_{pi\_x}^2)$$

changes and shifting a resonance frequency of a z-axial rotational motion;
(4) a fourth step of arranging the n+1-th elastic member group at an origin of the xyz coordinate, adjusting a value of $k_{n+1\_xx}$, and shifting a resonance frequency of an x-direction translational motion;
(5) a fifth step of arranging the n+1-th elastic member group at the origin of the xyz coordinate, adjusting a value of $k_{n+1\_yy}$, and shifting a resonance frequency of a y-direction translational motion; and
(6) a sixth step of arranging the n+1-th elastic member group at the origin of the xyz coordinate, adjusting a value of $k_{n+1\_zz}$, and shifting a resonance frequency of a z-direction translational motion.

2. The adjusting method for a resonance frequency of the vibration isolator according to claim 1, wherein n=4, the first and third elastic member groups are located on an x axis of the xyz coordinate system, and the second and fourth elastic member groups are located on a y axis of the xyz coordinate system,
the first step is a step of adjusting a distance between the second and fourth elastic member groups and shifting the resonance frequency of the x-axial rotational motion, the second step is a step of adjusting a distance between the first and third elastic member groups and shifting the resonance frequency of the y-axial rotational motion, and
the third step is a step of adjusting the distance between the second and fourth elastic member groups and/or the distance between the first and third elastic member groups and shifting the resonance frequency of the z-axial rotational motion.

3. The adjusting method for a resonance frequency of the vibration isolator according to claim 2, wherein
rigidities of the first and third elastic member groups are equal, and rigidities of the second and fourth elastic member groups are equal, and
at least one of the first to third steps is performed while arranging the first and third elastic member groups symmetrically with respect to the origin on the x axis of the xyz coordinate system and arranging the second and fourth elastic member groups symmetrically with respect to the origin on the y axis of the xyz coordinate system.

4. A vibration isolator that is in contact with a vibration sensing side structure or a vibration source side structure on one side,
the vibration isolator including first to n-th (n is an integer equal to or larger than 3) elastic member groups and/or an n+1-th elastic member group, each of which includes one or more elastic members,
the first to n-th elastic member groups and/or the n+1-th elastic member group being located on an xy plane of an xyz coordinate system,
one side of the first to n-th elastic member groups and/or the n+1-th elastic member group being a side with which the vibration sensing side structure or the vibration source side structure is in contact, and
an xy coordinate system of the xyz coordinate system being a coordinate system obtained by, when a tensor of inertia I with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system being coaxial with the Z axis,
the vibration isolator further comprising at least one shifter of: when rigidity $K_i$ (i=1, 2, ..., and n) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$ of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the xy coordinate system of the first to n-th elastic member groups are represented as $r_{pi\_x}$ and $r_{pi\_y}$, (1) an x-axial rotational motion resonance frequency shifter that, while satisfying $$\sum_i k_{i\_xx} r_{pi\_x} = \sum_i k_{i\_yy} r_{pi\_y} = 0, \text{ and}$$
$$\sum_i k_{i\_yy} r_{pi\_x} r_{pi\_y} = \sum_i k_{i\_xx} r_{pi\_x} r_{pi\_y} = 0,$$

adjusts positions of the first to n-th elastic member groups such that a value of $$\sum_i (k_{i\_zz} r_{pi\_y}^2)$$

changes and shifts a resonance frequency of an x-axial rotational motion;

(2) a y-axial rotational motion resonance frequency shifter that, while satisfying $$\sum_i k_{i\_xx} r_{pi\_x} = \sum_i k_{i\_yy} r_{pi\_y} = 0 \text{ and}$$
$$\sum_i k_{i\_yy} r_{pi\_x} r_{pi\_y} = \sum_i k_{i\_xx} r_{pi\_x} r_{pi\_y} = 0,$$

adjusts the positions of the first to n-th elastic member groups such that a value of $$\sum_i (k_{i\_zz} r_{pi\_x}^2)$$

changes and shifts a resonance frequency of a y-axial rotational motion;

(3) a z-axial rotational motion resonance frequency shifter that, while satisfying $$\sum_i k_{i\_xx} r_{pi\_x} = \sum_i k_{i\_yy} r_{pi\_y} = 0 \text{ and}$$
$$\sum_i k_{i\_yy} r_{pi\_x} r_{pi\_y} = \sum_i k_{i\_xx} r_{pi\_x} r_{pi\_y} = 0,$$

adjusts the positions of the first to n-th elastic member groups such that a value of $$\sum_i (k_{i\_xx} r_{pi\_y}^2 + k_{i\_yy} r_{pi\_x}^2)$$

changes and shifts a resonance frequency of a z-axial rotational motion;

(4) an x-direction translational motion resonance frequency shifter that, while satisfying $$\sum_i k_{i\_xx} r_{pi\_x} = \sum_i k_{i\_yy} r_{pi\_y} = 0 \text{ and}$$
$$\sum_i k_{i\_yy} r_{pi\_x} r_{pi\_y} = \sum_i k_{i\_xx} r_{pi\_x} r_{pi\_y} = 0,$$

arranges the n+1-th elastic member group at an origin of the xyz coordinate, adjusts a value of $k_{n+1\_xx}$, and shifts a resonance frequency of an x-direction translational motion;

(5) a y-direction translational motion resonance frequency shifter that, while satisfying $$\sum_i k_{i\_xx} r_{pi\_x} = \sum_i k_{i\_yy} r_{pi\_y} = 0 \text{ and}$$
$$\sum_i k_{i\_yy} r_{pi\_x} r_{pi\_y} = \sum_i k_{i\_xx} r_{pi\_x} r_{pi\_y} = 0,$$

arranges the n+1-th elastic member group at the origin of the xyz coordinate, adjusts a value of $k_{n+1\_yy}$, and shifts a resonance frequency of a y-direction translational motion; and (6) a z-direction translational motion resonance frequency shifter that, while satisfying, $$\sum_i k_{i\_xx} r_{pi\_x} = \sum_i k_{i\_yy} r_{pi\_y} = 0 \text{ and}$$
$$\sum_i k_{i\_yy} r_{pi\_x} r_{pi\_y} = \sum_i k_{i\_xx} r_{pi\_x} r_{pi\_y} = 0,$$

arranges the n+1-th elastic member group at the origin of the xyz coordinate, adjusts a value of $k_{n+1\_zz}$, and shifts a resonance frequency of a z-direction translational motion.

5. The vibration isolator according to claim 4, wherein n=4, the first and third elastic member groups are located on an x axis of the xyz coordinate system, and the second and fourth elastic member groups are located on a y axis of the xyz coordinate system, the x-axial rotational motion resonance frequency shifter adjusts a distance between the second and fourth elastic member groups and shifts the resonance frequency of the x-axial rotational motion, the y-axial rotational motion resonance frequency shifter adjusts a distance between the first and third elastic member groups and shifts the resonance frequency of the y-axial rotational motion, and the z-axial rotational motion resonance frequency shifter adjusts the distance between the second and fourth elastic member groups and/or the distance between the first and third elastic member groups and shifts the resonance frequency of the z-axial rotational motion.

6. The vibration isolator according to claim 5, wherein
rigidities of the first and third elastic member groups are equal, and rigidities of the second and fourth elastic member groups are equal, and
the x-axial rotational motion resonance frequency shifter, the y-axial rotational motion resonance frequency shifter, and the z-axial rotational motion resonance frequency shifter perform the shift of the resonance frequency while arranging the first and third elastic member groups symmetrically with respect to the origin on the x axis of the xyz coordinate system and arranging the second and fourth elastic member groups symmetrically with respect to the origin on the y axis of the xyz coordinate system.

7. An adjusting method for a resonance frequency of a vibration isolator that is in contact with a vibration sensing side structure or a vibration source side structure on one side,
the vibration isolator comprises:
a rotating member rotatable around a rotation axis; and
a plurality of elastic members movably attached on the rotating member,
the plurality of elastic members including first to n-th (n is an integer equal to or larger than 3) elastic member groups and/or an n+1-th elastic member group, each of which includes one or more elastic members,
the first to n-th elastic member groups and/or the n+1-th elastic member group being located on an xy plane of an xyz coordinate system in which the rotation axis of the rotating member is coaxial with a z axis,
one side of the first to n-th elastic member groups and/or the n+1-th elastic member group being a side with which the vibration sensing side structure or the vibration source side structure is in contact, and
when the vibration sensing side structure and the vibration source side structure are arranged such that a Z axis coincides with the rotation axis of the rotating member when a tensor of inertia with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

the adjusting method comprising, when rigidity $K_i$ (i=1, 2, ..., and n) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$, of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the xy coordinate system of the first to n-th elastic member groups are represented as $r_{pi\_x}$ and $r_{pi\_y}$, while satisfying, in the xy coordinate system obtained by rotating an XY coordinate system around a Z axis by $$\theta = \tan^{-1}\left(\frac{2I_{XY}}{I_{XX} - I_{YY}}\right),$$

$$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0,$$

at least one step of:
(1) a first step of adjusting positions of the first to n-th elastic member groups such that a value of $$\sum_i (k_{i\_zz} r_{pi\_y}^2)$$

changes and shifting a resonance frequency of an x-axial rotational motion;
(2) a second step of adjusting the positions of the first to n-th elastic member groups such that a value of $$\sum_i (k_{i\_zz} r_{pi\_x}^2)$$

changes and shifting a resonance frequency of a y-axial rotational motion;
(3) a third step of adjusting the positions of the first to n-th elastic member groups such that a value of $$\sum_i (k_{i\_xx} r_{pi\_y}^2 + k_{i\_yy} r_{pi\_x}^2)$$

changes and shifting a resonance frequency of a z-axial rotational motion;
(4) a fourth step of arranging the n+1-th elastic member group at an origin of the xyz coordinate, adjusting a value of $k_{n+1\_xx}$, and shifting a resonance frequency of an x-direction translational motion;
(5) a fifth step of arranging the n+1-th elastic member group at the origin of the xyz coordinate, adjusting a value of $k_{n+1\_yy}$, and shifting a resonance frequency of a y-direction translational motion; and
(6) a sixth step of arranging the n+1-th elastic member group at the origin of the xyz coordinate, adjusting a value of $k_{n+1\_zz}$, and shifting a resonance frequency of a z-direction translational motion.

8. An adjusting method for the resonance frequency of the vibration isolator that is in contact with a vibration sensing side structure or a vibration source side structure on one side,
the vibration isolator comprises:
a rotating member rotatable around a rotation axis; and
a plurality of elastic members movably attached on the rotating member,
the plurality of elastic members include first to fourth elastic member groups, each of which includes one or more elastic members, one side of the first to fourth elastic member groups is a side with which the vibration sensing side structure or the vibration source side structure is in contact, the vibration isolator further comprises a position adjusting mechanism capable of respectively independently adjusting a distance between the first and third elastic member groups and a distance between the second and fourth elastic member groups, a line segment connecting the first and third elastic member groups and a line segment connecting the second and fourth elastic member groups are orthogonal to one another, and the rotation axis passes an intersection of the line segment connecting the first and third elastic member groups and the line segment connecting the second and fourth elastic member groups, the plurality of elastic members including first to fourth elastic member groups and/or a fifth member group, each of which includes one or more elastic members, the first to fourth elastic member groups and/or the fifth elastic member group being located on an xy plane of an xyz coordinate system in which the rotation axis of the rotating member is coaxial with a z axis, one side of the first to fourth elastic member groups and/or the fifth elastic member group being a side with which the vibration sensing side structure or the vibration source side structure is in contact, the adjusting method comprising, when the vibration sensing side structure or the vibration source side structure is arranged such that a Z axis coincides with the rotation axis of the rotating member when a tensor of inertia with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

and when rigidity $K_i$ (i=1, 2, 3, and 4) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_5$ of the n+1-th elastic member group is represented as $$[K_5] = \begin{bmatrix} k_{5\_xx} & 0 & 0 \\ 0 & k_{5\_yy} & 0 \\ 0 & 0 & k_{5\_zz} \end{bmatrix},$$

and an x coordinate and a y coordinate of the xy coordinate system of the first to n-th elastic member groups are represented as $r_{pi\_x}$ and $r_{pi\_y}$, a step of rotating the rotating member around a Z axis such that a line segment connecting the first and third elastic member groups and a line segment connecting the second and fourth elastic member groups coincide with an x axis and a y axis of the xy coordinate system obtained by rotating an XY coordinate system around the Z axis by $$\theta = \tan^{-1}\left(\frac{2I_{XY}}{I_{XX} - I_{YY}}\right);$$

and when an x coordinate and a y coordinate of the xy coordinate system of the first to fourth elastic member groups are represented as $r_{pi\_x}$ and $r_{pi\_x}$, while satisfying $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0,$$

at least one step of:
(1) a first step of adjusting a distance between the second and fourth elastic member group and shifting a resonance frequency of an x-axial rotational motion;
(2) a second step of adjusting a distance between the first and third elastic member groups and shifting a resonance frequency of a y-axial rotational motion;
(3) a third step of adjusting the distance between the second and fourth elastic member groups and/or the distance between the first and third elastic member groups and shifting a resonance frequency of a z-axial rotational motion;
(4) a fourth step of arranging the n+1-th elastic member group at an origin of the xyz coordinate, adjusting a value of $k_{n+1\_xx}$, and shifting a resonance frequency of an x-direction translational motion;
(5) a fifth step of arranging the n+1-th elastic member group at the origin of the xyz coordinate, adjusting a value of $k_{n+1\_yy}$, and shifting a resonance frequency of a y-direction translational motion; and
(6) a sixth step of arranging the n+1-th elastic member group at the origin of the xyz coordinate, adjusting a value of $k_{n+1\_zz}$, and shifting a resonance frequency of a z-direction translational motion.

9. The adjusting method for the resonance frequency of the vibration isolator according to claim 8, wherein
rigidities of the first and third elastic member groups are equal, and rigidities of the second and fourth elastic member groups are equal, and
at least one of the first to third steps is performed while arranging the first and third elastic member groups symmetrically with respect to the origin on the x axis of the xyz coordinate system and arranging the second and fourth elastic member groups symmetrically with respect to the origin on the y axis of the xyz coordinate system.

10. A manufacturing method for a vibration isolator that is in contact with a vibration sensing side structure or a vibration source side structure on one side, comprising:
manufacturing the vibration isolator that includes first to n-th (n is an integer equal to or larger than 3) elastic member groups and/or an n+1-th elastic member group, each of which includes one or more elastic members,
the first to n-th elastic member groups and/or the n+1-th elastic member group being located on an xy plane of an xyz coordinate system, one side of the first to n-th elastic member groups and/or the n+1-th elastic member group being a side with which the vibration sensing side structure or the vibration source side structure is in contact, and an xy coordinate system of the xyz coordinate system being a coordinate system obtained by, when a tensor of inertia I with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system being coaxial with the Z axis, wherein when rigidity $K_i$ (i=1, 2, ..., and n) of the first to n-th elastic member groups is represented as $$[K_i] = \begin{bmatrix} k_{i\_xx} & 0 & 0 \\ 0 & k_{i\_yy} & 0 \\ 0 & 0 & k_{i\_zz} \end{bmatrix},$$

rigidity $K_{n+1}$ of the n+1-th elastic member group is represented as $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

and an x coordinate and a y coordinate of the xy coordinate system of the first to n-th elastic member groups are represented as $r_{pi\_x}$ and $r_{pi\_y}$, positions of the first to n-th elastic member groups and/or the n+1-th elastic member group are set to satisfy $$\sum_i k_{i\_xx} r_{pi\_x} = \sum_i k_{i\_yy} r_{pi\_y} = 0, \text{ and}$$

-continued $$\sum_i k_{i\_yy} r_{pi\_x} r_{pi\_y} = \sum_i k_{i\_xx} r_{pi\_x} r_{pi\_y} = 0.$$

11. The manufacturing method for the vibration isolator according to claim 10, wherein when mass of the vibration sensing side structure or the vibration source side structure is represented as m, a z coordinate in the xyz coordinate system of a center of gravity of the vibration sensing side structure or the vibration source side structure is represented as $r_{pi\_z}$, and a tensor of inertia I' with respect to the xyz coordinate system is represented as $$I = \begin{bmatrix} I_{xx} & I_{xy} & I_{xz} \\ I_{xy} & I_{yy} & I_{yx} \\ I_{xz} & I_{yz} & I_{zz} \end{bmatrix},$$

the designing method comprising:

a step of calculating a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x)$$

$$\ddot{r}_{g\_z} = -\frac{1}{m}\sum_i k_{i\_zz} r_{g\_z} = f_3(r_{g\_z})$$

and a diagonal linearization rotational motion equation $$\ddot{\Theta}_x = -\frac{1}{I_{xx}}\left[\sum_i\{k_{i\_yy}(-r_{pi\_z}r_{g\_y} + r_{pi\_z}^2\Theta_x)\} + \sum_i k_{i\_zz} r_{pi\_y}^2 \Theta_x\right] = f_4(r_{g\_y}, \Theta_x)$$

$$\ddot{\Theta}_y = -\frac{1}{I_{yy}}\left[\sum_i\{k_{i\_xx}(r_{pi\_z}r_{g\_x} + r_{pi\_z}^2\Theta_y)\} + \sum_i k_{i\_zz} r_{pi\_x}^2 \Theta_y\right] = f_5(r_{g\_x}, \Theta_y)$$

$$\ddot{\Theta}_z = -\frac{1}{I_{zz}}\sum_i\{(k_{i\_xx} r_{pi\_y}^2 + k_{i\_yy} r_{pi\_x}^2)\Theta_z\} = f_6(\theta_z),$$

and to prevent the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion from coinciding with frequency related to occurrence of resonance, at least one step of:

(1) a first step of adjusting positions of the first to n-th elastic member groups such that a value of $$\sum_i (k_{i\_zz} r^2_{pi\_y})$$

changes and shifting the resonance frequency of the x-axial rotational motion;

(2) a second step of adjusting the positions of the first to n-th elastic member groups such that a value of $$\sum_i (k_{i\_z} r^2_{pi\_x})$$

changes and shifting the resonance frequency of the y-axial rotational motion;

(3) a third step of adjusting the positions of the first to n-th elastic member groups such that a value of $$\sum_i (k_{i\_xx} r^2_{pi\_y} + k_{i\_yy} r^2_{pi\_x})$$

changes and shifting the resonance frequency of the z-axial rotational motion;

(4) a fourth step of arranging the n+1-th elastic member group at an origin of the xyz coordinate, adjusting a value of $k_{n+1\_xx}$, and shifting the resonance frequency of the x-direction translational motion;

(5) a fifth step of arranging the n+1-th elastic member group at the origin of the xyz coordinate, adjusting a value of $k_{n+1\_yy}$, and shifting the resonance frequency of the y-direction translational motion; and (6) a sixth step of arranging the n+1-th elastic member group at the origin of the xyz coordinate, adjusting a value of $k_{n+1\_zz}$, and shifting the resonance frequency of the z-direction translational motion.

12. The manufacturing method for the vibration isolator according to claim 11, wherein n=4, the first and third elastic member groups are located on an x axis of the xyz coordinate system, and the second and fourth elastic member groups are located on a y axis of the xyz coordinate system, the first step is a step of adjusting a distance between the second and fourth elastic member groups and shifting the resonance frequency of the x-axial rotational motion, the second step is a step of adjusting a distance between the first and third elastic member groups and shifting the resonance frequency of the y-axial rotational motion, and the third step is a step of adjusting the distance between the second and fourth elastic member groups and/or the distance between the first and third elastic member groups and shifting the resonance frequency of the z-axial rotational motion.

13. The manufacturing method for the vibration isolator according to claim 12, wherein rigidities of the first and third elastic member groups are equal, and rigidities of the second and fourth elastic member groups are equal, and at least one of the first to third steps is performed while arranging the first and third elastic member groups symmetrically with respect to the origin on the x axis of the xyz coordinate system and arranging the second and fourth elastic member groups symmetrically with respect to the origin on the y axis of the xyz coordinate system.

14. A manufacturing method for a vibration isolator in contact with a vibration sensing side structure or a vibration source side structure on one side, the designing method being executed by a computer, the vibration isolator including first to n-th (n is an integer equal to or larger than 3) elastic member groups, each of which includes one or more elastic members, the first to n-th elastic member groups being located on an xy plane of an xyz coordinate system, one side of the first to n-th elastic member groups and/or an n+1-th elastic member group being a side with which the vibration sensing side structure or the vibration source side structure is in contact, and an xy coordinate system of the xyz coordinate system being a coordinate system obtained by, when a tensor of inertia I with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2 I_{XY}}{I_{XX} - I_{YY}}\right)$$

around a Z axis, and a z axis of the xyz coordinate system being coaxial with the Z axis, the method comprising:

a step of setting the tensor of inertia I with respect to the XYZ coordinate system having the origin in the center of gravity of the vibration sensing side structure or the vibration source side structure;

a step of setting a number n of the elastic member groups;

a step of setting rigidity $K_i$ (i=1, 2, . . . , and n) of the first to n-th elastic member groups $$[K_i] = \begin{bmatrix} k_{i\_xx} & 0 & 0 \\ 0 & k_{i\_yy} & 0 \\ 0 & 0 & k_{i\_zz} \end{bmatrix};$$

and a step of, when an x coordinate and a y coordinate of the xy coordinate system of the first to n-th elastic member groups are represented as $r_{pi\_x}$ and $r_{pi\_y}$, setting positions of the first to n-th elastic member groups to satisfy $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0.$$

15. The manufacturing method for the vibration isolator according to claim 14, further comprising:
- a step of setting mass m of the vibration sensing side structure or the vibration source side structure;
- a step of setting a z coordinate $r_{pi\_z}$ in the xyz coordinate system of a center of gravity of the vibration sensing side structure or the vibration source side structure;
- a step of setting a tensor of inertia I' with respect to the xyz coordinate system $$I' = \begin{bmatrix} I_{xx} & I_{xy} & I_{xz} \\ I_{xy} & I_{yy} & I_{yx} \\ I_{xz} & I_{yz} & I_{zz} \end{bmatrix};$$

- a step of setting a frequency related to occurrence of resonance; and
- a step of calculating a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x)$$

$$\ddot{r}_{g\_z} = -\frac{1}{m}\sum_i k_{i\_zz} r_{g\_z} = f_3(r_{g\_z})$$

and
a diagonal linearization rotational motion equation $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz} r_{pi\_y}^2 \Theta_x\right] = f_4(r_{g\_y}, \Theta_x)$$

$$\ddot{\Theta}_y = -\frac{1}{I_{yy}}\left[\sum_i \{k_{i\_xx}(-r_{pi\_z}r_{g\_x} + r_{pi\_z}^2\Theta_y)\} + \sum_i k_{i\_zz} r_{pi\_x}^2 \Theta_y\right] = f_5(r_{g\_x}, \Theta_y)$$

$$\ddot{\Theta}_x = -\frac{1}{I_{zz}}\sum_i \{(k_{i\_xx} r_{pi\_y}^2 + k_{i\_yy} r_{pi\_x}^2)\Theta_z\} = f_6(\theta_z);$$

and,
to prevent the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion from coinciding with the set frequency related to occurrence of resonance, at least one step of:

(1) a first step of adjusting and setting positions of the first to n-th elastic member groups such that a value of $$\sum_i (k_{i\_zz} r_{pi\_y}^2)$$

changes and shifting the resonance frequency of the x-axial rotational motion;

(2) a second step of adjusting and setting the positions of the first to n-th elastic member groups such that a value of $$\sum_i (k_{i\_zz} r_{pi\_x}^2)$$

changes and shifting the resonance frequency of the y-axial rotational motion;

(3) a third step of adjusting and setting the positions of the first to n-th elastic member groups such that a value of $$\sum_i (k_{i\_xx} r_{pi\_y}^2 + k_{i\_yy} r_{pi\_x}^2)$$

changes and shifting the resonance frequency of the z-axial rotational motion;

(4) a fourth step of setting rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at an origin of the xyz coordinate, adjusting a value of $k_{n+1\_xx}$, and shifting the resonance frequency of the x-direction translational motion;

(5) a fifth step of setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_yy}$, and shifting the resonance frequency of the y-direction translational motion; and (6) a sixth step of setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_zz}$, and shifting the resonance frequency of the z-direction translational motion.

16. The manufacturing method for the vibration isolator according to claim 14, further comprising:
a step of setting mass m of the vibration sensing side structure or the vibration source side structure;
a step of setting a z coordinate $r_{pi\_z}$ in the xyz coordinate system of a center of gravity of the vibration sensing side structure or the vibration source side structure;
a step of setting a tensor of inertia I' with respect to the xyz coordinate system $$I' = \begin{bmatrix} I_{xx} & I_{xy} & I_{xz} \\ I_{xy} & I_{yy} & I_{yx} \\ I_{xz} & I_{yz} & I_{zz} \end{bmatrix};$$

a step of calculating a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x)$$

$$\ddot{r}_{g\_z} = -\frac{1}{m}\sum_i k_{i\_zz}r_{g\_z} = f_3(r_{g\_z})$$

and
a diagonal linearization rotational motion equation $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz}r_{pi\_y}^2\Theta_x\right] = f_4(r_{g\_y}, \Theta_x)$$

$$\ddot{\Theta}_y = -\frac{1}{I_{yy}}\left[\sum_i \{k_{i\_xx}(r_{pi\_z}r_{g\_x} + r_{pi\_z}^2\Theta_y)\} + \sum_i k_{i\_zz}r_{pi\_x}^2\Theta_y\right] = f_5(r_{g\_x}, \Theta_y)$$

$$\ddot{\Theta}_z = -\frac{1}{I_{zz}}\sum_i \{(k_{i\_xx}r_{pi\_y}^2 + k_{i\_yy}r_{pi\_x}^2)\Theta_z\} = f_6(\theta_z);$$

a step of displaying set positions of the first to n-th elastic member groups and the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion; and a step of prompting for selection and input of a resonance frequency to be shifted out of the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion; and, when the selection and input of the resonance frequency to be shifted is performed, according to the selected resonance frequency to be shifted, at least one step of:

(1) a first step of adjusting and setting positions of the first to n-th elastic member groups such that a value of $$\sum_i (k_{i\_zz}r_{pi\_y}^2)$$

changes and shifting the resonance frequency of the x-axial rotational motion;

(2) a second step of adjusting and setting the positions of the first to n-th elastic member groups such that a value of $$\sum_i (k_{i\_zz}r_{pi\_x}^2)$$

changes and shifting the resonance frequency of the y-axial rotational motion;

(3) a third step of adjusting and setting the positions of the first to n-th elastic member groups such that a value of $$\sum_i (k_{i\_xx}r_{pi\_y}^2 + k_{i\_yy}r_{pi\_x}^2)$$

changes and shifting the resonance frequency of the z-axial rotational motion;

(4) a fourth step of setting rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at an origin of the xyz coordinate, adjusting a value of $k_{n+1\_xx}$, and shifting the resonance frequency of the x-direction translational motion;

(5) a fifth step of setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_yy}$, and shifting the resonance frequency of the y-direction translational motion; and (6) a sixth step of setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_zz}$, and shifting the resonance frequency of the z-direction translational motion.

17. The manufacturing method for the vibration isolator according to claim 14, wherein $n=4$, the first and third elastic member groups are located on an x axis of the xyz coordinate system, and the second and fourth elastic member groups are located on a y axis of the xyz coordinate system, the first step is a step of adjusting a distance between the second and fourth elastic member groups and shifting the resonance frequency of the x-axial rotational motion, the second step is a step of adjusting a distance between the first and third elastic member groups and shifting the resonance frequency of the y-axial rotational motion, and the third step is be a step of adjusting the distance between the second and fourth elastic member groups and/or the distance between the first and third elastic member groups and shifting the resonance frequency of the z-axial rotational motion.

18. The manufacturing method for the vibration isolator according to claim 17, wherein rigidities of the first and third elastic member groups are equal, and rigidities of the second and fourth elastic member groups are equal, and at least one of the first to third steps is performed while arranging the first and third elastic member groups symmetrically with respect to the origin on the x axis of the xyz coordinate system and arranging the second and fourth elastic member groups symmetrically with respect to the origin on the y axis of the xyz coordinate system.

19. The designing manufacturing method for the vibration isolator according to claim 15, wherein the step of setting the tensor of inertia I' with respect to the xyz coordinate system is a step of calculating the tensor of inertia I' on the basis of a tensor of inertia I with respect to the XYZ coordinate system.

20. The manufacturing method for the vibration isolator according to claim 14, further comprising a step of setting an elastic member group arrangeable range, wherein the setting of the positions of the first to n-th elastic member groups is performed within the elastic member group arrangeable range.

21. The manufacturing method for the vibration isolator according to claim 20, wherein the set positions of the first to n-th elastic member groups are displayed together with the elastic-member group arrangeable range.

22. The manufacturing method for the vibration isolator according to claim 14, wherein the set positions of the first to n-th elastic member groups are displayed together with the x axis and a y axis.

23. The manufacturing method for the vibration isolator according to claim 15, wherein $n=4$, the first and third elastic member groups are located on an x axis of the xyz coordinate system, and the second and fourth elastic member groups are located on a y axis of the xyz coordinate system, the first step is a step of adjusting a distance between the second and fourth elastic member groups and shifting the resonance frequency of the x-axial rotational motion, the second step is a step of adjusting a distance between the first and third elastic member groups and shifting the resonance frequency of the y-axial rotational motion, the third step is a step of adjusting the distance between the second and fourth elastic member groups and/or the distance between the first and third elastic member groups and shifting the resonance frequency of the z-axial rotational motion, and the designing method further comprises a step of displaying an elastic member group for which position adjustment is necessary in order to shift the selected resonance frequency to be shifted distinguishably from an elastic member group for which the position adjustment is unnecessary and displaying a line indicating a position adjustment direction.

24. The manufacturing method for the vibration isolator according to claim 23, wherein rigidities of the first and third elastic member groups are equal, and rigidities of the second and fourth elastic member groups are equal, and at least one of the first to third steps is performed while, when an instruction for moving one of the first and third elastic member groups on the x axis is input, arranging and displaying the other elastic member groups symmetrically with respect to the origin and, when an instruction for moving one of the second and fourth elastic member groups on the y axis is input, arranging and displaying the other elastic member group symmetrically with respect to the origin.

25. A storage medium in which the program for causing a computer to execute the manufacturing method for the vibration isolator according to claim 14 is stored, comprising at least one selected from the group consisting of a flash memory, a hard disk, a DVD-RAM, and a USB memory.

26. The manufacturing method for the vibration isolator according to claim 10, comprising a step of manufacturing a structure to which the vibration isolator is attached.

27. A vibration isolation system for a vibration isolator in contact with a vibration sensing side structure or a vibration source side structure on one side, the vibration isolator including first to n-th (n is an integer equal to or larger than 3) elastic member groups, each of which includes one or more elastic members, the first to n-th elastic member groups being located on an xy plane of an xyz coordinate system, one side of the first to n-th elastic member groups and/or an n+1-th elastic member group being a side with which the vibration sensing side structure or the vibration source side structure is in contact, and an xy coordinate system of the xyz coordinate system being a coordinate system obtained by, when a tensor of inertia I with respect to an XYZ coordinate system having an origin in a center of gravity of the vibration sensing side structure or the vibration source side structure is represented as $$I = \begin{bmatrix} I_{XX} & I_{XY} & I_{XZ} \\ I_{XY} & I_{YY} & I_{YZ} \\ I_{XZ} & I_{YZ} & I_{ZZ} \end{bmatrix},$$

rotating an XY coordinate system by $$\theta = \tan^{-1}\left(\frac{2I_{XY}}{I_{XX} - I_{YY}}\right)$$

around a Z axis, and a z axis of the xyz coordinate system being coaxial with the Z axis, the system comprising:

a tensor-of-inertia setting unit that sets the tensor of inertia I with respect to the XYZ coordinate system having the origin in the center of gravity of the vibration sensing side structure or the vibration source side structure;

a number-of-elastic-member-groups setting unit that sets a number n of the elastic member groups;

a rigidity setting section that sets rigidity $K_i$ (i=1, 2, ..., and n) of the first to n-th elastic member groups $$[K_i] = \begin{bmatrix} k_{i\_xx} & 0 & 0 \\ 0 & k_{i\_yy} & 0 \\ 0 & 0 & k_{i\_zz} \end{bmatrix};$$

and an elastic-member-group-position setting section that, when an x coordinate and a y coordinate of the xy coordinate system of the first to n-th elastic member groups are represented as $r_{pi\_x}$ and $r_{pi\_y}$, sets positions of the first to n-th elastic member groups to satisfy $$\sum_i k_{i\_xx} r_{pi\_x} = \sum_i k_{i\_yy} r_{pi\_y} = 0, \text{ and}$$

$$\sum_i k_{i\_yy} r_{pi\_x} r_{pi\_y} = \sum_i k_{i\_xx} r_{pi\_x} r_{pi\_y} = 0.$$

28. The vibration isolation system according to claim 27, further comprising:

a rigid-body-mass setting unit that sets mass m of the vibration sensing side structure or the vibration source side structure;

a rigid-body-center-of-gravity-coordinate setting unit that sets a z coordinate $r_{pi\_z}$ in the xyz coordinate system of a center of gravity of the vibration sensing side structure or the vibration source side structure;

a converted-tensor-of-inertia setting unit that sets a tensor of inertia I' with respect to the xyz coordinate system $$I' = \begin{bmatrix} I_{xx} & I_{xy} & I_{xz} \\ I_{xy} & I_{yy} & I_{yx} \\ I_{xz} & I_{yz} & I_{zz} \end{bmatrix};$$

a resonance-frequency calculating unit that calculates a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x)$$

$$\ddot{r}_{g\_z} = -\frac{1}{m}\sum_i k_{i\_zz} r_{g\_z} = f_3(r_{g\_z})$$

and a diagonal linearization rotational motion equation $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz} r_{pi\_y}^2\Theta_x\right] = f_4(r_{g\_y}, \Theta_x)$$

$$\ddot{\Theta}_y = -\frac{1}{I_{yy}}\left[\sum_i \{k_{i\_xx}(r_{pi\_z}r_{g\_x} + r_{pi\_z}^2\Theta_y)\} + \sum_i k_{i\_zz} r_{pi\_x}^2\Theta_y\right] = f_5(r_{g\_x}, \Theta_y)$$

-continued $$\ddot{\Theta}_z = -\frac{1}{I_{zz}}\sum_i \{(k_{i\_xx}r_{pi\_y}^2 + k_{i\_yy}r_{pi\_x}^2)\Theta_x\} = f_6(\theta_z);$$

a resonance-related-frequency setting that sets a frequency related to occurrence of resonance; and
an elastic-member-group-position adjusting unit that performs, to prevent the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion from coinciding with the set frequency related to occurrence of resonance, at least one of processings among:

(1) first processing for adjusting and setting positions of the first to n-th elastic member groups such that a value of $$\sum_i (k_{i\_zz}r_{pi\_y}^2)$$

changes and shifting the resonance frequency of the x-axial rotational motion;

(2) second processing for adjusting and setting the positions of the first to n-th elastic member groups such that a value of $$\sum_i (k_{i\_zz}r_{pi\_x}^2)$$

changes and shifting the resonance frequency of the y-axial rotational motion;

(3) third processing for adjusting and setting the positions of the first to n-th elastic member groups such that a value of $$\sum_i (k_{i\_xx}r_{pi\_y}^2 + k_{i\_yy}r_{pi\_x}^2)$$

changes and shifting the resonance frequency of the z-axial rotational motion;

(4) fourth processing for setting rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at an origin of the xyz coordinate, adjusting a value of $k_{n+1\_xx}$, and shifting the resonance frequency of the x-direction translational motion;

(5) fifth processing for setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_yy}$, and shifting the resonance frequency of the y-direction translational motion; and (6) sixth processing for setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix}$$

arranging the n+1-th elastic member group at the origin of the xyz coordinate, adjusting a value of $k_{n+1\_zz}$, and shifting the resonance frequency of the z-direction translational motion.

29. The vibration isolation system according to claim 27, further comprising:

a rigid-body-mass setting unit that sets mass m of the vibration sensing side structure or the vibration source side structure;

a rigid-body-center-of-gravity-coordinate setting unit that sets a z coordinate $r_{pi\_z}$ in the xyz coordinate system of a center of gravity of the vibration sensing side structure or the vibration source side structure;

a converted-tensor-of-inertia setting unit that sets a tensor of inertia I' with respect to the xyz coordinate system $$I' = \begin{bmatrix} I_{xx} & I_{xy} & I_{xz} \\ I_{xy} & I_{yy} & I_{yx} \\ I_{xz} & I_{yz} & I_{zz} \end{bmatrix};$$

a resonance-frequency calculating unit that calculates a resonance frequency of an x-direction translational motion, a resonance frequency of a y-direction translational motion, a resonance frequency of a z-direction translational motion, a resonance frequency of an x-axial rotational motion, a resonance frequency of a y-axial rotational motion, and a resonance frequency of a z-axial rotational motion from a diagonal linearization translational motion equation $$\ddot{r}_{g\_x} = -\frac{1}{m}\sum_i k_{i\_xx}\{r_{g\_x} + r_{pi\_z}\Theta_y\} = f_1(r_{g\_x}, \Theta_y)$$

$$\ddot{r}_{g\_y} = -\frac{1}{m}\sum_i k_{i\_yy}\{r_{g\_y} - r_{pi\_z}\Theta_x\} = f_2(r_{g\_y}, \Theta_x)$$

-continued $$\ddot{r}_{g\_z} = -\frac{1}{m}\sum_i k_{i\_zz} r_{g\_z} = f_3(r_{g\_z})$$

and
a diagonal linearization rotational motion equation $$\ddot{\Theta}_x = -\frac{1}{I_{xx}}\left[\sum_i \{k_{i\_yy}(-r_{pi\_z}r_{g\_y} + r_{pi\_z}^2\Theta_x)\} + \sum_i k_{i\_zz}r_{pi\_y}^2\Theta_x\right] = f_4(r_{g\_y}, \Theta_x)$$

$$\ddot{\Theta}_y = -\frac{1}{I_{yy}}\left[\sum_i \{k_{i\_xx}(-r_{pi\_z}r_{g\_x} + r_{pi\_z}^2\Theta_y)\} + \sum_i k_{i\_zz}r_{pi\_x}^2\Theta_y\right] = f_5(r_{g\_x}, \Theta_y)$$

$$\ddot{\Theta}_z = -\frac{1}{I_{zz}}\sum_i \{(k_{i\_xx}r_{pi\_y}^2 + k_{i\_yy}r_{pi\_x}^2)\Theta_z\} = f_6(\theta_z);$$

an elastic-member-group-arrangement display unit that displays set positions of the first to n-th elastic member groups and the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion;

a resonance-frequency selecting and inputting unit that prompts for selection and input of a resonance frequency to be shifted out of the calculated resonance frequency of the x-direction translational motion, the calculated resonance frequency of the y-direction translational motion, the calculated resonance frequency of the z-direction translational motion, the calculated resonance frequency of the x-axial rotational motion, the calculated resonance frequency of the y-axial rotational motion, and the calculated resonance frequency of the z-axial rotational motion; and an elastic-member-group-position adjusting unit that, when the selection and input of the resonance frequency to be shifted is performed, according to the selected resonance frequency to be shifted, performs at least one of processings among:

(1) first processing for adjusting and setting positions of the first to n-th elastic member groups such that a value of $$\sum_i (k_{i\_zz}r_{pi\_y}^2)$$

changes and shifting the resonance frequency of the x-axial rotational motion;

(2) second processing for adjusting and setting the positions of the first to n-th elastic member groups such that a value of $$\sum_i (k_{i\_zz}r_{pi\_x}^2)$$

changes and shifting the resonance frequency of the y-axial rotational motion;

(3) third processing for adjusting and setting the positions of the first to n-th elastic member groups such that a value of $$\sum_i (k_{i\_xx}r_{pi\_y}^2 + k_{i\_yy}r_{pi\_x}^2)$$

changes and shifting the resonance frequency of the z-axial rotational motion;

(4) a fourth step of setting rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at an origin of the xyz coordinate, adjusting a value of $k_{n+1\_xx}$, and shifting the resonance frequency of the x-direction translational motion;

(5) fifth processing for setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_yy}$, and shifting the resonance frequency of the y-direction translational motion; and (6) sixth processing for setting the rigidity $K_{n+1}$ of the n+1-th elastic member group $$[K_{n+1}] = \begin{bmatrix} k_{n+1\_xx} & 0 & 0 \\ 0 & k_{n+1\_yy} & 0 \\ 0 & 0 & k_{n+1\_zz} \end{bmatrix},$$

arranging the n+1-th elastic member group at the origin of the xyz coordinate, adjusting a value of $k_{n+1\_zz}$, and shifting the resonance frequency of the z-direction translational motion.

30. The vibration isolation system according to claim 28, wherein $n=4$, the first and third elastic member groups are located on an x axis of the xyz coordinate system, and the second and fourth elastic member groups are located on a y axis of the xyz coordinate system, the first processing is processing for adjusting a distance between the second and fourth elastic member groups and shifting the resonance frequency of the x-axial rotational motion, the second processing is processing for adjusting a distance between the first and third elastic member groups and shifting the resonance frequency of the y-axial rotational motion, and the third processing is processing for adjusting the distance between the second and fourth elastic member groups and/or the distance between the first and third elastic member groups and shifting the resonance frequency of the z-axial rotational motion.

31. The vibration isolation system according to claim 28, wherein
rigidities of the first and third elastic member groups are equal, and rigidities of the second and fourth elastic member groups are equal, and
at least one of the first processing to the third processing is performed while arranging the first and third elastic member groups symmetrically with respect to the origin on the x axis of the xyz coordinate system and arranging the second and fourth elastic member groups symmetrically with respect to the origin on the y axis of the xyz coordinate system.

32. The vibration isolation system according to claim 28, wherein the converted-tensor-of-inertia setting unit calculates the tensor of inertia I' on the basis of a tensor of inertia I with respect to the XYZ coordinate system.

33. The vibration isolation system according to claim 27, further comprising an elastic-member-group-arrangeable-range setting unit that sets an elastic member group arrangeable range, wherein
the setting of the positions of the first to n-th elastic member groups is performed within the elastic member group arrangeable range.

34. The vibration isolation system according to claim 33, wherein the set positions of the first to n-th elastic member groups are displayed together with the elastic-member group arrangeable range.

35. The vibration isolation system according to claim 27, wherein the set positions of the first to n-th elastic member groups are displayed together with the x axis and y axis.

36. The vibration isolation system according to claim 28, wherein $n=4$, the first and third elastic member groups are located on an x axis of the xyz coordinate system, and the second and fourth elastic member groups are located on a y axis of the xyz coordinate system, the first processing is processing for adjusting a distance between the second and fourth elastic member groups and shifting the resonance frequency of the x-axial rotational motion, the second processing is processing for adjusting a distance between the first and third elastic member groups and shifting the resonance frequency of the y-axial rotational motion, the third processing is processing for adjusting the distance between the second and fourth elastic member groups and/or the distance between the first and third elastic member groups and shifting the resonance frequency of the z-axial rotational motion, and the elastic-member-group-arrangement display unit displays an elastic member group for which position adjustment is necessary in order to shift the selected resonance frequency to be shifted distinguishably from an elastic member group for which the position adjustment is unnecessary and displays a line indicating a position adjustment direction.

37. The vibration isolation system according to claim 36, wherein
rigidities of the first and third elastic member groups are equal, and rigidities of the second and fourth elastic member groups are equal, and
at least one of the first processing to the third processing is performed while, when an instruction for moving one of the first and third elastic member groups on the x axis is input, arranging and displaying the other elastic member groups symmetrically with respect to the origin and, when an instruction for moving one of the second and fourth elastic member groups on the y axis is input, arranging and displaying the other elastic member group symmetrically with respect to the origin.

* * * * *